US007853657B2

(12) United States Patent
Martin

(10) Patent No.: US 7,853,657 B2
(45) Date of Patent: Dec. 14, 2010

(54) ELECTRONIC MESSAGE RESPONSE AND REMEDIATION SYSTEM AND METHOD

(76) Inventor: John Martin, 106 Beacon Blvd., Sea Girt, NJ (US) 08750

( * ) Notice: Subject to any disclaimer, the term of this patent is extended or adjusted under 35 U.S.C. 154(b) by 1132 days.

(21) Appl. No.: 11/297,173

(22) Filed: Dec. 8, 2005

(65) Prior Publication Data

US 2006/0168065 A1 Jul. 27, 2006

Related U.S. Application Data

(60) Provisional application No. 60/634,636, filed on Dec. 8, 2004.

(51) Int. Cl.
*G06F 15/16* (2006.01)

(52) U.S. Cl. ........................ 709/206; 709/200; 709/223

(58) Field of Classification Search ................. 709/206, 709/224
See application file for complete search history.

(56) References Cited

U.S. PATENT DOCUMENTS

| | | | | |
|---|---|---|---|---|
| 6,061,722 | A * | 5/2000 | Lipa et al. | 709/224 |
| 6,170,019 | B1 * | 1/2001 | Dresel et al. | 719/330 |
| 6,332,025 | B2 * | 12/2001 | Takahashi et al. | 380/281 |
| 6,453,327 | B1 * | 9/2002 | Nielsen | 715/205 |
| 6,507,866 | B1 * | 1/2003 | Barchi | 709/207 |
| 6,859,830 | B1 * | 2/2005 | Ronneburg et al. | 709/224 |
| 7,194,531 | B2 * | 3/2007 | Donker et al. | 709/223 |
| 7,257,564 | B2 * | 8/2007 | Loughmiller et al. | 706/16 |
| 7,353,264 | B2 * | 4/2008 | Gill et al. | 709/223 |
| 7,356,534 | B2 * | 4/2008 | Mohammed et al. | 1/1 |
| 7,395,328 | B2 * | 7/2008 | Ronneburg et al. | 709/223 |
| 7,406,504 | B2 * | 7/2008 | Paul | 709/206 |
| 7,457,858 | B1 * | 11/2008 | Levesque et al. | 709/223 |
| 7,536,442 | B2 * | 5/2009 | Kelley et al. | 709/207 |
| 7,711,779 | B2 * | 5/2010 | Goodman et al. | 709/206 |
| 7,747,776 | B2 * | 6/2010 | Forrester | 709/238 |
| 2002/0065884 | A1 * | 5/2002 | Donoho et al. | 709/204 |
| 2002/0174185 | A1 * | 11/2002 | Rawat et al. | 709/206 |
| 2003/0182383 | A1 * | 9/2003 | He | 709/206 |
| 2004/0054741 | A1 * | 3/2004 | Weatherby et al. | 709/206 |
| 2004/0249890 | A1 * | 12/2004 | Fellenstein et al. | 709/206 |
| 2005/0044150 | A1 * | 2/2005 | Kaminsky et al. | 709/206 |
| 2005/0064850 | A1 * | 3/2005 | Irlam et al. | 455/414.1 |
| 2005/0188023 | A1 * | 8/2005 | Doan et al. | 709/206 |
| 2005/0188025 | A1 * | 8/2005 | Landau et al. | 709/206 |
| 2006/0004920 | A1 * | 1/2006 | Hallenbeck | 709/224 |
| 2006/0031328 | A1 * | 2/2006 | Malik | 709/206 |
| 2006/0161987 | A1 * | 7/2006 | Levy-Yurista | 726/24 |
| 2006/0212546 | A1 * | 9/2006 | Kishimoto | 709/219 |
| 2006/0242243 | A1 * | 10/2006 | Matsumoto | 709/206 |
| 2006/0271631 | A1 * | 11/2006 | Qureshi et al. | 709/206 |
| 2007/0043817 | A1 * | 2/2007 | Oliver et al. | 709/206 |
| 2007/0150542 | A1 * | 6/2007 | Sommerer | 709/206 |
| 2007/0294352 | A1 * | 12/2007 | Shraim et al. | 709/206 |
| 2008/0025244 | A1 * | 1/2008 | Hassan et al. | 370/313 |
| 2009/0013399 | A1 * | 1/2009 | Cottrell et al. | 726/12 |

* cited by examiner

*Primary Examiner*—John Follansbee
*Assistant Examiner*—Anthony Mejia
(74) *Attorney, Agent, or Firm*—Fox Rothschild LLP; Perry M. Fonseca

(57) ABSTRACT

Provided is a method, system and software for responding to an incoming electronic message, including determining whether the incoming electronic message is relevant or irrelevant to a user, and if the incoming electronic message is irrelevant to the user, parsing the incoming electronic message for message origination information and replying to the message using the message origination information.

42 Claims, 55 Drawing Sheets

2700

3500

3600

3700

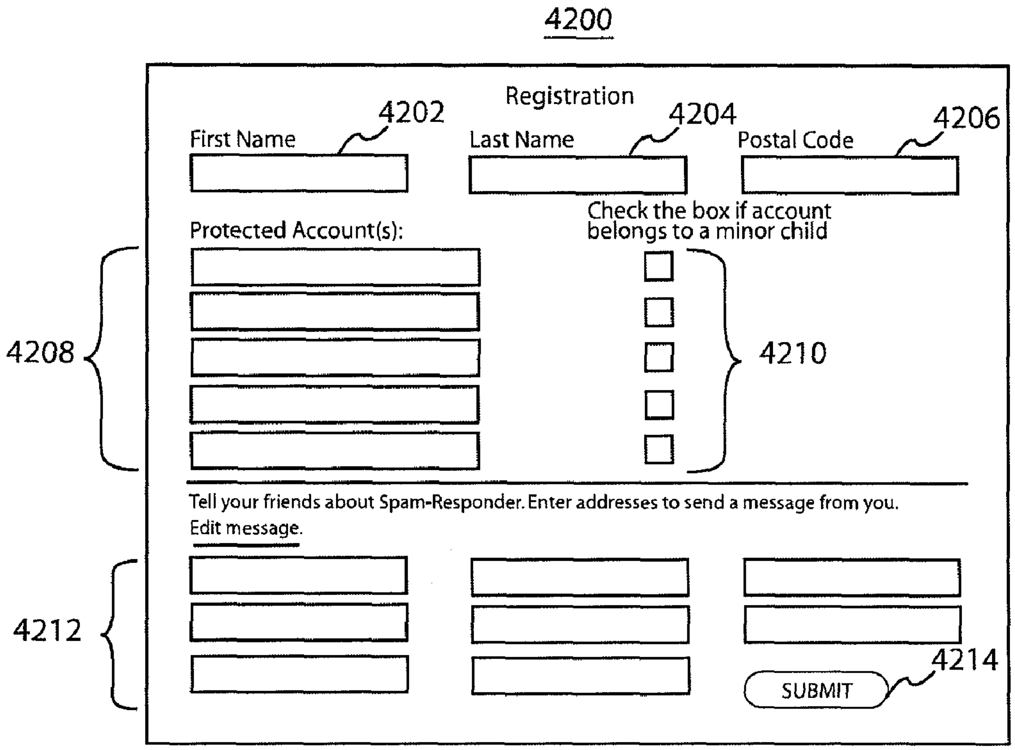

Figure 42

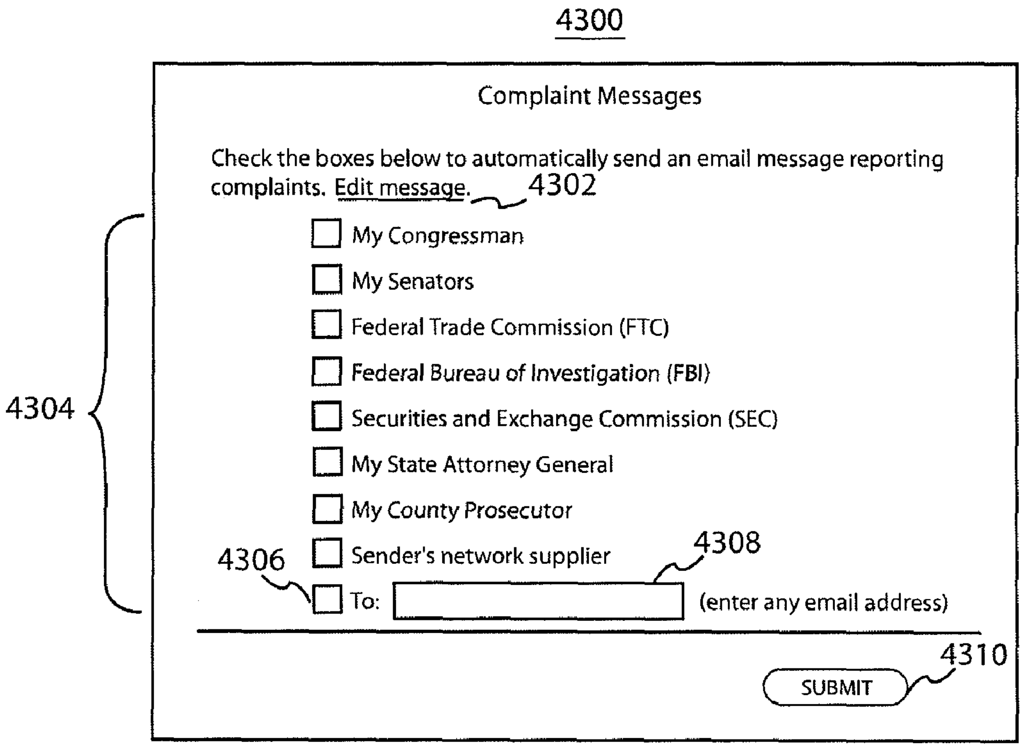

Registration

First Name 4202  Last Name 4204  Postal Code 4206

Protected Account(s):   Check the box if account belongs to a minor child

4208 { [fields] }   4210 { [checkboxes] }

Tell your friends about Spam-Responder. Enter addresses to send a message from you. Edit message.

4212 { [fields] }

4214 SUBMIT

4300

Complaint Messages

Check the boxes below to automatically send an email message reporting complaints. Edit message. 4302

4304 {
- ☐ My Congressman
- ☐ My Senators
- ☐ Federal Trade Commission (FTC)
- ☐ Federal Bureau of Investigation (FBI)
- ☐ Securities and Exchange Commission (SEC)
- ☐ My State Attorney General
- ☐ My County Prosecutor
- 4306 ☐ Sender's network supplier 4308
- ☐ To: [_____] (enter any email address)
}

4310 SUBMIT

4700

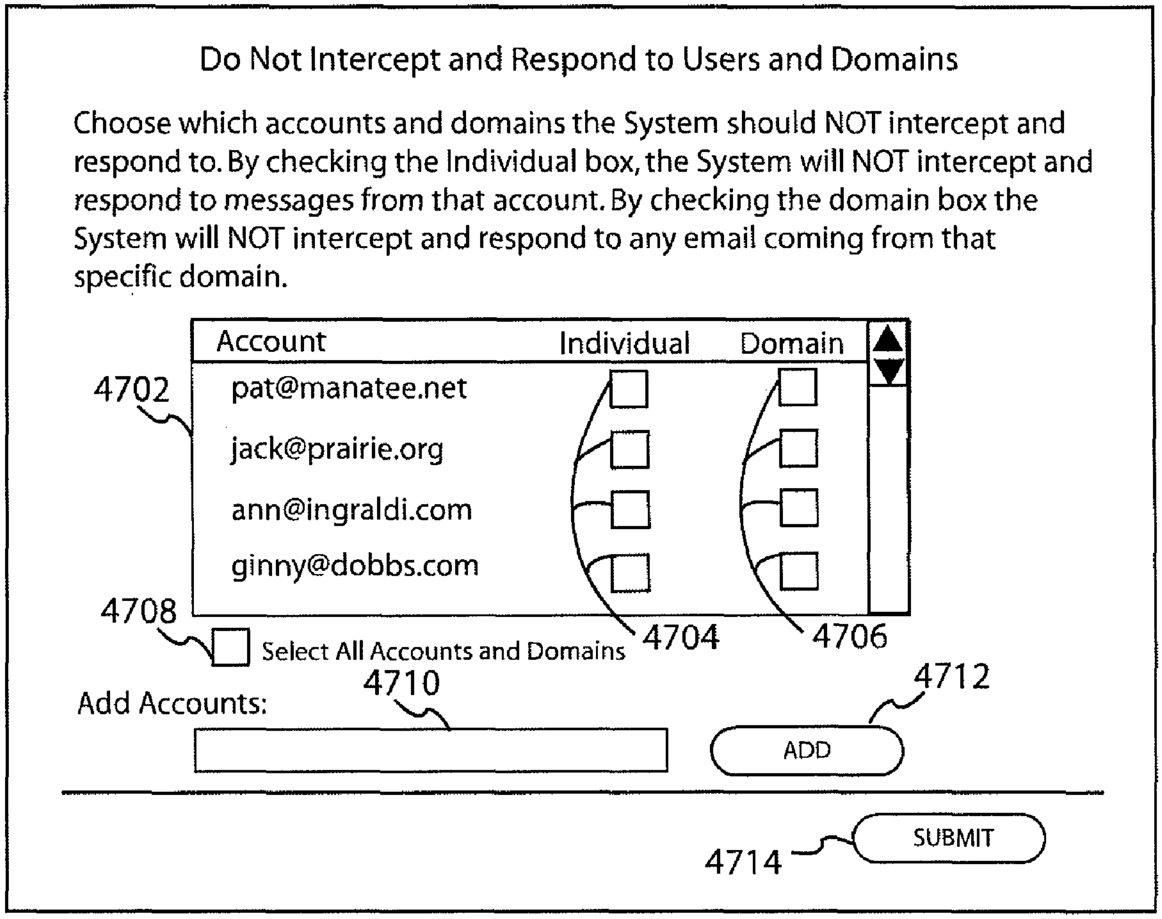

Do Not Intercept and Respond to Users and Domains

Choose which accounts and domains the System should NOT intercept and respond to. By checking the Individual box, the System will NOT intercept and respond to messages from that account. By checking the domain box the System will NOT intercept and respond to any email coming from that specific domain.

| Account | Individual | Domain |
|---|---|---|
| pat@manatee.net | ☐ | ☐ |
| jack@prairie.org | ☐ | ☐ |
| ann@ingraldi.com | ☐ | ☐ |
| ginny@dobbs.com | ☐ | ☐ |

4702   4704   4706

4708 ☐ Select All Accounts and Domains

Add Accounts: 4710      4712 ( ADD )

4714 ( SUBMIT )

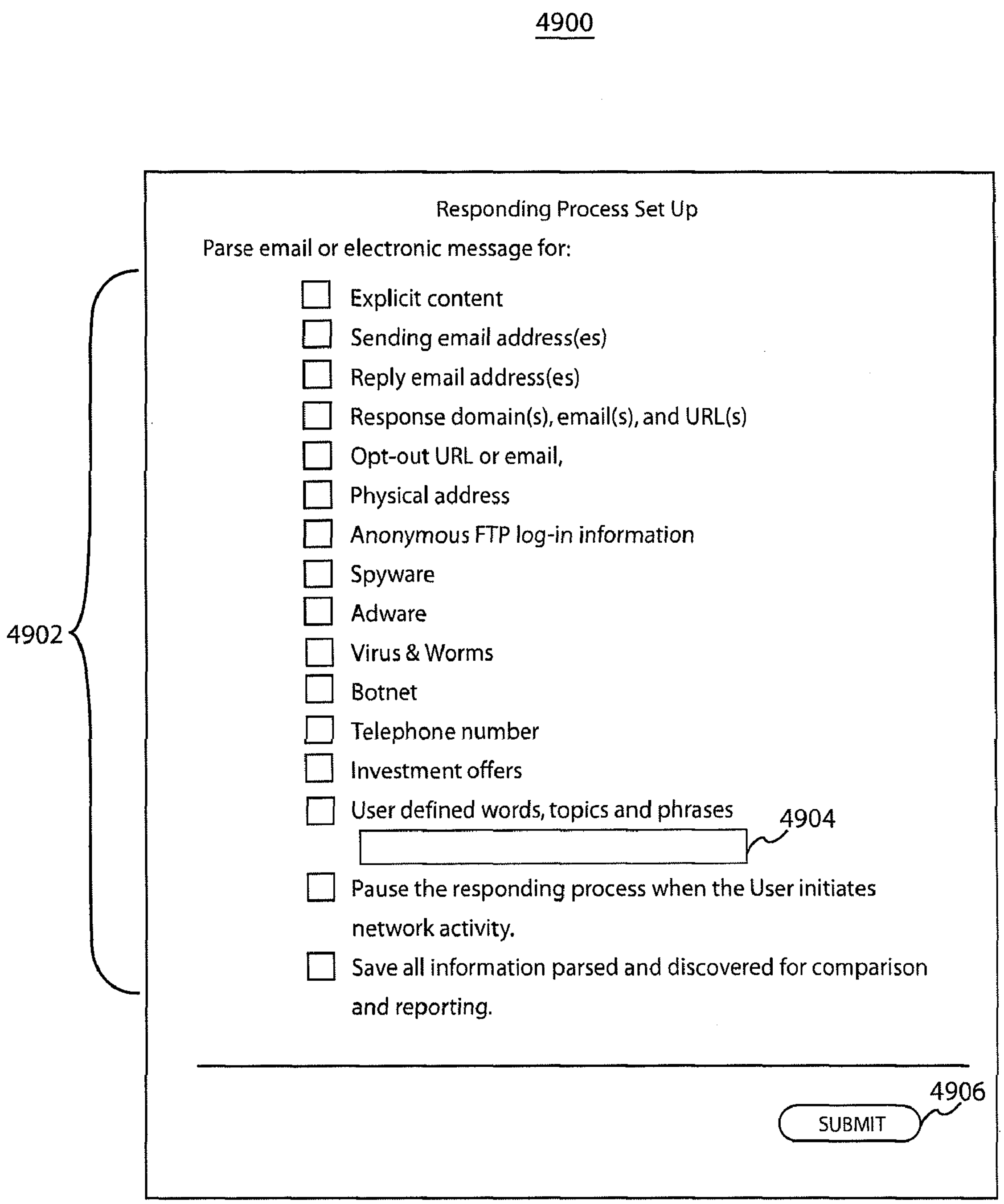

Responding Process Set Up

Parse email or electronic message for:

4902 {
- ☐ Explicit content
- ☐ Sending email address(es)
- ☐ Reply email address(es)
- ☐ Response domain(s), email(s), and URL(s)
- ☐ Opt-out URL or email,
- ☐ Physical address
- ☐ Anonymous FTP log-in information
- ☐ Spyware
- ☐ Adware
- ☐ Virus & Worms
- ☐ Botnet
- ☐ Telephone number
- ☐ Investment offers
- ☐ User defined words, topics and phrases  4904
  [_____]
- ☐ Pause the responding process when the User initiates network activity.
- ☐ Save all information parsed and discovered for comparison and reporting.

( SUBMIT ) 4906

5300

5600

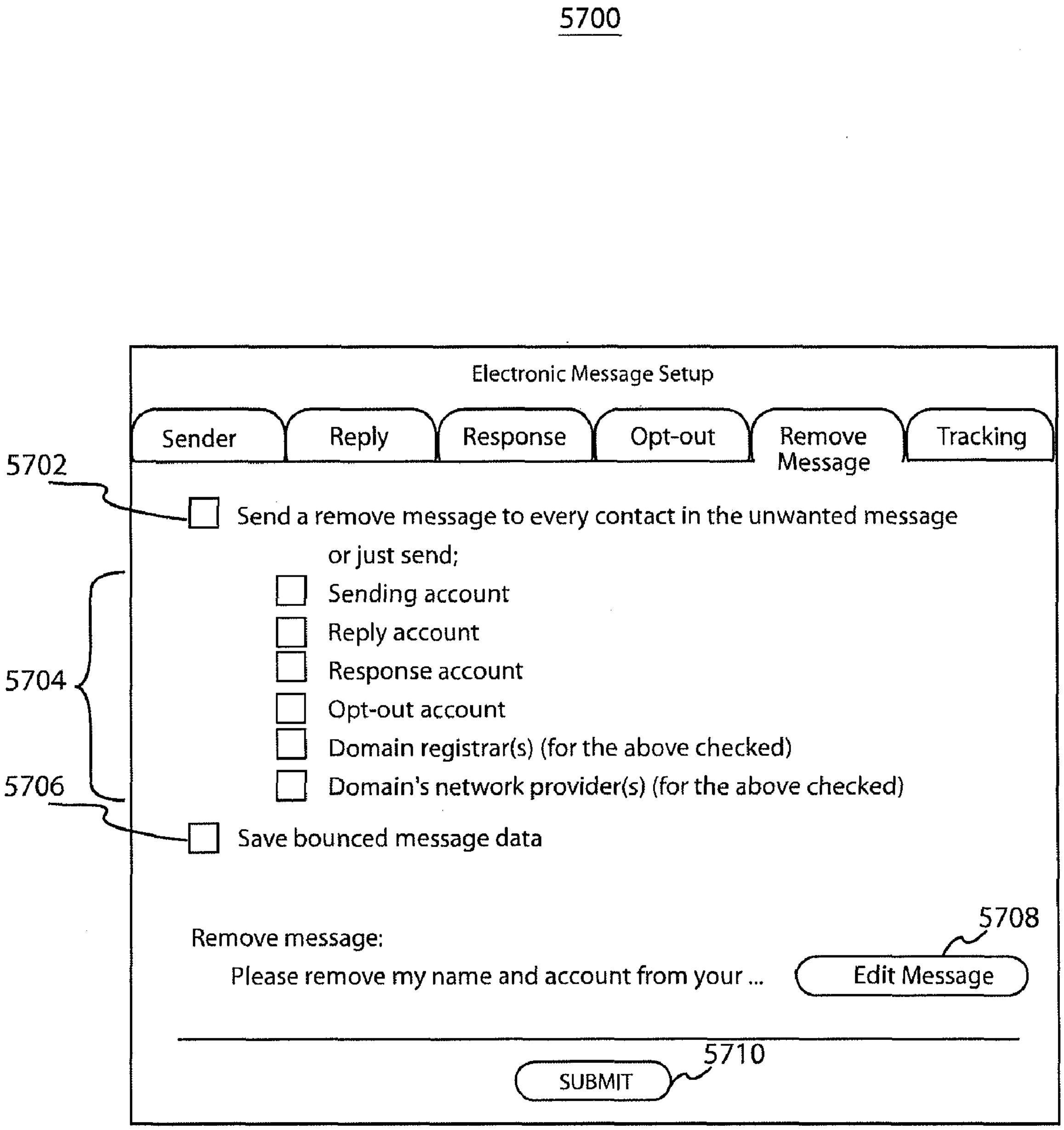

| Electronic Message Setup |
| Sender | Reply | Response | Opt-out | Remove Message | Tracking |

5702 → ☐ Send a remove message to every contact in the unwanted message or just send;

5704 {
☐ Sending account
☐ Reply account
☐ Response account
☐ Opt-out account
☐ Domain registrar(s) (for the above checked)
☐ Domain's network provider(s) (for the above checked)
}

5706 → ☐ Save bounced message data

Remove message:
Please remove my name and account from your ...   (Edit Message) 5708

(SUBMIT) 5710

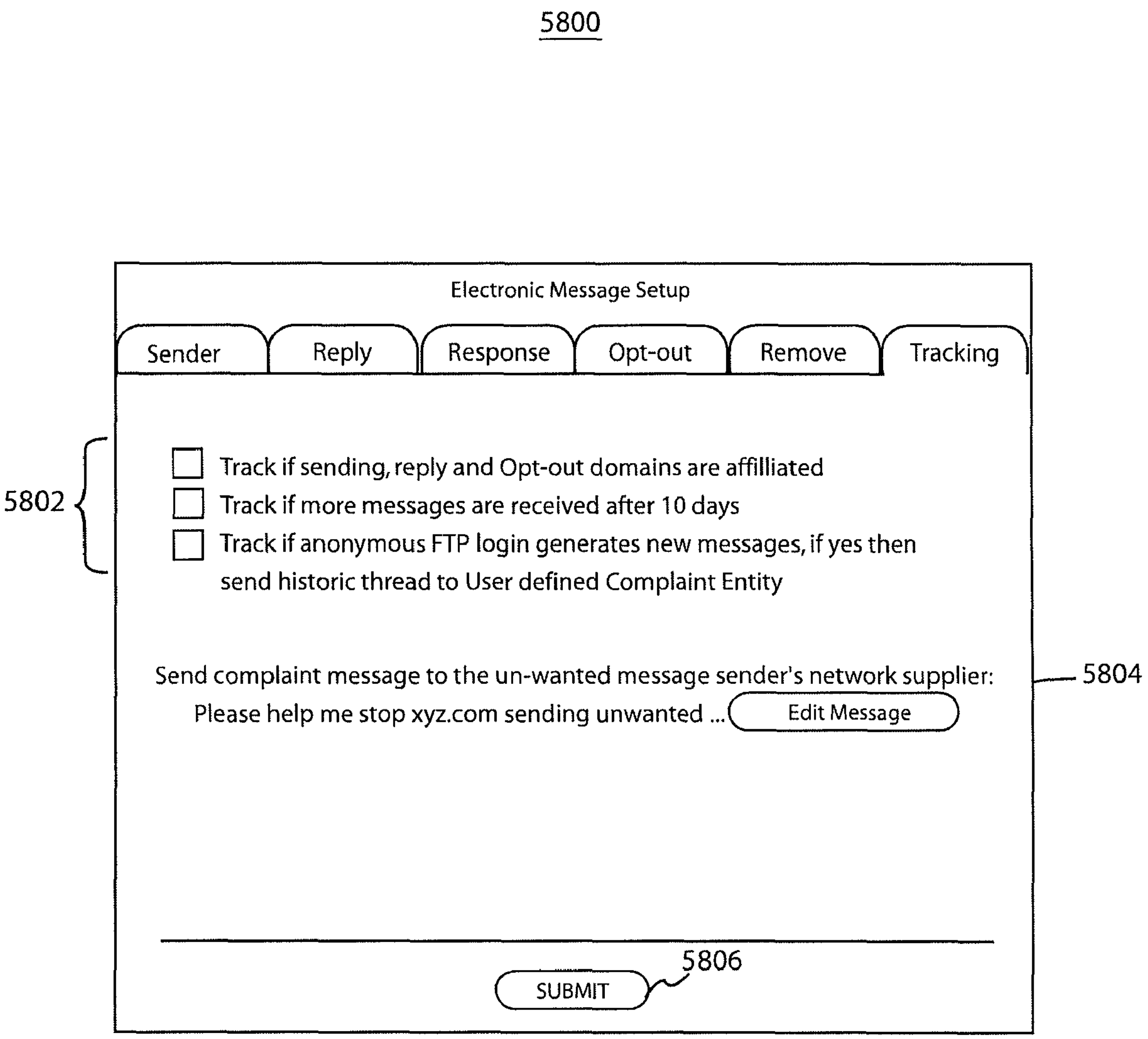

Electronic Message Setup

| Sender | Reply | Response | Opt-out | Remove | Tracking |

5802
- ☐ Track if sending, reply and Opt-out domains are affilliated
- ☐ Track if more messages are received after 10 days
- ☐ Track if anonymous FTP login generates new messages, if yes then send historic thread to User defined Complaint Entity Send complaint message to the un-wanted message sender's network supplier: — 5804
Please help me stop xyz.com sending unwanted ... ( Edit Message )

( SUBMIT ) 5806

6100

6200

6500

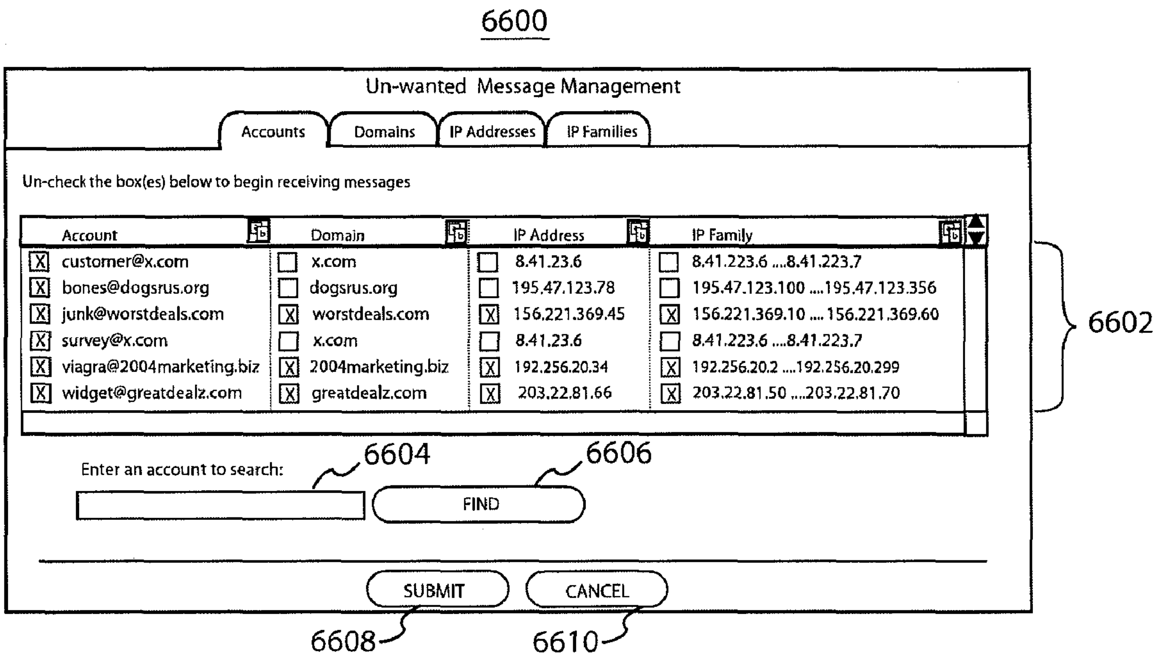

Figure 66

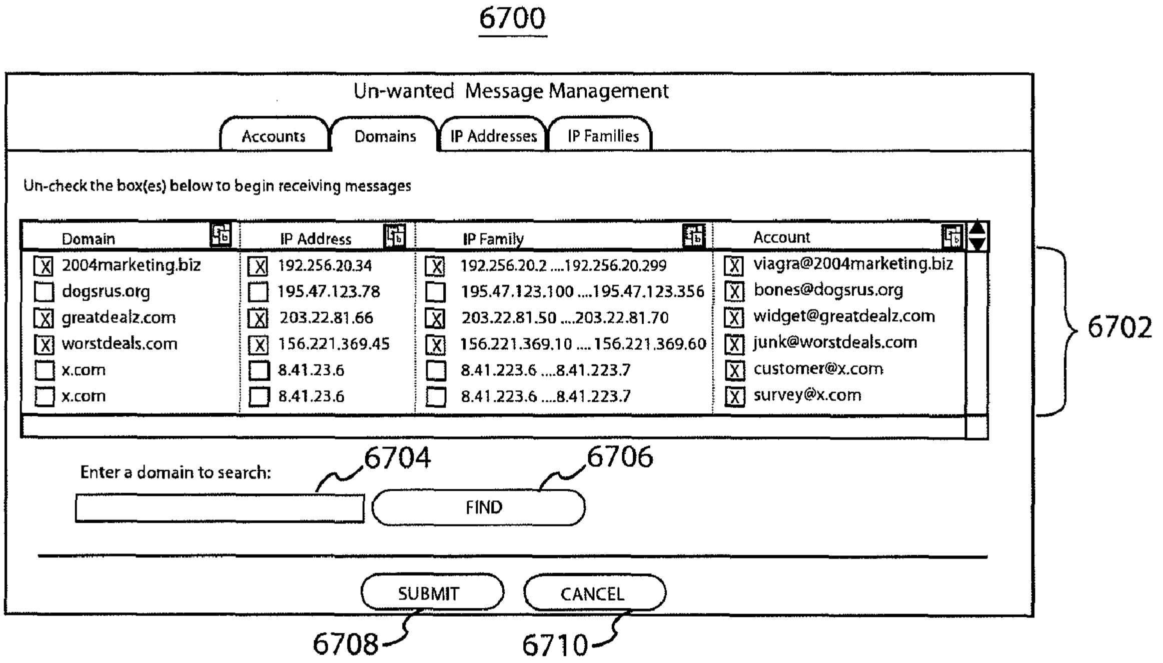

| Un-wanted Message Management |
| --- |

| Accounts | Domains | IP Addresses | IP Families |

Un-check the box(es) below to begin receiving messages

| Account | Domain | IP Address | IP Family |
| --- | --- | --- | --- |
| [X] customer@x.com | [ ] x.com | [ ] 8.41.23.6 | [ ] 8.41.223.6 ....8.41.223.7 |
| [X] bones@dogsrus.org | [ ] dogsrus.org | [ ] 195.47.123.78 | [ ] 195.47.123.100 ....195.47.123.356 |
| [X] junk@worstdeals.com | [X] worstdeals.com | [X] 156.221.369.45 | [X] 156.221.369.10 .... 156.221.369.60 |
| [X] survey@x.com | [ ] x.com | [ ] 8.41.23.6 | [ ] 8.41.223.6 ....8.41.223.7 |
| [X] viagra@2004marketing.biz | [X] 2004marketing.biz | [X] 192.256.20.34 | [X] 192.256.20.2 ....192.256.20.299 |
| [X] widget@greatdealz.com | [X] greatdealz.com | [X] 203.22.81.66 | [X] 203.22.81.50 ....203.22.81.70 |

} 6602

Enter an account to search: 6604    6606
FIND

SUBMIT     CANCEL
6608       6610

6700

| Un-wanted Message Management |
| --- |

| Accounts | Domains | IP Addresses | IP Families |

Un-check the box(es) below to begin receiving messages

| Domain | IP Address | IP Family | Account |
| --- | --- | --- | --- |
| [X] 2004marketing.biz | [X] 192.256.20.34 | [X] 192.256.20.2 ....192.256.20.299 | [X] viagra@2004marketing.biz |
| [ ] dogsrus.org | [ ] 195.47.123.78 | [ ] 195.47.123.100 ....195.47.123.356 | [X] bones@dogsrus.org |
| [X] greatdealz.com | [X] 203.22.81.66 | [X] 203.22.81.50 ....203.22.81.70 | [X] widget@greatdealz.com |
| [X] worstdeals.com | [X] 156.221.369.45 | [X] 156.221.369.10 ....156.221.369.60 | [X] junk@worstdeals.com |
| [ ] x.com | [ ] 8.41.23.6 | [ ] 8.41.223.6 ....8.41.223.7 | [X] customer@x.com |
| [ ] x.com | [ ] 8.41.23.6 | [ ] 8.41.223.6 ....8.41.223.7 | [X] survey@x.com |

} 6702

Enter a domain to search: 6704   6706
FIND

SUBMIT     CANCEL
6708       6710

6800

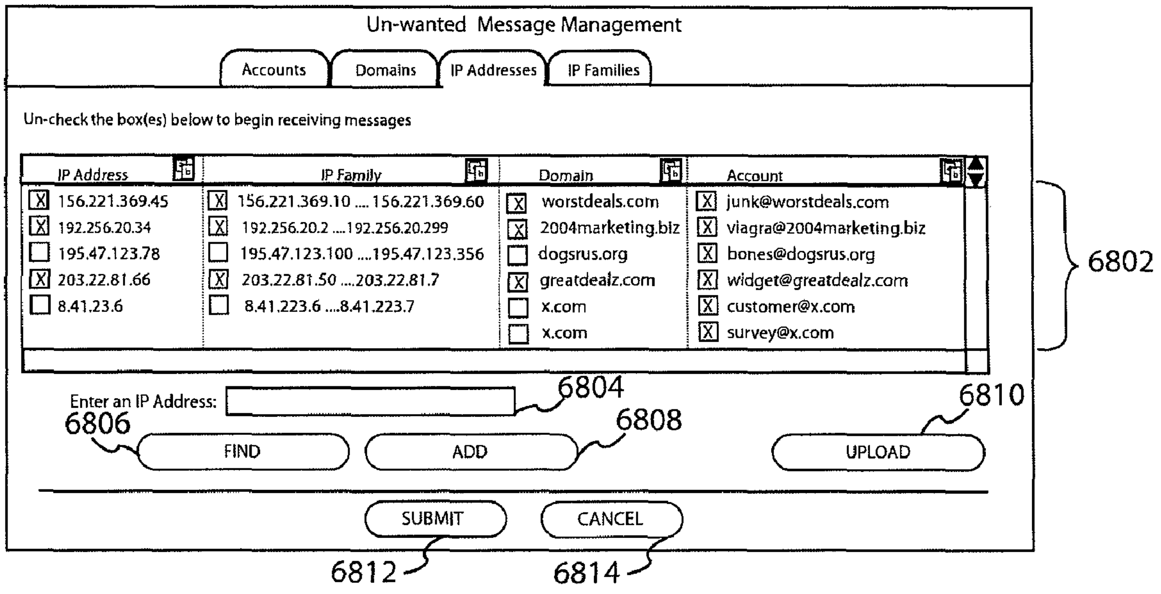

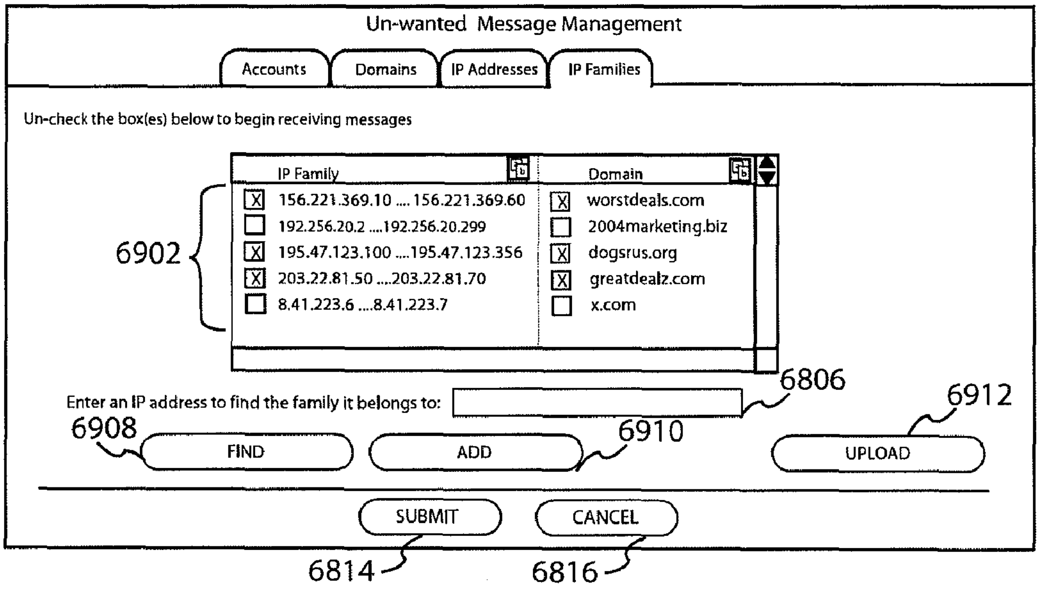

Un-wanted Message Management

| Accounts | Domains | IP Addresses | IP Families |

Un-check the box(es) below to begin receiving messages

| IP Address | IP Family | Domain | Account |
|---|---|---|---|
| [X] 156.221.369.45 | [X] 156.221.369.10 .... 156.221.369.60 | [X] worstdeals.com | [X] junk@worstdeals.com |
| [X] 192.256.20.34 | [X] 192.256.20.2 ....192.256.20.299 | [X] 2004marketing.biz | [X] viagra@2004marketing.biz |
| [ ] 195.47.123.78 | [ ] 195.47.123.100 ....195.47.123.356 | [ ] dogsrus.org | [X] bones@dogsrus.org |
| [X] 203.22.81.66 | [X] 203.22.81.50 ....203.22.81.7 | [X] greatdealz.com | [X] widget@greatdealz.com |
| [ ] 8.41.23.6 | [ ] 8.41.223.6 ....8.41.223.7 | [ ] x.com | [X] customer@x.com |
| | | [ ] x.com | [X] survey@x.com |

6802

Enter an IP Address: [          ] 6804

6806  FIND    ADD 6808          UPLOAD 6810

SUBMIT   CANCEL
6812    6814

6900

Un-wanted Message Management

| Accounts | Domains | IP Addresses | IP Families |

Un-check the box(es) below to begin receiving messages

| IP Family | Domain |
|---|---|
| [X] 156.221.369.10 .... 156.221.369.60 | [X] worstdeals.com |
| [ ] 192.256.20.2 ....192.256.20.299 | [ ] 2004marketing.biz |
| [X] 195.47.123.100 ....195.47.123.356 | [X] dogsrus.org |
| [X] 203.22.81.50 ....203.22.81.70 | [X] greatdealz.com |
| [ ] 8.41.223.6 ....8.41.223.7 | [ ] x.com |

6902

Enter an IP address to find the family it belongs to: [          ] 6806

6908  FIND   ADD 6910          UPLOAD 6912

SUBMIT   CANCEL
6814    6816

7000

7100

Join Special Interest Community Setup (?)

Select from the following special interest list subjects you want to receive information about – anonymously:

| Subject | Select | Days | Start | Stop |
|---|---|---|---|---|
| Antiques | X | Monday ▼ | 5:00 PM ▼ | 9:00 PM ▼ |
| Cellular Phones | ☐ | None ▼ | 0:00 AM ▼ | 0:00 AM ▼ |
| Computers | X | Daily ▼ | 9:00 AM ▼ | 5:00 PM ▼ |
| Credit Cards | ☐ | None ▼ | 0:00 AM ▼ | 0:00 AM ▼ |
| Drugs/Medical | ☐ | None ▼ | 0:00 AM ▼ | 0:00 AM ▼ |
| Investments | ☐ | None ▼ | 0:00 AM ▼ | 0:00 AM ▼ |

} 7102

SUBMIT — 7104

ELECTRONIC MESSAGE RESPONSE AND REMEDIATION SYSTEM AND METHOD

REFERENCE TO RELATED APPLICATION

This application claims the benefit of U.S. Provisional Patent Application Ser. No. 60/634,636, filed Dec. 8, 2004, entitled "Electronic Message Response and Remediation System," the entire disclosure of which is hereby incorporated by reference.

BACKGROUND OF THE INVENTION

The advent and rise of electronic messaging and the Internet has been accompanied by the rise of "spam" or "junk mail", computer viruses, spyware, adware, worms, botnets and other malicious software capable of being delivered by email or other electronic messages, as well as unwanted explicit material, received.

Unsolicited message originators and those who produce malicious code typically attempt to hide their identities when they distribute email or code. Instead of generating messages directly from an easily-traced account at a major Internet provider, they may, for instance, send their mail from a spam-friendly network, using forged headers, and relay the message through intermediate hosts.

It is thus desirable to provide a system and method that identifies, tracks and removes unwanted messages and malicious software, and to identify the network address the malicious software was received from.

Although laws pertaining to unwanted messaging have been enacted, enforcement of such laws is problematic; For example, although an unwanted message originator is supposed to provide an opt-out link for a user to indicate their desire to stop receiving email from a given source, some spammers provide the opt-out in a manner that is not easily usable to a human user.

Therefore, it is also desirable to provide a system and method that writes a message to the sending email domain's web server log or electronic content repository log, and requests that no further messages be sent to the user.

It is also desirable to provide a system and method that writes a message to the reply email domain's web server log or electronic content repository log and requests that no further messages be sent to the user.

It is also desirable to provide a system and method that writes a message to the response web site(s)' web server log or electronic content repository(s)' log and requests that no further messages be sent to the user.

SUMMARY OF THE INVENTION

One aspect of the present invention provides a method relating to responding to an incoming electronic message. The method includes determining whether the incoming electronic message is relevant or irrelevant to a user, and, if the incoming electronic message is irrelevant to the user, parsing the incoming electronic message for message origination information and replying to the message based on the message origination information.

Another aspect of the invention includes using a user profile containing information regarding relevant and irrelevant messages in determining whether the incoming electronic message is relevant or irrelevant.

In a further aspect of the invention, the message origination information parsed includes one or more of: a sending email address, a sending email domain, a unique message identifier, a reply email address, a reply email domain, a response domain, a response email, a response URL, an opt out URL, an opt out email, and an anonymous FTP login for message image, physical address and telephone numbers.

In an aspect of the invention, the determining and parsing steps are performed as the incoming electronic messages are received.

In another aspect of the invention, the determining and parsing steps are performed at a time other than when the incoming electronic message is received.

Another aspect of the invention includes the method described above, and further includes sending one or more electronic messages to a relevant third party entity in accordance with a user configuration, the one or more electronic messages relating to the incoming electronic message.

In another aspect of the invention, the relevant third party the relevant third party entity is a government entity.

Another aspect of the invention includes the method described above, and further includes identifying, tracking variants, and removing any software that records a user's keystrokes, displays banners or other computer advertising, or reports the user's behavior to a third party.

Another aspect of the invention includes the method described above, and further includes identifying the network address the software was received from and any network address the user information is being sent to.

In an aspect of the invention, the above described method further includes identifying, tracking and removing software that enables a user's computer to be controlled remotely.

In another aspect of the present invention, the above described method further includes measuring and capturing sender suggested content for the user to review at a time convenient to the user.

Another aspect of the invention includes measuring the time it takes for an electronic packet to be sent and subsequently received by the user.

An embodiment of the present invention includes tracing the route to a sender of the incoming electronic message. In an aspect of the invention, the sending web server is contacted using the message origination information.

In a preferred embodiment of the invention, if the sending web server is unable to respond, the method described above further includes continuing to attempt contacting the sending web server after a time interval defined by the user.

In another aspect of the present invention, the above described method further includes writing a message to a sending email domain's web server log requesting that no further messages be sent to the user and tracking a sender's compliance with the request.

Another aspect of the invention includes the method described above, and additionally includes sharing information regarding irrelevant messages with other users by the user. In a further aspect of the invention, the sharing is performed using a peer-to-peer file system and grid architecture.

In another aspect of the present invention, the above described method further includes the sharing by the user of information regarding the irrelevant messages with one or more super nodes on a network.

Another aspect of the present invention provides a message response system. The message response system includes an electronic message receiver node, which includes a processor operably connected to a computer memory and a network communication device. The processor and memory are configured to operate the network communication device and to receive at least one message over the network communication device. The network communication device is also in communication with a network. The electronic message receiver node is associated with a user. The processor and memory are further configured to perform the steps of determining whether the at least one message is relevant or irrelevant to the user, and if the message is irrelevant, parsing the at least one message for message origination information.

In a further aspect of the present invention, the processor and memory perform the step of determining whether the at least one message is relevant or irrelevant to the user using a user profile containing information regarding relevant and irrelevant messages.

Another aspect of the invention includes the message response system as described above, in which the processor and memory are further configured to perform the step of contacting a sending web server using the message origination information.

In another aspect of the invention, the processor and memory are further configured to continue to attempt contacting the sending web server after a time interval defined by the user if the sending web server is unable to respond.

Another aspect of the present invention provides a message response system as described above, in which the processor and memory are further configured to write a message to a sending email domain's web server log requesting that no further messages be sent to the node, and track a sender's compliance with the request.

In another aspect of the invention, the processor and memory are further configured to share information regarding irrelevant messages with other nodes or super nodes on the network. In one embodiment, the sharing is performed using a peer-to-peer file system and grid architecture.

Another aspect of the present invention provides a marketing subscription system, including a marketing subscriber having special interest marketing messages, a user node including a user-selected set of special interest messages a user would like to anonymously receive, and a requested message subscription super node in communication with the user node and the marketing subscriber. The super node is configured to receive the user-selected set of special interest messages the user would like to anonymously receive, and accept special interest marketing messages matching the user-selected set from the marketing subscriber, and anonymously pass the matching messages to the user node.

Another aspect of the invention provides the marketing subscription system described above, and further includes a payment gateway. The payment gateway is in communication with the marketing subscriber and the message subscription super node, and is configured to block or prevent the acceptance of the matching messages by the message subscription super node if the marketing subscriber has not paid a subscription fee. If the marketing subscriber has paid the subscription fee, the payment gateway then allows the acceptance of the matching messages by the message subscription super node.

Another aspect of the present invention provides message response software. The message response software includes user node software. The user node software is operable to receive an incoming electronic message, determine whether the incoming electronic message is relevant or irrelevant to a user, and parse the incoming electronic message for message origination information if the incoming electronic message is irrelevant to the user.

In another aspect of the invention, the user node software is further operable to contact a sending web server using the message origination information, and, if the sending web server is unable to respond, continue to attempt contact the sending web server after a time interval defined by the user.

BRIEF DESCRIPTION OF THE DRAWINGS

FIG. 42 is an exemplary user interface screen for user registration in accordance with an embodiment of the present invention;

FIG. 43 is an exemplary user interface screen for a user to indicate recipients of complaint messages in accordance with an embodiment of the present invention;

FIG. 47 is an exemplary user interface screen for user selection of individual accounts and domains to not respond to messages from in accordance with an embodiment of the present invention;

FIG. 49 is an exemplary user interface screen for user selection of set up parameters for the responding process in accordance with an embodiment of the present invention;

FIG. 57 is an exemplary user interface screen for user setup of electronic message reply to remove email links in accordance with an embodiment of the present invention;

FIG. 58 is an exemplary user interface screen for user setup of electronic message tracking in accordance with an embodiment of the present invention;

FIG. 66 is an exemplary user interface screen for user setup and management of unwanted messages from selected accounts in accordance with an embodiment of the present invention;

FIG. 67 is an exemplary user interface screen for user setup and management of unwanted messages from selected domains in accordance with an embodiment of the present invention;

FIG. 68 is an exemplary user interface screen for user setup and management of unwanted messages from selected IP addresses in accordance with an embodiment of the present invention;

FIG. 69 is an exemplary user interface screen for user setup and management of unwanted messages from selected IP families in accordance with an embodiment of the present invention;

DETAILED DESCRIPTION

Figure 1:
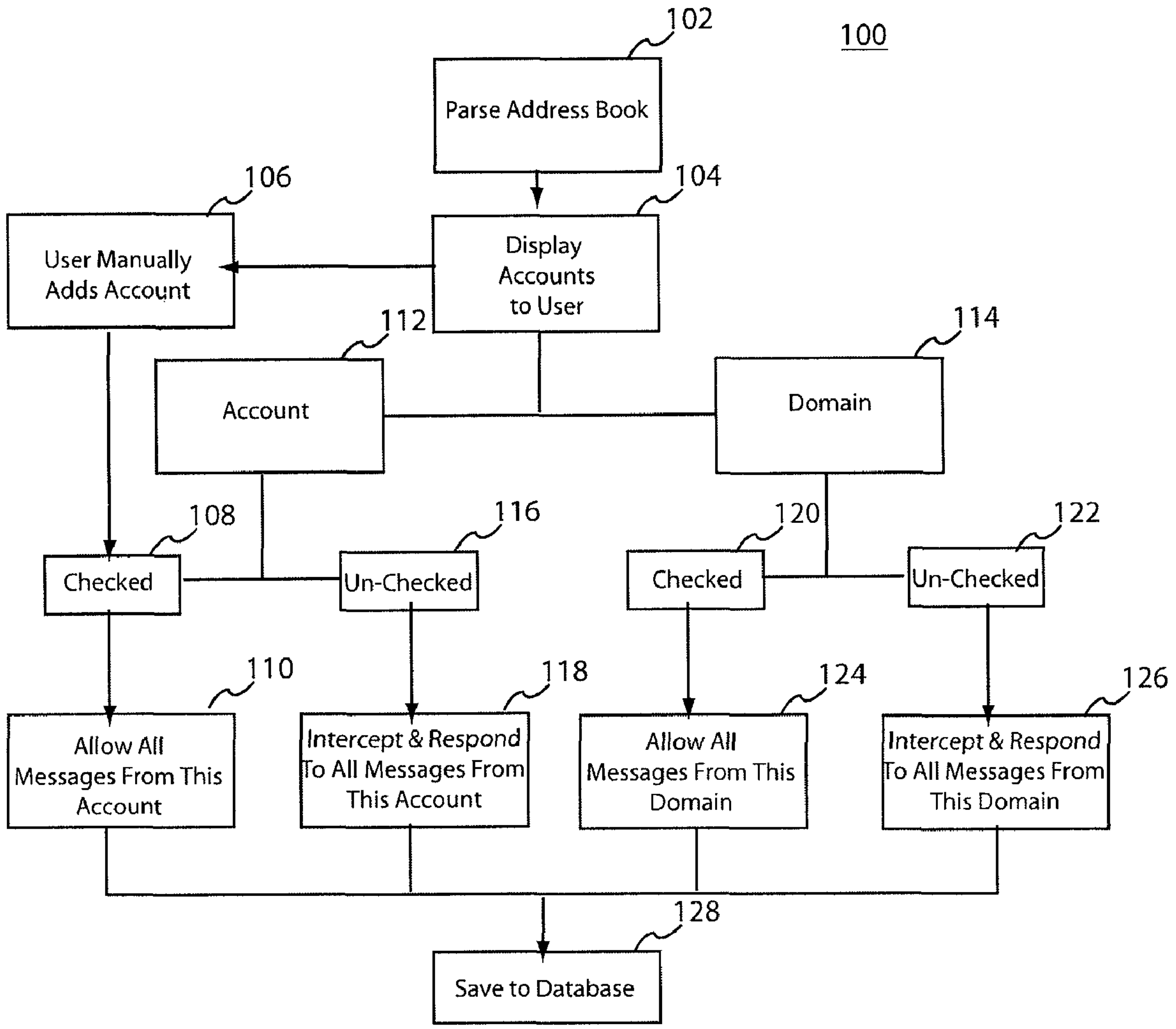
FIG. 1 is a flowchart of an exemplary process for parsing an electronic contact(s) or address book in accordance with an embodiment of the present invention.

"User" as used herein defines any entity having the ability to receive messages over a system designed or modified to receive such messages. An example of a user is a natural human person.

An embodiment of the present invention advantageously provides users the ability to individually choose which electronic messages are relevant and non-relevant. Unwanted messages are herein also considered as non-relevant messages.

Certain embodiments of the present invention advantageously provide a system and method that responds to user-defined non-relevant electronic messages by parsing the electronic messages for user-selected information, such as but not limited to explicit content and message origination information, including sending email addresses or other sending electronic addresses, sending email domains or unique message identifiers, reply email addresses or other reply electronic addresses, reply email domains or unique message identifiers, response domains, emails, URLs, or other electronic addresses or unique message identifiers. Additionally, the system and method optionally parses for opt out URL, email and other electronic addresses and anonymous FTP log-ins for message images, physical addresses and telephone numbers as the electronic messages are received or at a later time in accordance with the user's preference or available communication and machine resources.

Certain embodiments of the present invention permits a user to send electronic messages to relevant governmental and non-governmental entities relating to the electronic messages received by the user, by referencing the user postal code or by the user directly inputting specific electronic addresses or by other means.

Certain embodiments of the present invention advantageously provide a system and method that identifies, tracks specific variants and removes malicious software that may record the user's keystrokes, display banners and other computer based advertising, or report the user's behavior to known or unknown third parties. In certain embodiments, the network address the malicious software was received from and the network address or other unique identifiers that user information is being sent to are identified.

An embodiment of the present invention further advantageously provides a system and method that identifies, tracks specific variants and removes malicious software that enables a user's machine to be controlled remotely, to perform an attack on another computer or to send out email and other electronic messages without the user's knowledge. In certain embodiments, the network address the malicious software was received from is identified. In an embodiment, controller's network address or other unique identifiers that information is being sent to and received from are tracked.

Certain embodiments of the present invention advantageously provide a system and method that measures and captures sender suggested content for the user to review at a time convenient to the user. In certain embodiments, a system and method are advantageously provided for measuring the time it takes for an electronic packet to be sent and subsequently received by a user's machine, and tracing the route to the electronic message sender and response destinations.

Certain embodiments of the present invention advantageously provide a system and method that contacts the sender's web server and or electronic content repository(s) at the electronic address supplied by the sender and subsequent electronic links on the senders supplied destination URL and or electronic network address(s). In an embodiment, if the sender supplied web server(s) and or electronic content repository(s) is unable to respond, the system automatically continues to attempt to retrieve the sender offered information at a user defined interval and time period.

Certain embodiments of the present invention advantageously provide a system and method that writes a message to the sending email domain's web server log or electronic message's unique identifier's electronic content repository log, and requests that no further messages be sent to the user. In an embodiment, the sender's compliance with such a request is tracked.

Certain embodiments of the present invention advantageously provide a system and method that writes a message to the reply email domain's web server log or electronic message's unique identifier's electronic content repository log and requests that no further messages be sent to the user. In an embodiment, the sender's compliance with such a request is tracked.

Certain embodiments of the present invention advantageously provide a system and method that writes a message to the response web site(s)' web server log or electronic content repository(s)' log and requests that no further messages be sent to the user. In an embodiment, the sender's compliance with such a request is tracked.

Certain embodiments of the present invention advantageously provide a system and method that can be user configured to telephone the response telephone number included in a non-relevant message and deliver a message requesting that no further messages be sent to the user. In an embodiment, the sender's compliance with such a request is tracked.

Certain embodiments of the present invention advantageously provide a client version of the system and methods herein described for narrow band Personal Digital Assistants (PDAs) and cellular telephones. In an embodiment, a client version is provided that is designed to gather information as described above and then either automatically or manually transfer the message information to a broadband and/or wired device equipped with the systems and methods described herein.

Certain embodiments of the present invention advantageously provide a system and method that queries the global root DNS server system and other controlling electronic message systems to determine the machines, locations and companies that are sending or facilitating the sending of non-relevant messages.

Certain embodiments of the present invention advantageously provide a system and method that provides the user a full suite of reports documenting the receipt and disposition of any non-relevant electronic message received and or responded to.

Certain embodiments of the present invention advantageously provide a system and method that allows for automatic updating of client software at pre-defined time intervals or when requested by a user.

Certain embodiments of the present invention advantageously provide a system and method that allows the user to copy software and associated files comprising the system or methods for use on unlimited machines tied to specific email address(s) and or electronic addresses.

Certain embodiments of the present invention advantageously provide a system and method that can be run in a propriety operating system that runs on top of Microsoft Windows Operating System or other client operating systems as an application in a propriety or non-propriety programming language using propriety and or non-propriety data encryption formats.

Certain embodiments of the present invention advantageously provide a system and method that allows for the user to select and deselect specific unwanted message sender user accounts, domains, IP addresses, and IP families to either intercept and respond to or to stop the intercept and response to the same.

Certain embodiments of the present invention advantageously provide a system and method that allows each user to share relevant unwanted message information with other users using peer-to-peer file sharing and grid architectures. In an embodiment, each user is allowed to set a threshold based on other users' preferences, when to preemptively intercept sender messages, domains, IP address(s) and IP family(s) and other electronic unique identifiers.

In certain embodiments of the present invention, as each user chooses to intercept, respond to and classify specific unwanted messages, these choices are shared with Super Nodes on the network, which, in turn, share the aggregate information with other Super Nodes and Nodes. In an embodiment, each user is given the choice of becoming either a Node or Super Node and can switch from one to the other at the will of the user. In certain embodiments, file and data sharing and polling of both the Nodes and Super Nodes to facilitate information sharing and propagation between Nodes and Super Nodes is allowed.

The preferred methods and systems described herein can be realized without much additional special user training or instruction. Of course, some degree of planning and careful consideration in user specification of non-relevant messages and desired response to non-relevant messages is preferred.

An additional advantage provided by forms of the present invention is that the Super Nodes may act as primary repositories of related sender information to share with Nodes and other Super Nodes. In an embodiment, both Super Nodes and Nodes send and receive related sender account, domain, IP address and IP family aggregate data to Nodes and other Super Nodes.

In certain embodiments, as Super Nodes appear on the network they seek out other and the least busy Super Nodes to share information, update databases, look up tables and synchronize information with each other at user determined time intervals. In an embodiment, as Nodes appear on the network they seek out Super Nodes to share, update databases, look up tables and synchronize information with each other at user determined time intervals.

Another advantage afforded by certain preferred embodiments of the present invention is that Super Nodes may send gathered system data to Nodes for processing to facilitate the tabulation of system-wide response, intercept data and classification. In an embodiment, the gathered system data is collected and either tabulated by the Super Node or sent in data fragments to Nodes for tabulation and return to the related Super Nodes to create an aggregate system-wide response, intercept and classification data for distribution to Super Nodes and Nodes for system-wide propagation. Also in an embodiment, Super Nodes can act as repositories for the entire system-wide network and or portions of the repositories and individual elements.

In certain embodiments, users are given the option of adopting system-wide user population classifications, either by percentage and or quantities of aggregate data, dynamically add and or subtract sender account(s), domain(s), IP addresses and IP families for interception and response.

Certain embodiments of the present invention advantageously provide a system and method that allows a user to choose to receive, schedule or control special interest offers or messages on an anonymous basis.

Certain embodiments of the present invention advantageously provide a system and method that allows a user to set a threshold as to when to receive and stop receiving subscribed message senders' messages based on time or quantity of messages. In an embodiment, the message sender sends one message and the system in turn sends messages to subscribed users of the system using a peer-to-peer file sharing and grid architecture. In an embodiment, users can subscribe and unsubscribe at will.

Certain embodiments of the present invention advantageously provide a system and method that allows a user to input email or other electronic addresses allowing the user to create an original copy of any software comprising the system and method, and send such software using electronic or other means to other users email and or electronic addresses. Advantageously, this process allows new potential users the opportunity to become familiar with the system and method for a trial period and purchase, install, uninstall and use such software as designed.

Another advantage of embodiments of the present invention the incorporation of a marketing and re-selling function, wherein a unique user identifier is retained in all subsequent copied versions of any software comprising the system and method described herein for sales, distribution and compensation tracking.

Certain embodiments of the present invention advantageously provide a system and method that allows for potential re-sellers of the system to apply for re-seller status and choose from a variety of ways to be paid, such as in cash or premiums at the end of each selling period. In an embodiment, the re-seller is instructed to download a copy of system re-seller software in which the re-seller's unique re-seller identifier is embedded.

Certain embodiments of the present invention further advantageously provide for re-sellers to recruit and receive remuneration for the recruitment of new re-sellers by allowing potential new users to also become re-sellers. In an embodiment, re-sellers can freely distribute copies of any software comprising the system and method with their unique re-seller identifier embedded for potential new users to purchase and or potential new re-sellers to apply to distribute the system software.

In an embodiment of the present invention, a system and method designed to work with a variety of electronic software messaging systems and techniques including but not limited to email, instant messaging and short message services in wired and wireless environments is provided. In certain embodiments, the system and method can be applied to an individual client machine or to a private email server or other electronic message system.

In a preferred embodiment, users obtain software embodying the system and method of the invention for use on their personal computer or other electronic device. Such software, device, and communications are hereinafter understood to comprise the "system", and references to the "system" include but are not limited to these components.

In an embodiment, a user chooses which messages they consider as relevant and non-relevant, and the relevant and non-relevant user profile is saved to be applied in an automated fashion to future messages received.

In a preferred embodiment, users are in communicative connection with a network, such as the Internet. Any physical means of connecting the users to the network may be employed in the system. For example, users may connect to the Internet via a personal computer running Internet browser software and having a modem dialup; digital subscriber line (DSL), cable modem or satellite Internet connection. Users may also connect to a network via personal handheld devices, such as Blackberry™, or other wireless device, without limitation.

An exemplary embodiment of the inventive system includes user interface screens. Such user interface screens are generally useful for obtaining user input, such as user preferences and personalized messages, and for generating reports or information for the user. User interface screens provided herein, as well as the various flowcharts and schematic diagrams, are understood to be representative of embodiments of the invention, and they may be modified without deviating from the present invention.

In an embodiment, it is desirable for the user to register use of the system using a user interface screen for user registration 4200, such as that presented in FIG. 42. In an exemplary user registration screen, the user is presented with input edit fields for general information, such as their first name 4202, last name 4204 and postal code 4206. They may also be presented with the opportunity to add accounts to be protected 4208, and check boxes 4210 to indicate if the account belongs to a minor. In an embodiment, the user is also offered the opportunity to input the addresses of friends 4212 to whom they would recommend the system. The user's inputs are preferably processed when they select the submit button 4214 or other similar-functioning control.

In an embodiment, the user is also able to designate third parties to automatically receive an email message reporting complaints. An exemplary user interface screen for third party complaint messages 4300 is provided in FIG. 43. A complaint message may be provided automatically by the system, or the user may select to edit the complaint message by selecting the Edit message control 4302. For example, the automatically generated message may include the user's name, whereas the user does not wish to send this information. By selecting the Edit message control 4302, the user will be allowed to view and edit the message to be sent, which may be presented in a dialog box (not depicted).

The exemplary user interface screen for third party complaint messages 4300 preferably includes a listing of commonly-used third party recipients, with check boxes associated with each 4304. Selecting a check box and selecting the submit button 4310 will cause the system to send an email reporting each complaint to the third party recipient associated with that check box. Additionally, in an embodiment the user may input any email address 4308 to send the email to, by selecting the check box 4306 associated with the email address 4308 and selecting the submit button 4310.

Figure 44:
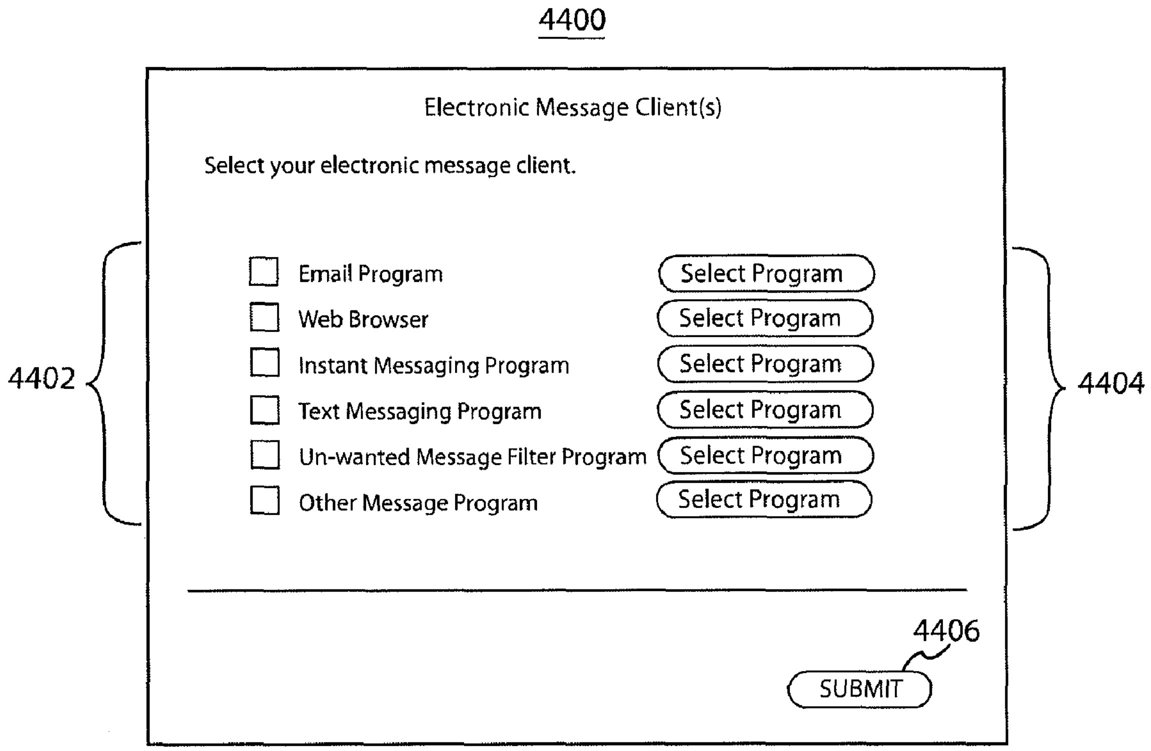
FIG. 44 is an exemplary user interface screen for user selection of electronic message clients in accordance with an embodiment of the present invention.

In an embodiment, the user is given the choice to choose what type of software they use to send and receive email or electronic messages. For example, the user may select email client programs, web browsers, instant messaging client, text messaging clients or other electronic messaging clients. FIG. 44 is an exemplary user interface screen for user selection of electronic message clients 4400. In an embodiment, the user is presented a listing 4402 of electronic message clients, each associated with a check box. By selecting its check box and the submit button 4406, the user instructs the system which electronic message client to use. Additionally, the listing 4402 of electronic message clients may associate a button 4404 for selecting the actual program to use as the electronic message client. Selecting the button preferably presents a dialog box to enable the user to select the electronic message client program to use. The selected program would then be used when the user presses the submit button 4406.

Figure 45:
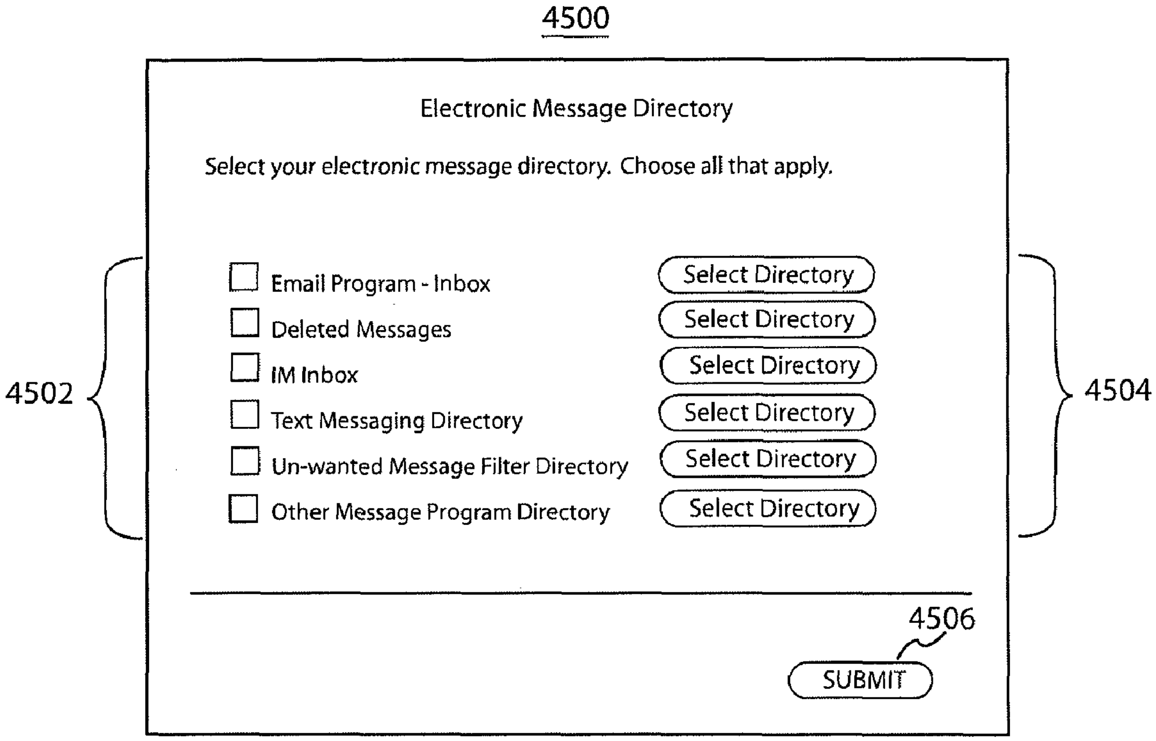
FIG. 45 is an exemplary user interface screen for user selection of an electronic message directory in accordance with an embodiment of the present invention.

In an embodiment of the present invention, the user is given the choice of which directories on the user's storage device(s) the system will parse. FIG. 45 is an exemplary user interface screen for user selection of an electronic message directory 4500 to parse. The user is presented with a listing 4502 of directories likely to store electronic messages, each directory associated with a check box and a "select directory" button 4504. Upon selection of a check box and the submit button 4506, the system parses the directory associated with the selected check box. In an embodiment, if there are more than one directories associated with the selected check box, the system will parse all of them. In an embodiment, the user may select the "select directory" button 4504 associated with a selected check box, and the user will then be presented with a choice of all directories corresponding with the selected check box. The user may then select the directories to parse and select the submit button 4506 for the system to begin parsing the directories.

A flowchart 100 of an exemplary process for parsing an electronic contact(s) or address book in accordance with an embodiment of the present invention is depicted in FIG. 1.

In an embodiment of the present invention, an address book or other object containing contact information is parsed 102 to identify individual accounts and domains, which are then displayed to the user 104. For example, the user may have an address book maintained by the user's email software, such as Microsoft's Outlook®. In an embodiment, the user may also be provided with means to manually add an account 106. The address book or other object parsed is preferably located in a directory chosen for system parsing by the user.

Preferably, a user interface is presented to the user listing each account or domain. For each account 112, the user may optionally check 108 or uncheck 116 a box, radio button, or other selection user interface control. All messages from checked accounts may then be allowed 110, whereas all messages from unchecked accounts may be intercepted and responded to 118, as described herein. In a similar way, the user may check 120 or uncheck 122 individual domains, and all the messages from checked domains may be allowed 124 whereas all the messages from unchecked domains may be intercepted and responded to 126.

A user interface screen for user selection of individual accounts and domains to not respond to messages from 4700 of an exemplary embodiment of the invention is presented in FIG. 47. The user interface screen 4700 includes a multi-columned selection area 4702 listing accounts, and having individual and domain check boxes 4704, 4706 associated with each account. Additional features of the user interface screen 4700 in an embodiment may include a selection control 4708 to allow the user to select all accounts and domains with a single selection, an edit field 4710 enabling a user to type in accounts to be added, an add button control 4712 to implement the addition of an account to be added, and a submit button control 4714 to finalize and actuate the user's selections on the user interface screen 4700. In an embodiment, checking the individual check box for an account 4704 and pressing the submit button control 4714 causes the system to not intercept and respond to the selected account henceforth. Similarly, checking the domain check box for an account 4706 and pressing the submit button control 4714 causes the system to not intercept and respond to any account from the domain of the selected account henceforth.

In an embodiment, the system allows for calling one or more message derived opt-out telephone numbers using either VOIP (Voice Over Internet Protocol) technology or traditional telephone network services. Preferably, the user may also choose to call toll free or numbers that incur a cost to the user. In an embodiment, the system blocks calls to pay-per-call numbers and "900" numbers, which incur an additional charge above and beyond the standard telephone company charges. The system may parse the entire message for text to voice communication, initiates the call, wait for an answer, announces that this telephone call is in response to an un-wanted electronic message that was received, the desire to opt-out and that the call is being recorded. Additionally, in an embodiment, the message will inform the receiver of the call, and that they will be given prompts to acknowledge the opt-out process at the end of the message.

In an embodiment, the system reads the entire electronic message to the receiver, asks the receiver to acknowledge that the un-wanted message originated from them, and prompts the receiver to acknowledge the telephone call opt-out process. If the receiver hangs before the opt-out call is completed, the system preferably redials according to user defined time settings or until completion of the entire call. In an embodiment, the system also saves the opt-out call information no matter what the outcome.

Figure 2:
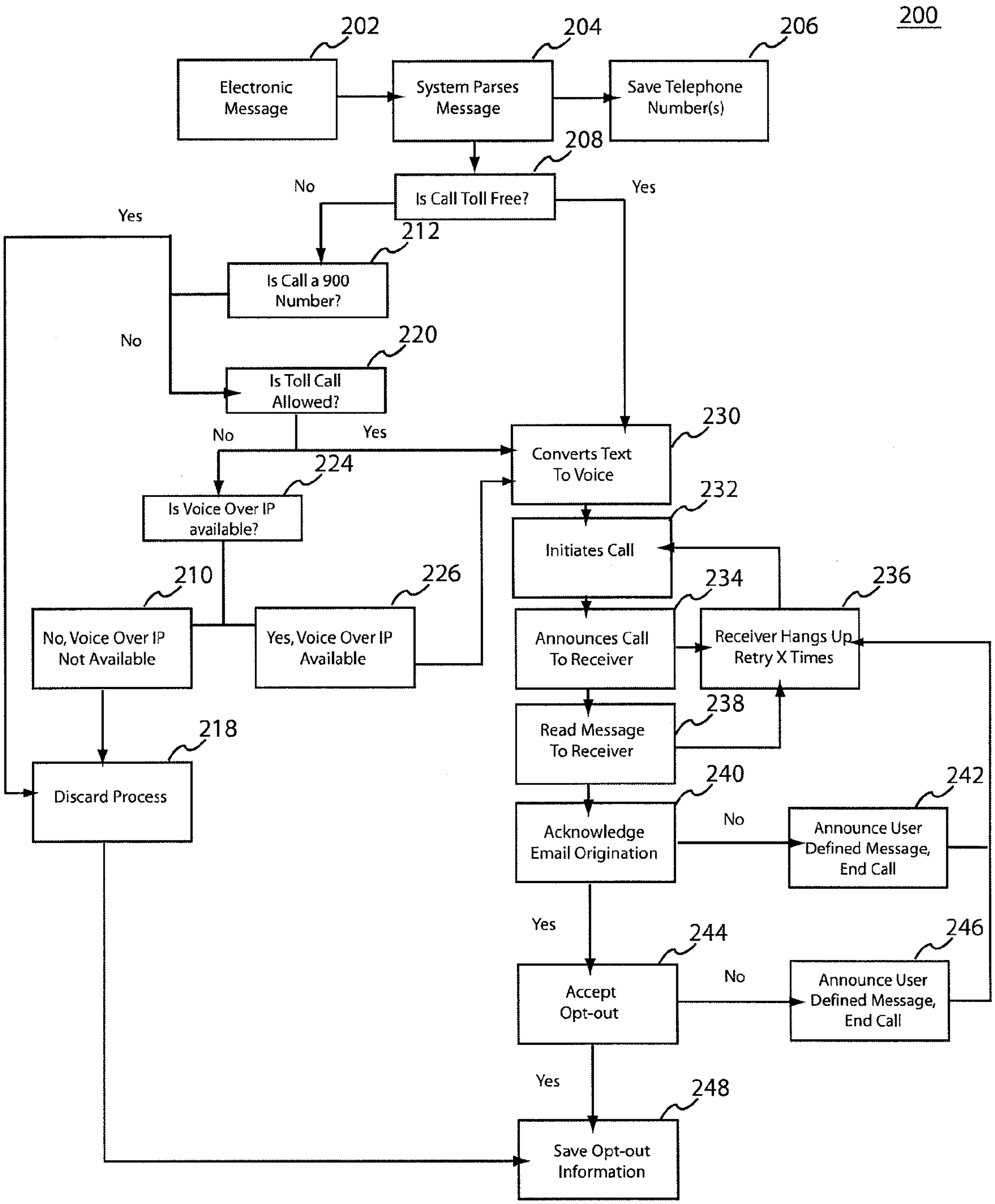
FIG. 2 is a flowchart of an exemplary process for extracting telephone number(s) from messages and responding to the messages at the telephone number(s) in accordance with an embodiment of the present invention.

A flowchart of an exemplary process 200 for extracting telephone number(s) from messages and responding to the messages at the telephone number(s) is presented in FIG. 2, which is herein described in greater detail. An electronic message 202 is parsed 204 to extract the telephone numbers, which are saved 206 by the system. Each extracted telephone number is then checked to determine whether a call to the telephone number is toll free 208.

If the call to the telephone number is toll free, the system converts the email message or a portion of the email message selected by the user to be sent into a voice format 230. This can be accomplished, for example, by standard commercially available text-to-voice software, such as IBM VIAVOICE® or using a custom text-to-voice converter in conjunction with the system. Next, the call to the toll free number is initiated 232, and the call is announced to the receiver 234. If the call is not received, the number is redialed (not depicted). Once the call is received and announced 234, the converted message is played to the receiver 238. If the receiver hangs up before the message is played, the call is attempted again 236. In an embodiment, the call may be attempted a user-defined number of times.

In an embodiment, if the receiver of the call does not acknowledge 240 that they are the originators of the email, then the system may announce a user-defined message and terminate the call.

In an embodiment, if the receiver of the call acknowledges 240 that they are the originators of the email, the receiver is given the opportunity to accept the user's opt-out option 244. If accepted, the opt-out information is preferably saved 248. Otherwise, if the receiver does not accept the user's opt-out option, a user-defined message is announced and the call is terminated 246, to be retried again 236.

In an embodiment, if the call to the telephone number is a "900" number call 200 or its equivalent—a call requiring the caller to pay for the duration of the call, the process is terminated 218 and a record is saved 248. If the call is not a "900" number, but instead a normal toll call, the system determines whether the toll call is allowed 220 on the user's telephone system. For example, some commercial telephone systems are set up to block outgoing toll calls. If the toll call is allowed, the system preferably proceeds to step of converting the message the user wants to send into a voice format 230, and proceeds as described above. Otherwise, in an embodiment, if the toll call is not allowed, the system checks to determine whether VOIP is available 224. If VOIP is available, the system proceeds to the converting step 230 as above, placing the telephone call over via VOIP. If VOIP is not available 210, the process is terminated 218 and a record is saved 248.

Figure 46:
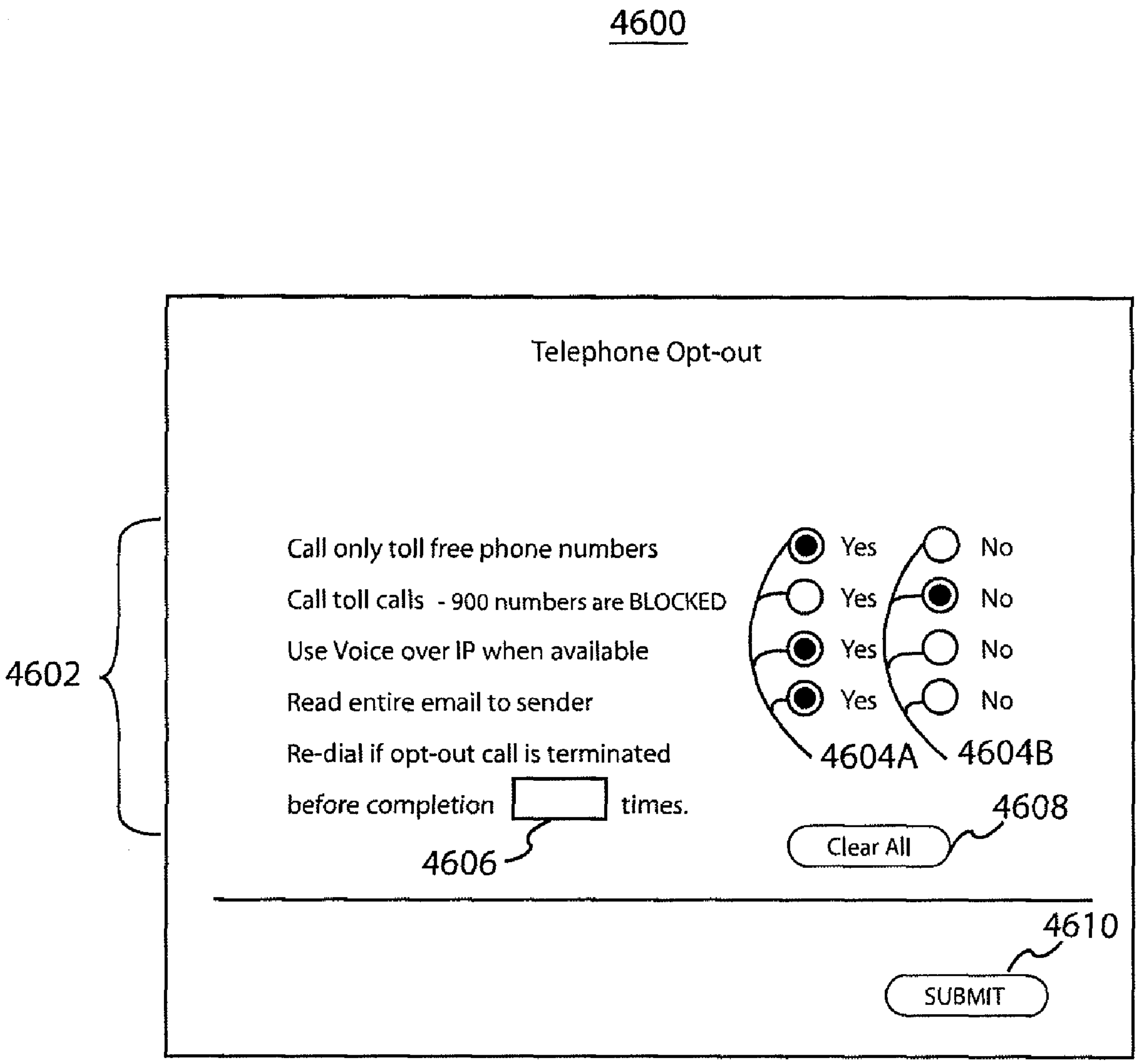
FIG. 46 is an exemplary user interface screen for user selection of telephone opt-out parameters in accordance with an embodiment of the present invention.

In an embodiment, the user is presented with a user interface screen 4600 for user selection of telephone opt-out parameters 4602, such as that depicted in FIG. 46. Using this user interface screen 4600, the user may select radio buttons 4604A, 4604B for several telephone opt-out options, and may specify the number of redials 4606 before terminating the telephone opt-out process. For example, in an embodiment, the telephone opt-out user interface screen may have radio buttons 4604A, 4604B for whether only toll free numbers are to be called, whether "900" numbers are blocked, whether VOIP should be used if available, and whether the entire email should be read to the sender. The user selections are preferably not implemented by the system until a submit button 4610 is selected, and may be cleared by selection of a clear all button 4608.

In an embodiment of the invention, the system can be user configured not to respond if more than a user defined amount of un-wanted messages come from any domain(s) in a user defined time frame. Also in an embodiment, if more than a user defined amount of un-wanted messages directs the user to any domain(s) in a user defined time frame, or if a domain that was sent abuse or complaint message sends a reply email or message, the system will intercept, but will not respond.

Figure 48:
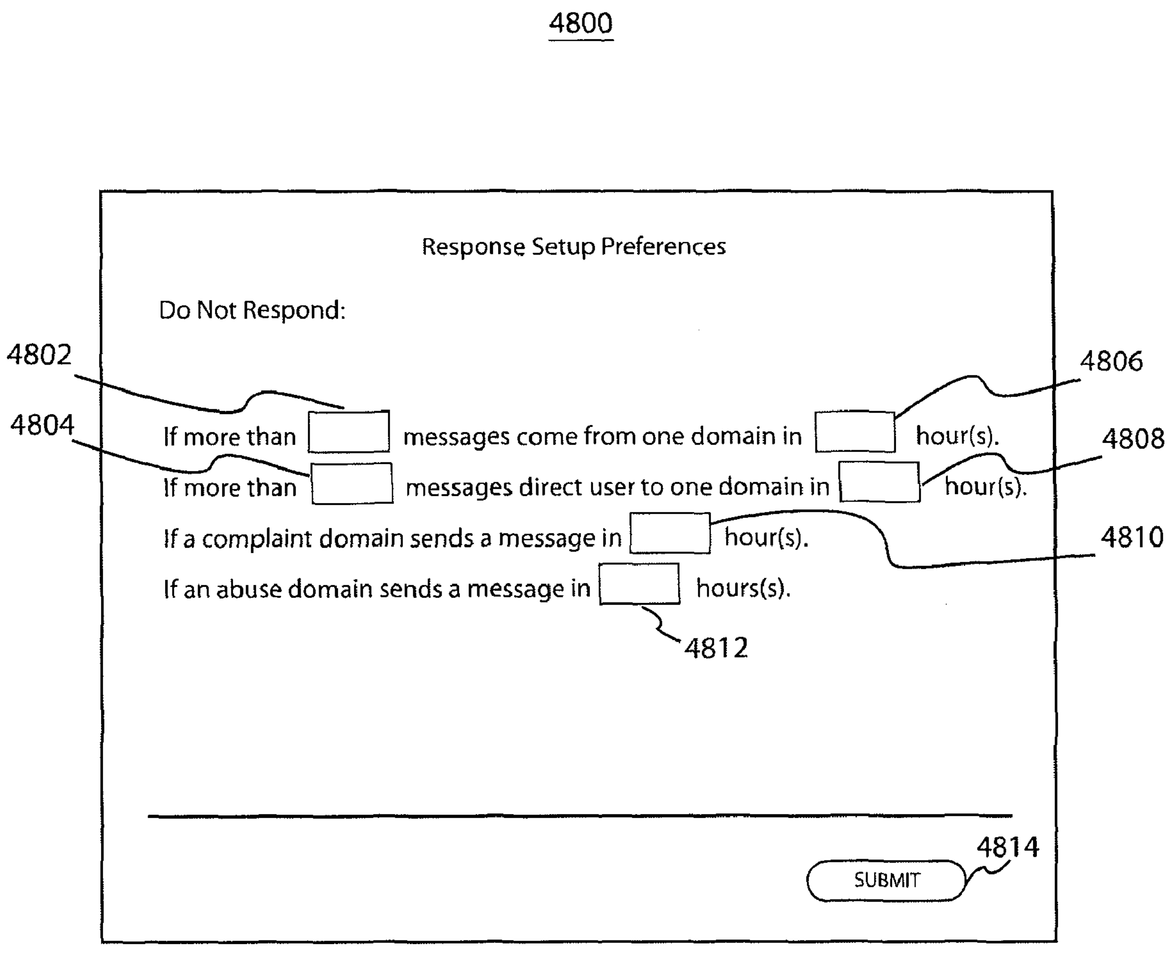
FIG. 48 is an exemplary user interface screen for user selection of response setup preferences in accordance with an embodiment of the present invention.

FIG. 48 shows an exemplary user interface screen 4800 for user selection of response setup preferences in accordance with an embodiment of the present invention. Using this exemplary user interface screen 4800, a user may designate the time and count parameters for domain message response. For example, the user may set the number of messages 4802, 4804 that must be received within a user specified number of hours 4806, 4808 in order for the system to not respond to further messages from an account or domain. Further, in an embodiment, the user can select the number of hours 4810, 4812 that messages from a domain which has been sent a complaint or abuse response are not to be responded to. In an embodiment, these user-selected parameters do not take effect until the user selects the submit button 4814.

Figure 3:
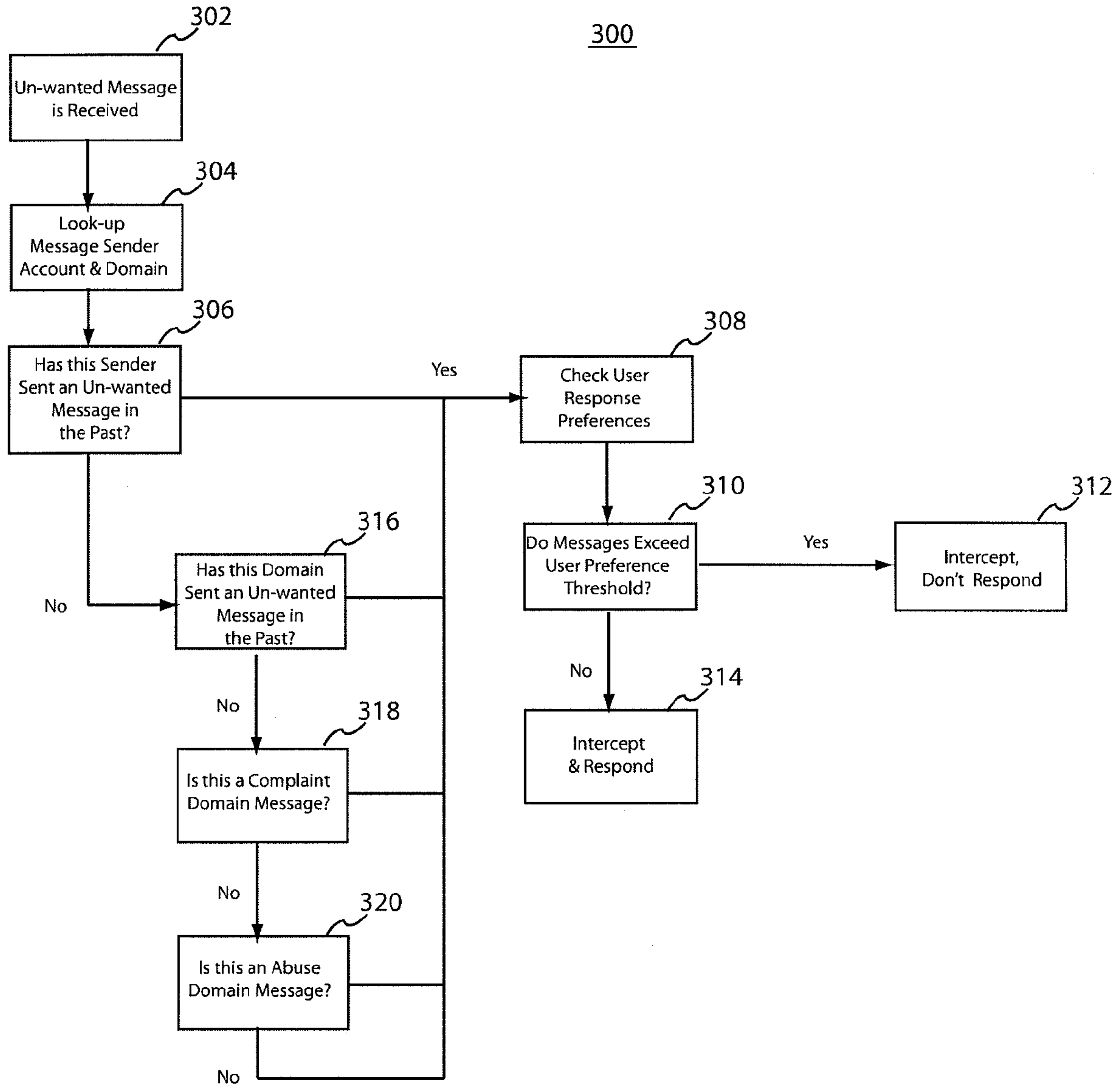
FIG. 3 is a flowchart of an exemplary process for an anti-looping function in accordance with an embodiment of the present invention.

A flowchart 300 of an exemplary process for an anti-looping function in an embodiment of the present invention is depicted in FIG. 3. In an embodiment, an unwanted message is received 302 and the system looks up the message sender's account and domain 304. In such an embodiment, the system determines whether the sender has sent an unwanted message in the past 306, or if the sender's domain has sent an unwanted message in the past. If either case the sender or the sender's domain has sent an unwanted message in the past, in an embodiment of the invention the system checks the user's response preferences 308, which may have been provided using a user interface screen such as described above.

In an embodiment, the system determines if the unwanted messages received from the sender or the sender's domain exceed the user's preference threshold 310, and, if so, no response is made to the unwanted message 312. Otherwise, an intercept and response is preferably initiated 314.

In an embodiment, if the sender or sender's domain has not sent an unwanted message in the past, the system determines whether the unwanted message is a complaint domain message 318 or an abuse domain message 320, and proceeds to the step of checking the user preferences 308.

In an embodiment, the system can be user configured to parse email or electronic message for protected email account identification, explicit content, investment offers, sending email addresses or other sending electronic addresses, sending email domain or unique message identifiers, reply email addresses or other reply electronic addresses, reply email domain or unique message identifiers, response domains, emails, URLs, or other electronic addresses or unique message identifiers, opt-out URLs or email or other sending electronic addresses sending email domain or unique message identifiers, physical addresses, anonymous FTP log-ins for message images, spyware, adware, virus, worms, botnets, telephone number and user defined topics, words and phrases.

Figure 4:
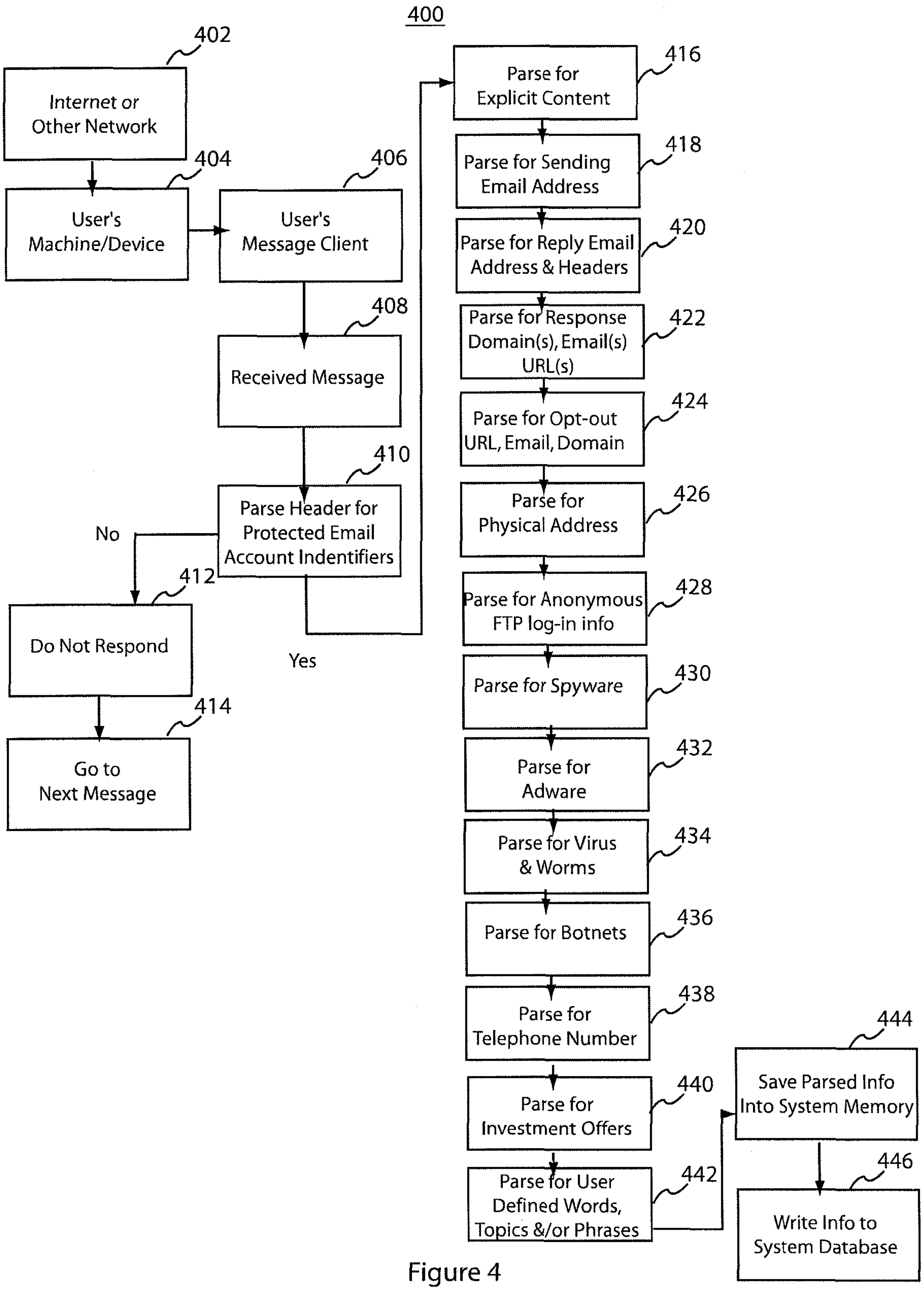
FIG. 4 is a flowchart of an exemplary embodiment for parsing email or electronic messages in accordance with an embodiment of the present invention.

FIG. 4 is a flowchart of an exemplary embodiment for parsing email or electronic messages 400. In such an embodiment, the user's device or machine 404 receives a message 408 from the Internet or other connected network 402 through the user's message client 406. In an embodiment, the system parses the header of the received message for protected email account identifiers 410. If no protected email account identifiers are located, an embodiment of the system does not respond 412 to the received message and the system proceeds to parse the next message 414.

In an embodiment, if the protected email account identifiers are located, the system further parses the received message for explicit content 416, sending email address 418, reply email addresses and headers 420, response domains, response emails, response URLs 422, opt-out domains, opt-out emails, opt-out URLs 424, physical addresses 426, anonymous FTP log-in information 428, spyware 430, adware 432, viruses, worms 434, botnets 436, telephone numbers 438, investment offers 440, and user defined words, topics and phrases 442. In an embodiment, the parsed information may be saved in system memory 44 and written to a system database 446.

An exemplary user interface screen 4900 for user selection of set up parameters for the responding process, such as that described in FIG. 4 is provided in FIG. 49. The user is presented with a list of check boxes 4902, each associated with at least one of explicit content, sending email addresses, reply email addresses, response domains, emails and URLs, opt-out domains, emails and URLs, physical addresses, anonymous FTP log-in information, spyware, adware, viruses and worms, botnets, telephone numbers, investment offers 440, and user defined words, topics and phrases, the user defined items also associated with an edit field 4904 for the user to input the user-defined information. In an embodiment, the user selects which of these items to parse electronic messages for when the system executes parsing as described above. Additionally, in an embodiment, the user is also presented with check boxes to pause the responding process when the user initiates network activity and to save all information parsed and discovered for comparison and reporting. In an embodiment, the user's selections are not recognized by the system until the user selects the submit button 4906.

An embodiment of the system can be user defined to remember, intercept and respond to a received message's sender, reply and destination domains, and unique network identifiers. In an embodiment, the user may flag received messages that are unwanted, and the system saves the unwanted message's sender, reply and response domains, IP addresses and unique network identifiers. In an embodiment, the user may be given a choice to have the system intercept, respond to and dispose of future received messages from the individual sender, domain, IP address and or IP address family. Preferably, all future messages received from the individual sender, domain, IP address and or IP address family are intercepted and responded to according to user defined preferences and disposed of. The system may also save the message and information parsed or discovered, and record it to a database for look up, comparison and reporting.

Figure 50:
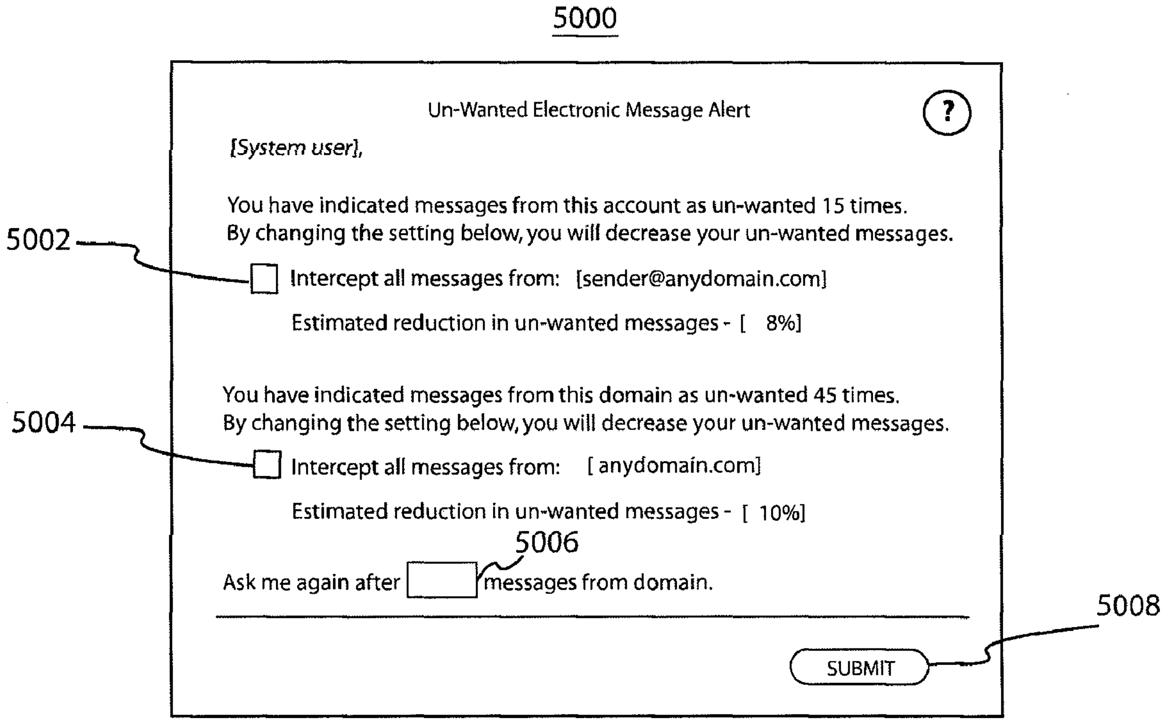
FIG. 50 is an exemplary user interface screen for managing unwanted electronic messages from an individual account or domain in accordance with an embodiment of the present invention.
Figure 51:
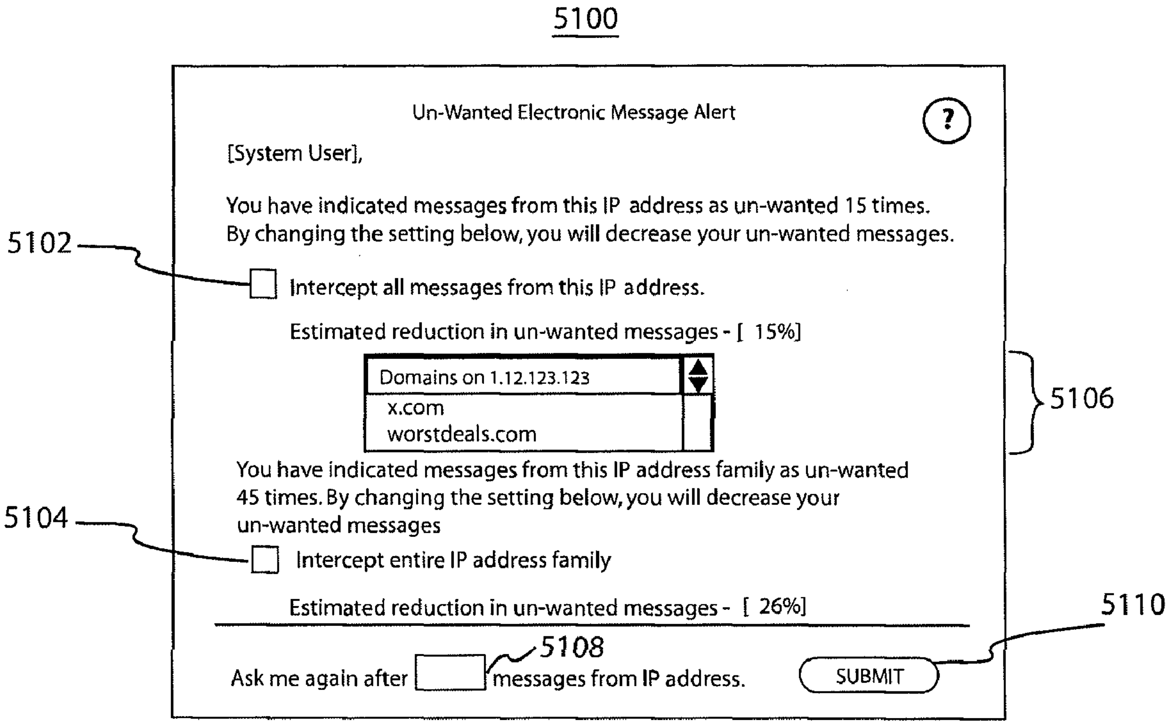
FIG. 51 is an exemplary user interface screen for managing of unwanted electronic messages from an IP address or IP family in accordance with an embodiment of the present invention.

FIGS. 50 and 51 depict exemplary user interface screens 5000, 5100 for managing unwanted electronic messages from an individual account or domain and managing unwanted electronic messages from an IP address or an IP family, respectively, in accordance with an embodiment of the present invention. In an embodiment, the user is given the option of selecting a check box 5002 to intercept all future messages from an account, and another check box 5004 to intercept all future messages from a domain. In an embodiment, the user may select to be presented with the same user interface screen 5000 after a user-defined number of additional messages are received from the domain 5006. In an embodiment, the system does not act on the user preferences until the user selects the submit button 5008.

In an embodiment, the user is given the option of selecting a check box 5102 to intercept all future messages from an IP address, and another check box 5104 to intercept all future messages from an entire IP address family. In an embodiment, the user may be presented with a list box listing all domains at the given IP address. In an embodiment, the user may select to be presented with the same user interface screen 5100 after a user-defined number of additional messages are received from the domain 5108. In an embodiment, the system does not act on the user preferences until the user selects the submit button 5110.

Figure 5:
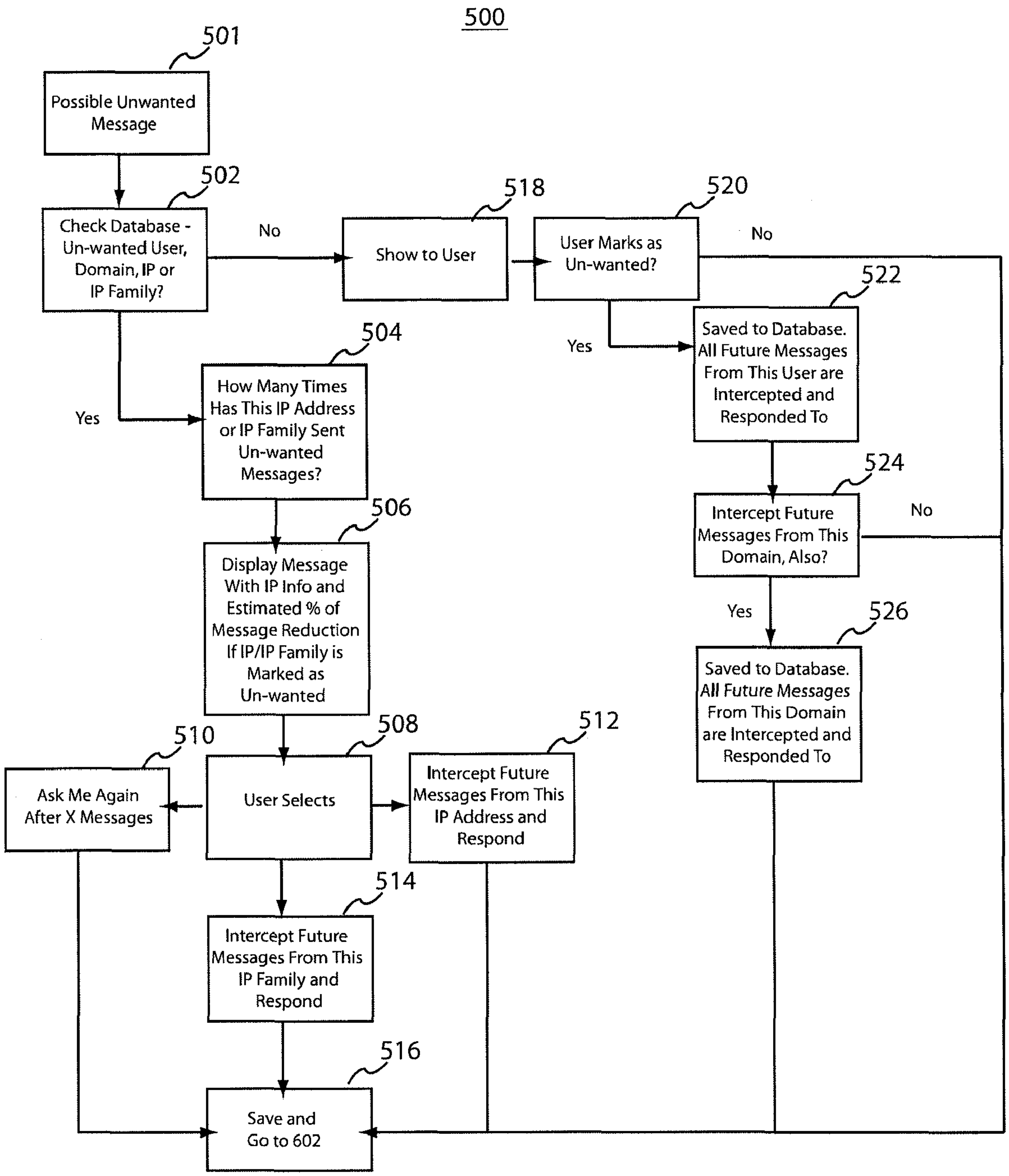
FIG. 5 is a flowchart of an exemplary embodiment for handling unwanted message sender information in accordance with an embodiment of the present invention.

FIG. 5 depicts a flowchart of an exemplary embodiment for handling unwanted message sender information 500. In an embodiment, after the system has parsed a potential unwanted message 501, as described above, a system database (not depicted) may be queried to determine whether the potential unwanted message originated from a known unwanted user, domain, IP address, or IP address family 502, and, if so, how many times this unwanted user, domain, IP address, or IP address family have sent unwanted messages 504. In an embodiment, the user may be presented with a user interface screen, such as those described above, displaying a system message with IP information and an estimated percentage of message reduction if the user, domain, IP address, or IP address family is marked as unwanted 506. In an embodiment, as indicated in the above description of an exemplary user interface, the user may then select 508 to be presented with the user interface screen again after a user-defined number of additional messages are received 510, to intercept and respond to future messages from the domain or IP address 512, or to intercept and respond to future messages from the IP family 514. The user's selection is then preferably saved and acted upon by the system 516.

In an embodiment, when the potential unwanted message did not originate from a known unwanted user, domain, IP address, or IP address family, the system may present the message to the user 518, and allow the user to mark the message as unwanted 520. If the message is marked as unwanted, in an embodiment the system saves the message and message information to a database, and intercepts and responds to all future messages form the sender 522. In an embodiment, the user may also select to intercept all future messages from the sender's domain 524, and the system then saves this information and intercepts and responds to all future messages from the domain 526.

Figure 52:
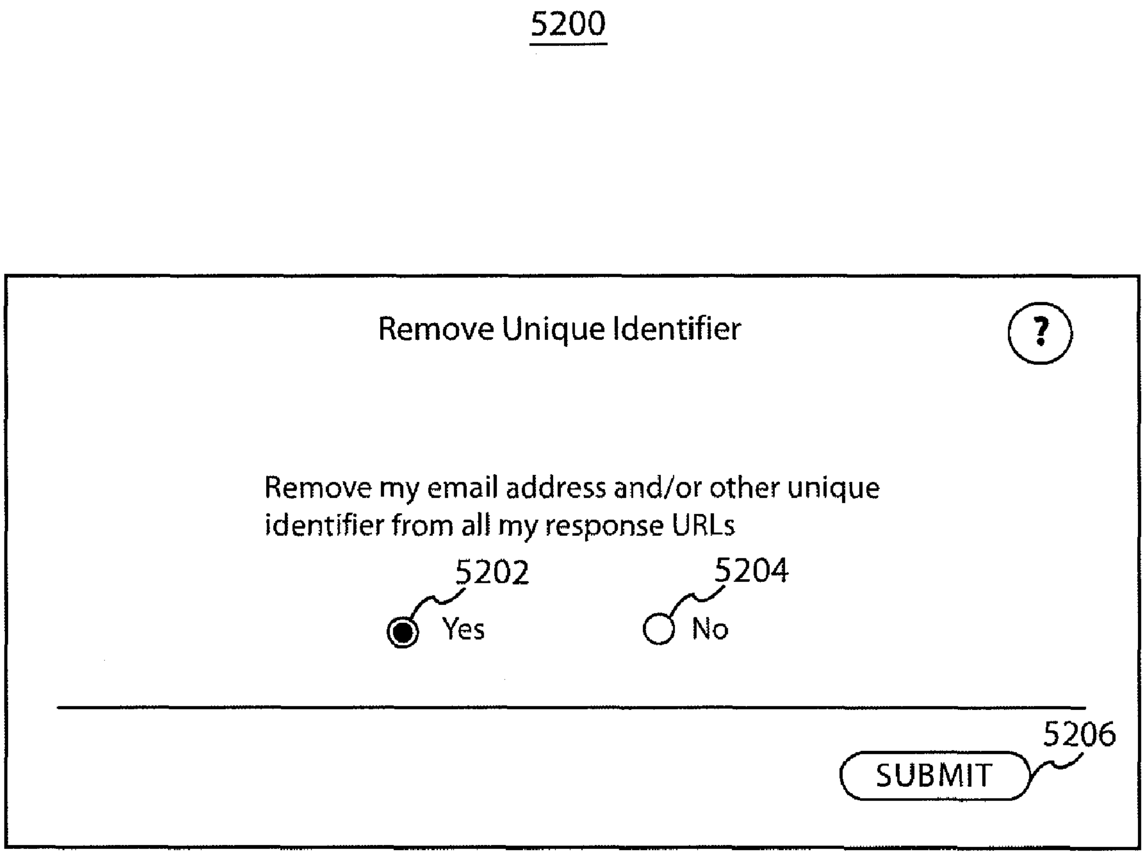
FIG. 52 is an exemplary user interface screen for allowing the user to remove their email address or other unique identifier from a response URL in accordance with an embodiment of the present invention.

In an embodiment of the present invention, the system allows the user to specify that user email or individual addresses are to be removed from any response URLs or unique identifiers. FIG. 52 is an exemplary user interface screen for allowing the user to remove their email address or other unique identifier from a response URL 5200. In an embodiment the user is presented with a user interface having radio button controls 5202, 5204 for the user to select whether 5202 or not 5204 the user's email address or other unique identifiers are to be removed from all the user's response URLs. The system preferably acts on the user's selection when the user selects the submit button 5206.

Figure 6:
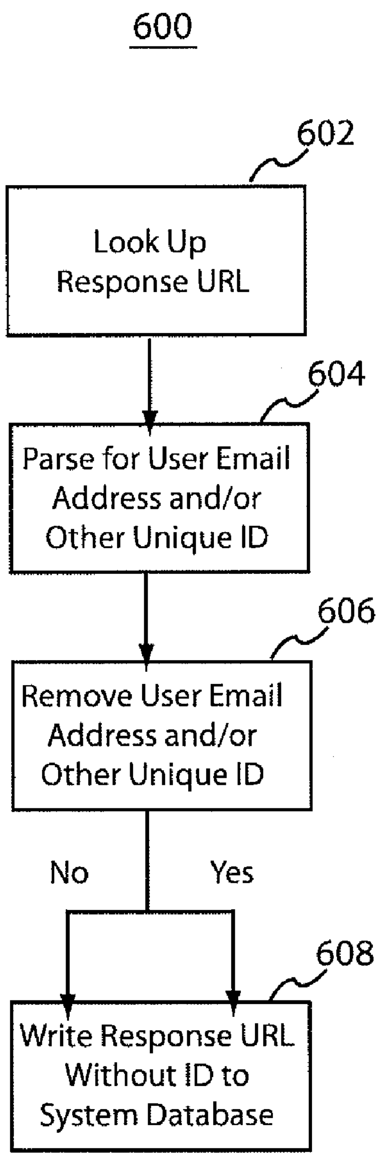
FIG. 6 is a flowchart of an exemplary embodiment for removing the user email or address from any response URL (s) or unique identifiers in accordance with an embodiment of the present invention.

In an embodiment, the system implements removing user email or individual addresses from the response URL by implement a process 600 depicted in FIG. 6, which includes first looking up the response URL 602, parsing the response URL for user email address and other unique identifiers 604, removing the user email address and any other unique ID 606, and optionally saving the response URL stripped of the user's email address and other unique IDs to a system database 608, for later use.

Figure 7:
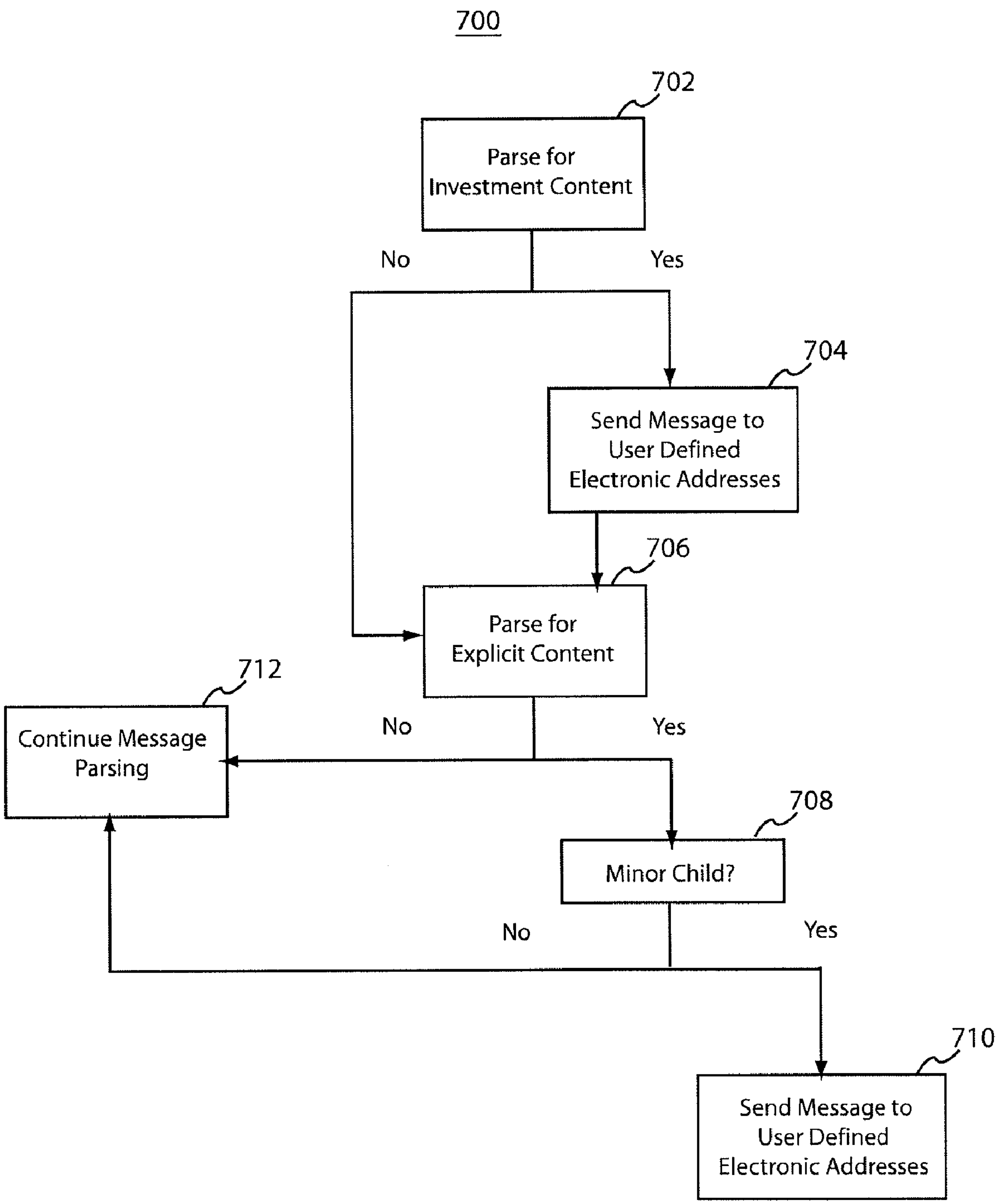
FIG. 7 is a flowchart of an exemplary embodiment for sending a copy of the message and a complaint to appropriate authorities in the event of explicit or investment message content, in accordance with an embodiment of the present invention.

In an embodiment of the invention, the system may parse received messages for investment content or to determine if explicit content has been sent to a minor. FIG. 7 is a flowchart 700 of an exemplary embodiment of a process for sending a copy of the message and a complaint to appropriate authorities in the event of explicit material being sent to a minor or investment message content. In an embodiment, the system may parse the message for investment content 702 and, if found, send the message to an appropriate governmental regulatory authority or to a user defined electronic address 704. Also in an embodiment, the system may parse the message for explicit content 706, and, if found, determine if the message recipient is a minor child 708, and, if the recipient is a minor child, send the message to an appropriate law enforcement authority or to a user-specified electronic address 710.

In an embodiment, the system automatically responds with a variety of user defined responses to all user defined and un-defined electronic or email messages received by the user with one or more of the following techniques: pinging, sending electronic messages to related servers, tracing the route of the sending electronic or email messages domains and unique identifiers from the user's machine, looking up sending electronic or email message's domain, registrar contact information and unique identifiers, requesting content from sending electronic or email message's domains web server or electronic content repository with a user defined number of open sockets. In an embodiment, if sending electronic or email message's web server or electronic content repository does not respond in a user defined time period, the system it will try again in a user defined time frame and continue for up to a user defined amount of times or until success.

Also in an embodiment, the system can be user defined to either trap the response web or electronic content repository content and dispose of it immediately, or to save the response web or electronic content repository content for later viewing by the user, either for online or for off-line viewing. In an embodiment, if a sending electronic or email message's web server or electronic content repository responds, the system can be user defined to respond to the sending electronic or email domain's web server logs by writing to the log a user defined opt-out message to discontinue future electronic and/or email messages to the user and drop the connection. The system in an embodiment can also send user defined complaint messages to the domain network suppliers' contact and unique identifiers.

Figure 53:
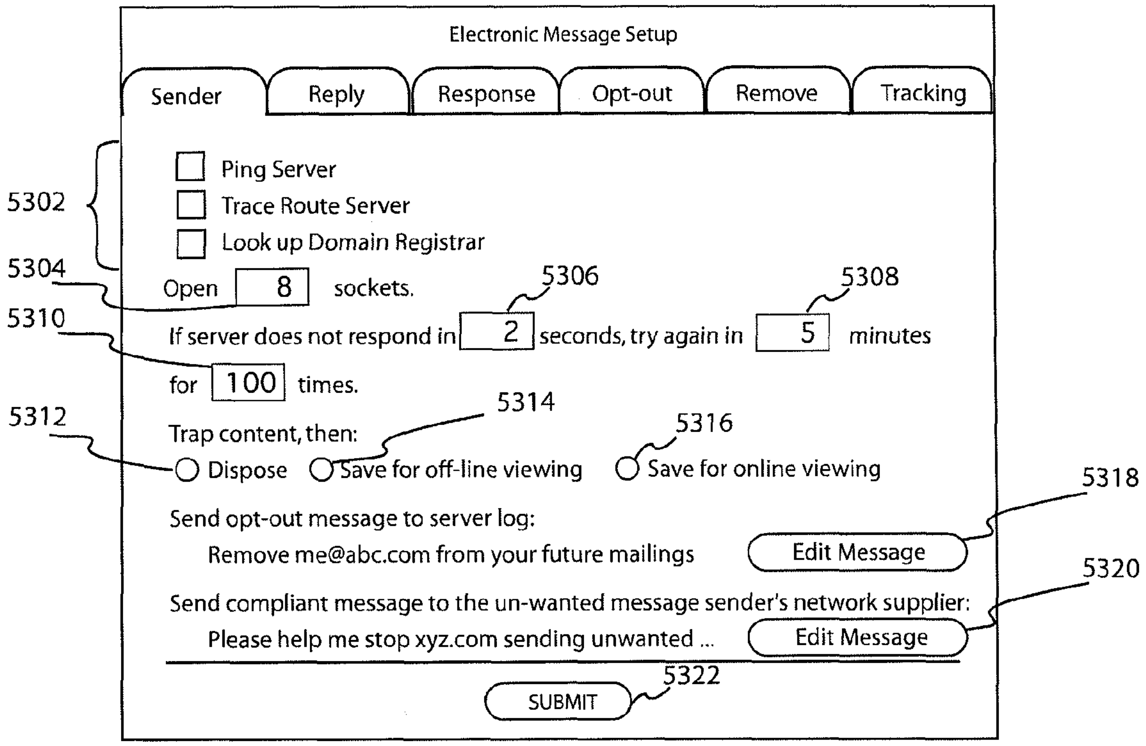
FIG. 53 is an exemplary user interface screen for user setup of electronic message response to sender in accordance with an embodiment of the present invention.

FIG. 53 is an exemplary user interface screen for user setup of electronic message response to sender 5300 as described above. In an embodiment, the user is presented with a user interface that includes check boxes 5302, each associated with possible actions, such as those depicted—pinging the sender's server, tracing the route to the sender's server, and looking up the sender's domain register. In an embodiment, the user may also select the number of sockets 5304 to open with the sender, as well as specify retry parameters, such as the amount of time to wait for a response 5306, the amount of time before each retry 5308, and the number of retrys 5310. The user in an embodiment may also be provided with the ability to select what to do with the message content after the message is trapped. For example, the options might include disposing of the contents 5312, saving the contents for off-line viewing 5314, and saving the contents for online viewing 5316. In an embodiment the user is presented with the opportunity to edit a opt-out message to be sent to the sender's server log 5318 and network supplier 5320. In an embodiment, the user's preferences are not acted on by the system until the user selects the submit button 5322.

Figure 54:
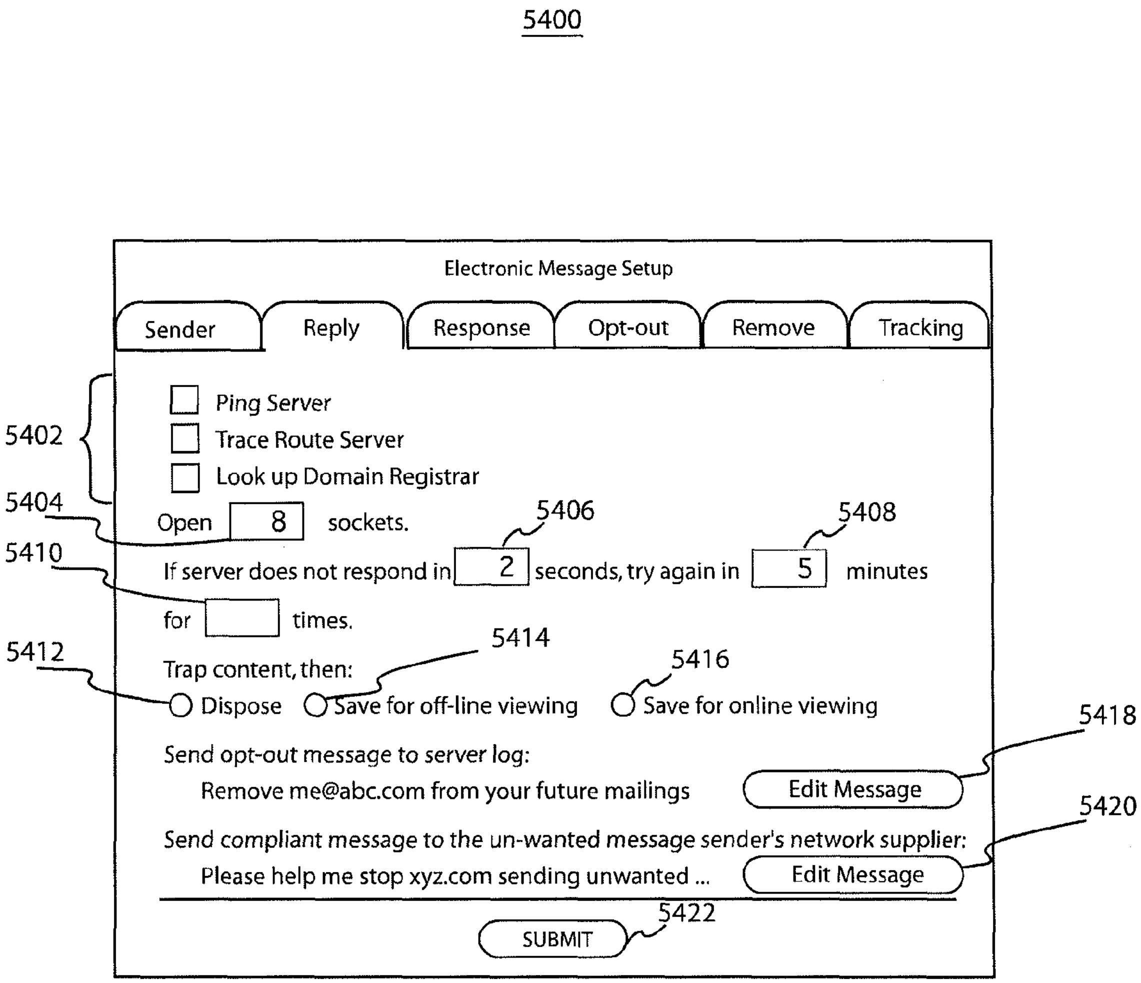
FIG. 54 is an exemplary user interface screen for user setup of electronic message reply in accordance with an embodiment of the present invention.
Figure 55:
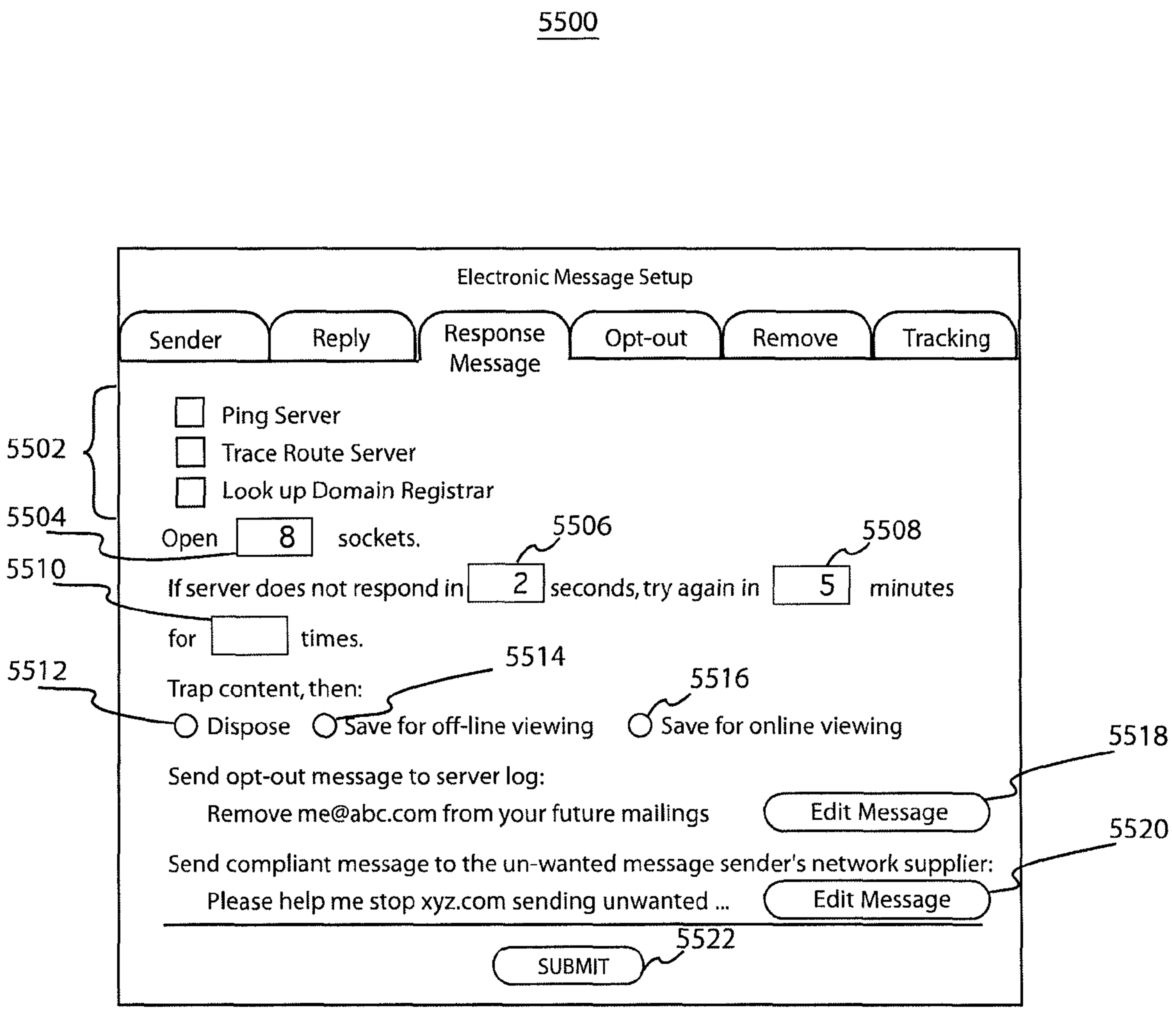
FIG. 55 is an exemplary user interface screen for user setup of electronic message response to domain links in accordance with an embodiment of the present invention.
Figure 56:
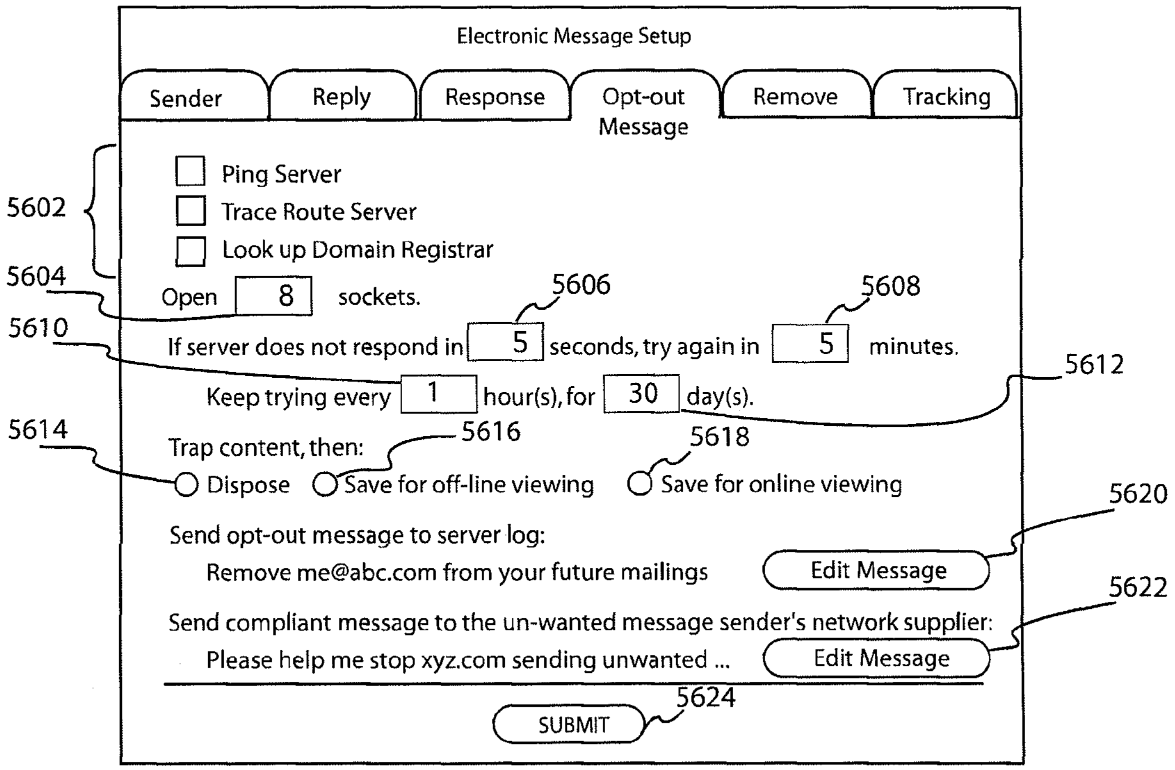
FIG. 56 is an exemplary user interface screen for user setup of electronic message response to opt-out domain links in accordance with an embodiment of the present invention.
Figure 59:
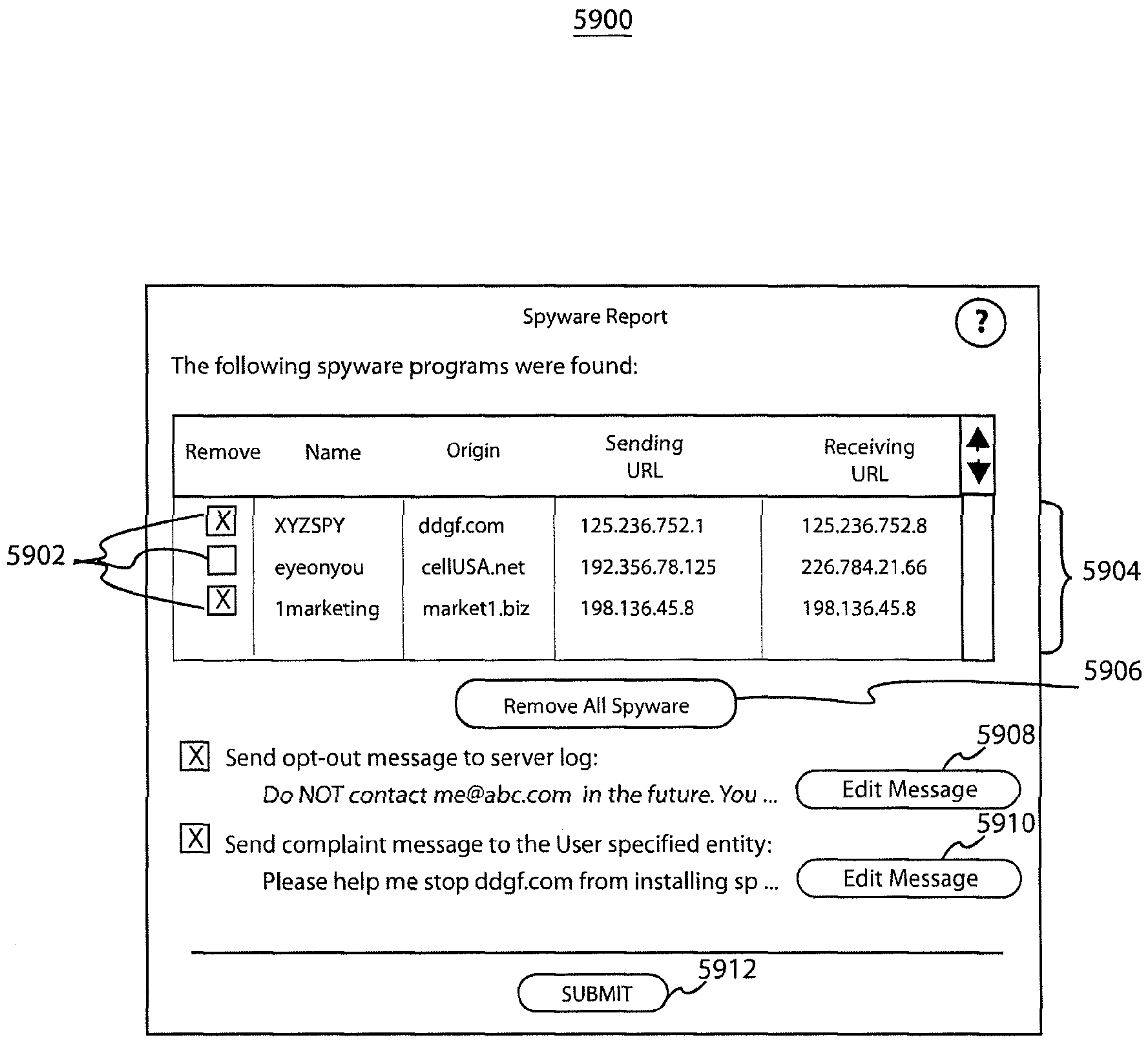
FIG. 59 is an exemplary user interface screen for user setup and management of spyware reporting and removal in accordance with an embodiment of the present invention.
Figure 60:
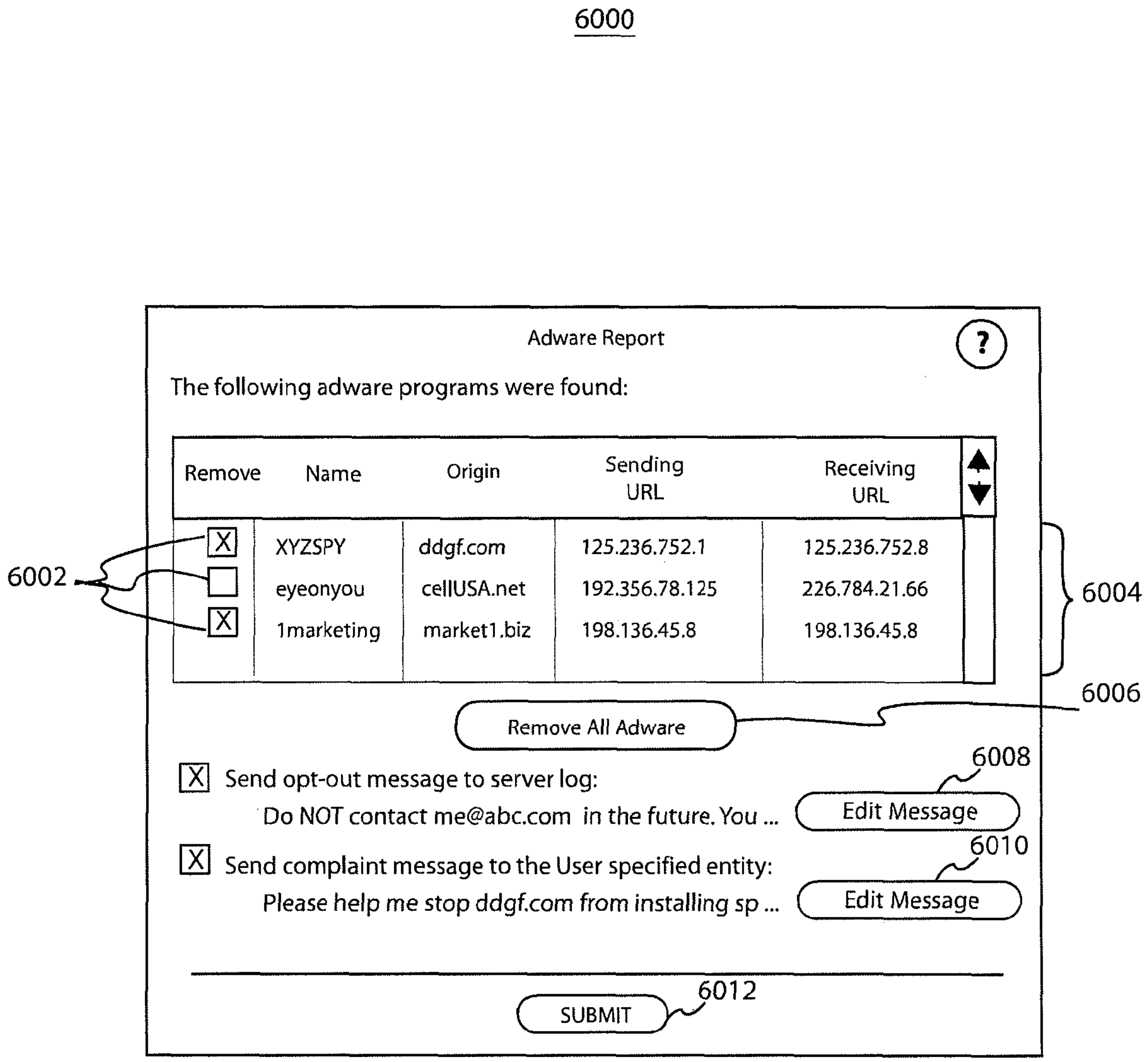
FIG. 60 is an exemplary user interface screen for user setup and management of adware reporting and removal in accordance with an embodiment of the present invention.
Figure 61:
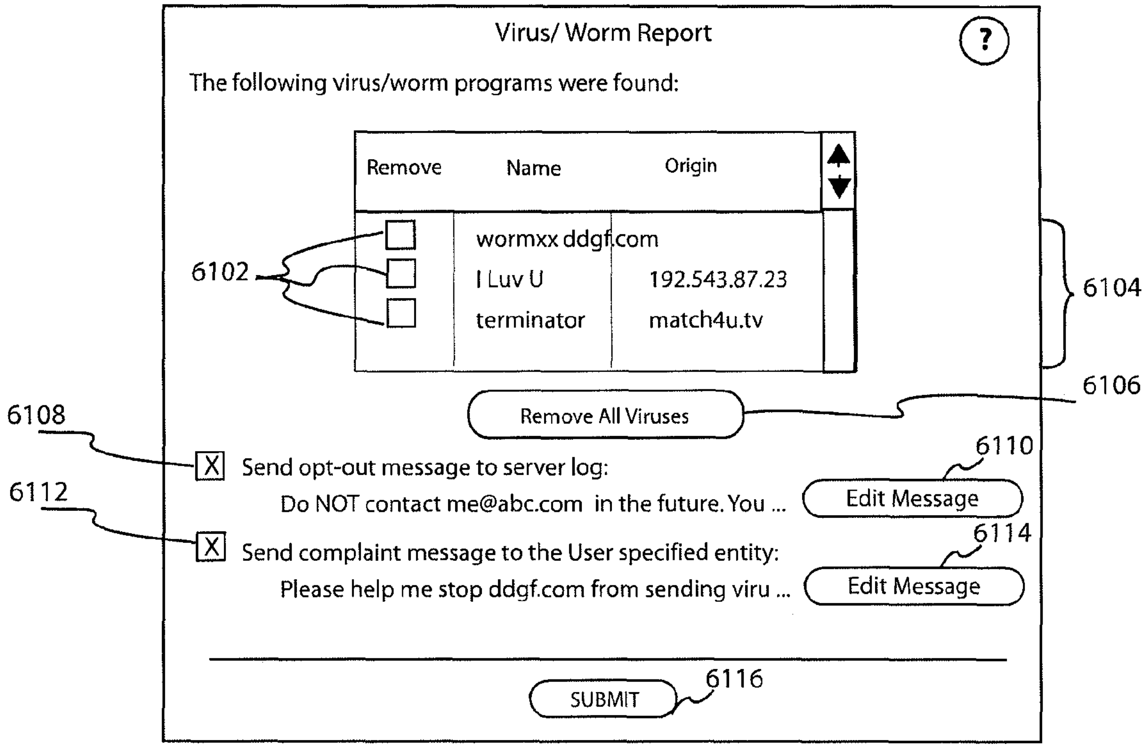
FIG. 61 is an exemplary user interface screen for user setup and management of virus and worm reporting and removal in accordance with an embodiment of the present invention.
Figure 62:
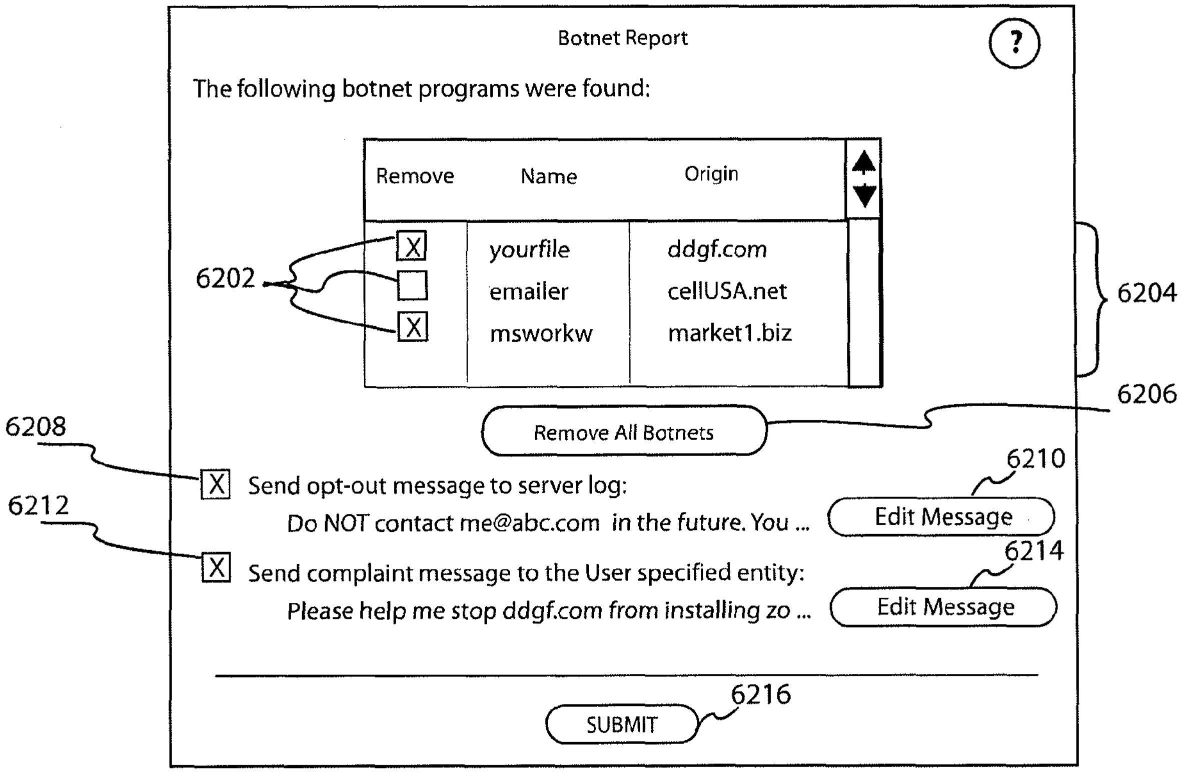
FIG. 62 is an exemplary user interface screen for user setup and management of botnet reporting and removal in accordance with an embodiment of the present invention.

FIGS. 54, 55 and 56 are exemplary user interface screens that present the user with the identical preference selections described above for response to the message sender, but for use with reply messages, response messages, and opt-out messages, respectively.

In FIG. 54, an exemplary user interface screen for user setup of electronic message response to reply messages 5400 is presented to the user. In an embodiment, the user is presented with a user interface that includes check boxes 5402, each associated with possible actions, such as those depicted—pinging the reply server, tracing the route to the reply server, and looking up the reply server's domain register. In an embodiment, the user may also select the number of sockets 5404 to open with the reply server, as well as specify retry parameters, such as the amount of time to wait for a response 5406, the amount of time before each retry 5408, and the number of retries 5410. The user in an embodiment may also be provided with the ability to select what to do with the message content after the message is trapped. For example, the options might include disposing of the contents 5412, saving the contents for off-line viewing 5414, and saving the contents for online viewing 5416. In an embodiment the user is presented with the opportunity to edit an opt-out message to be sent to the reply server log 5418 and network supplier 5420. In an embodiment, the user's preferences are not acted on by the system until the user selects the submit button 5422.

In FIG. 55, an exemplary user interface screen for user setup of electronic message response to response messages 5500 is presented to the user. In an embodiment, the user is presented with a user interface that includes check boxes 5502, each associated with possible actions, such as those depicted—pinging the response server, tracing the route to the response server, and looking up the response server's domain register. In an embodiment, the user may also select the number of sockets 5504 to open with the response server, as well as specify retry parameters, such as the amount of time to wait for a response 5506, the amount of time before each retry 5508, and the number of retries 5510. The user in an embodiment may also be provided with the ability to select what to do with the message content after the message is trapped. For example, the options might include disposing of the contents 5512, saving the contents for off-line viewing 5514, and saving the contents for online viewing 5516. In an embodiment the user is presented with the opportunity to edit a opt-out message to be sent to the response server log 5518 and network supplier 5520. In an embodiment, the user's preferences are not acted on by the system until the user selects the submit button 5522.

In FIG. 56, an exemplary user interface screen for user setup of electronic message response to opt-out messages 5600 is presented to the user. In an embodiment, the user is presented with a user interface that includes check boxes 5602, each associated with possible actions, such as those depicted—pinging the opt-out server, tracing the route to the opt-out server, and looking up the opt-out server's domain register. In an embodiment, the user may also select the number of sockets 5604 to open with the opt-out server, as well as specify retry parameters, such as the amount of time to wait for a response 5606, the amount of time before each retry 5608, and the number of retries 5610. The user in an embodiment may also be provided with the ability to select what to do with the message content after the message is trapped. For example, the options might include disposing of the contents 5612, saving the contents for off-line viewing 5614, and saving the contents for online viewing 5616. In an embodiment the user is presented with the opportunity to edit an opt-out message to be sent to the opt-out server log 5618 and network supplier 5620. In an embodiment, the user's preferences are not acted on by the system until the user selects the submit button 5622.

Figure 8:
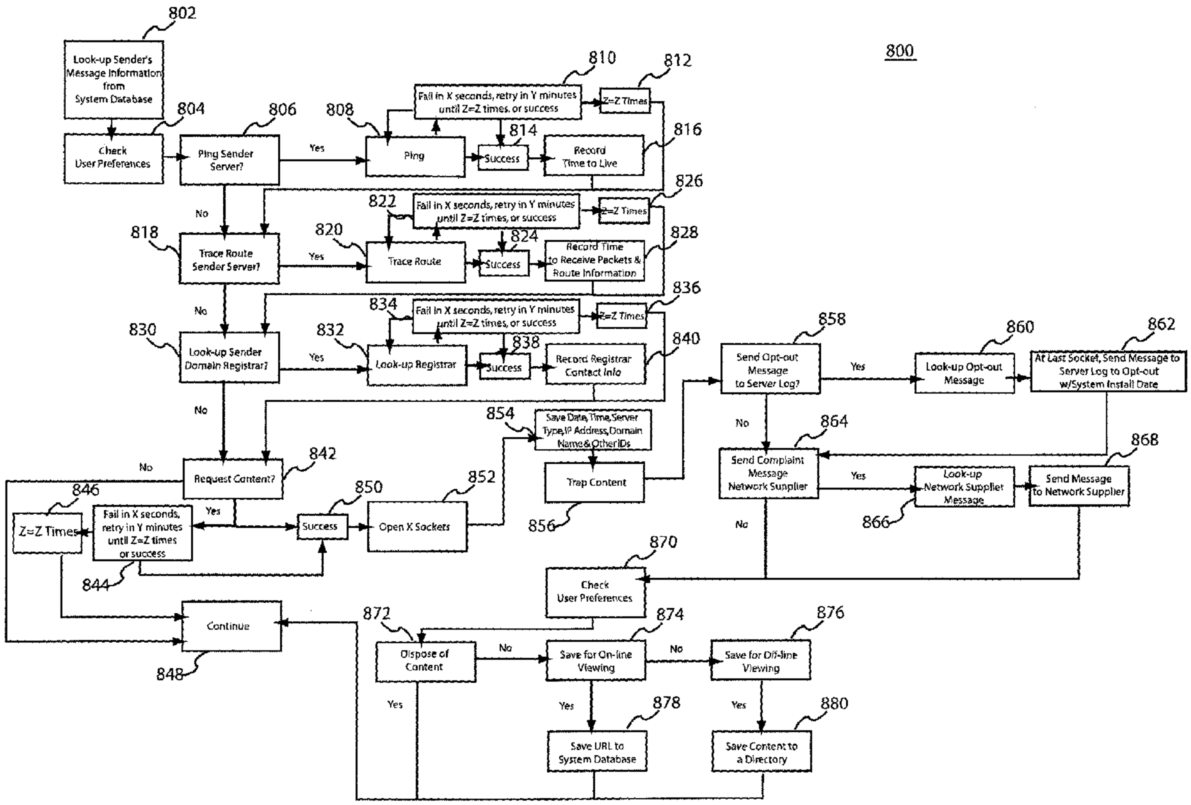
FIG. 8 is a flowchart of an exemplary embodiment for automatic user response(s) to sender electronic or email messages, in accordance with an embodiment of the present invention.

A flowchart of an exemplary embodiment for automatic user response(s) to sender electronic or email messages is provided in FIG. 8. In an embodiment, the system looks up the message sender's information in a system database 802, and checks user preferences 804 to determine if the user has elected to ping the sender's server 806, trace the route to the sender's server 818, look up a sender's domain registrar 830, or request content offered by the sender 842. If none of these actions were selected by the user, then the system preferably continues with the next message 848.

Otherwise, in an embodiment, if the user has elected to ping the sender's server, the sender's server is pinged 808. In such an embodiment, if the ping is successful 814, the system then records the time expended by the pinging operation 816. Preferably, the system may be configured to wait for pinging success for a predetermined duration of time, which may be user defined, and to retry the pinging operation up to a user defined number of times after waiting for a user defined amount of time 810, failing after the user defined number of pinging attempts have occurred 812.

Similarly, in an embodiment, if the user has elected to trace the route to the sender's server, the route is traced 820. In such an embodiment, if the trace is successful 824, the system then records the time it took to receive packets from the sender's server and to trace the route information 828. Preferably, the system may be configured to wait for route tracing success for a predetermined duration of time, which may be user defined, and to retry the route tracing operation up to a user defined number of times after waiting for a user defined amount of time 822, failing after the user defined number of attempts have been made to trace the route 826.

Likewise, in an embodiment, if the user has elected to, the sender's domain registrar may be looked up 832. In such an embodiment, if the look up is successful 838, the system then records the sender's registrar contact information 840. Preferably, the system may be configured to wait for the look up of the sender's domain registrar for a predetermined duration of time, which may be user defined, and to retry the look up operation up to a user defined number of times after waiting for a user defined amount of time 834, failing after the user defined number of attempts at look up have been attempted 836.

In an embodiment, if the user has so elected, content may be requested from the sender 842. In such an embodiment, if the content request is successful 850, the system then opens a user defined number of sockets 852, saves the date, time, server type, IP address, domain name and other identification information 854, and traps the content 856. In an embodiment, the system then checks to determine if the user has elected to send an opt-out message to the sender's server log 858, and, if so, the system looks up the opt out-message 860, and sends it along with the system installation date when the last socket is available 862. In either case, in an embodiment, the system next checks to determine if the user has elected to send a complaint message to the sender's network supplier 864, and, if so, the system looks up the user defined network supplier message 866 and sends it to the sender's network supplier 868. The system may be further configured to check other user preferences 870, such as whether to dispose of the content 872, whether to save the content for online viewing 874, which may be performed by saving the URL to a system database 878, or whether to save the content for offline viewing 876, which may be performed by saving the content into a directory on the user's local machine 880. The system may then continue with the next message 848.

Figure 9:
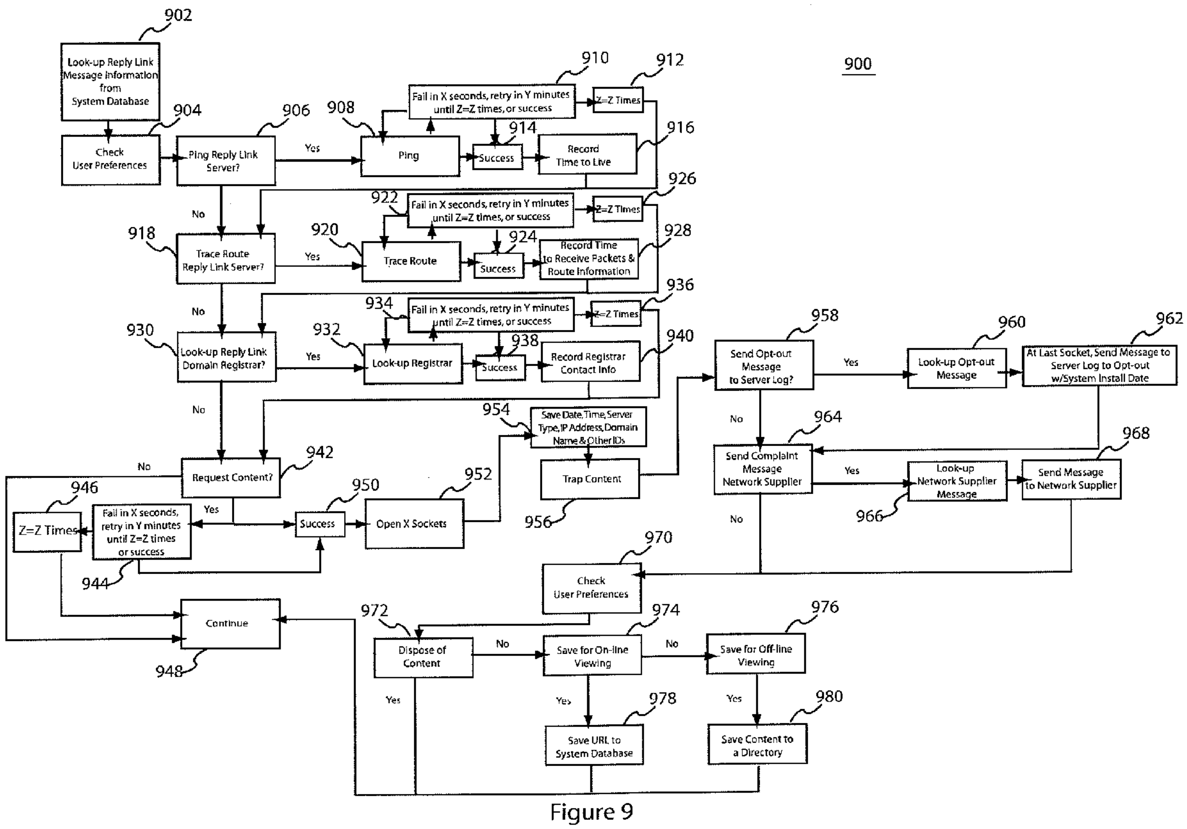
FIG. 9 is a flowchart of an exemplary embodiment for automatic user response(s) to reply electronic message addresses in accordance with an embodiment of the present invention.

A flowchart of an exemplary embodiment for automatic user response(s) to reply electronic message is provided in FIG. 9. In an embodiment, the system looks up the reply link message information in a system database 902, and checks user preferences 904 to determine if the user has elected to ping the reply link server 906, trace the route to the reply link server 918, look up the reply link server's domain registrar 930, or request content from the reply link server 942. If none of these actions were selected by the user, then the system preferably continues with the next message 948.

Otherwise, in an embodiment, if the user has elected to ping the reply link server, the reply link server is pinged 908. In such an embodiment, if the ping is successful 914, the system then records the time expended by the pinging operation 916. Preferably, the system may be configured to wait for pinging success for a predetermined duration of time, which may be user defined, and to retry the pinging operation up to a user defined number of times after waiting for a user defined amount of time 910, failing after the user defined number of pinging attempts have occurred 912.

Similarly, in an embodiment, if the user has elected to trace the route to the reply link server, the route is traced 920. In such an embodiment, if the trace is successful 924, the system then records the time it took to receive packets from the reply link server and to trace the route information 928. Preferably, the system may be configured to wait for route tracing success for a predetermined duration of time, which may be user defined, and to retry the route tracing operation up to a user defined number of times after waiting for a user defined amount of time 922, failing after the user defined number of attempts have been made to trace the route 926.

Likewise, in an embodiment, if the user has elected to, the reply link server's domain registrar may be looked up 932. In such an embodiment, if the look up is successful 938, the system then records the reply link server's registrar contact information 940. Preferably, the system may be configured to wait for the look up of the reply link server's domain registrar for a predetermined duration of time, which may be user defined, and to retry the look up operation up to a user defined number of times after waiting for a user defined amount of time 934, failing after the user defined number of attempts at look up have been attempted 936.

In an embodiment, if the user has so elected, content may be requested from the reply link server 942. In such an embodiment, if the content request is successful 950, the system then opens a user defined number of sockets 952, saves the date, time, server type, IP address, domain name and other identification information 954, and traps the content 956. In an embodiment, the system then checks to determine if the user has elected to send an opt-out message to the reply link server's server log 958, and, if so, the system looks up the opt out-message 960, and sends it along with the system installation date when the last socket is available. In either case, in an embodiment, the system next checks to determine if the user has elected to send a complaint message to the reply link server's network supplier 964, and, if so, the system looks up the user defined network supplier message 966 and sends it to the reply link server's network supplier 968. The system may be further configured to check other user preferences 970, such as whether to dispose of the content 972, whether to save the content for online viewing 974, which may be performed by saving the URL to a system database 978, or whether to save the content for offline viewing 976, which may be performed by saving the content into a directory on the user's local machine 980. The system may then continue with the next message 948.

Figure 10:
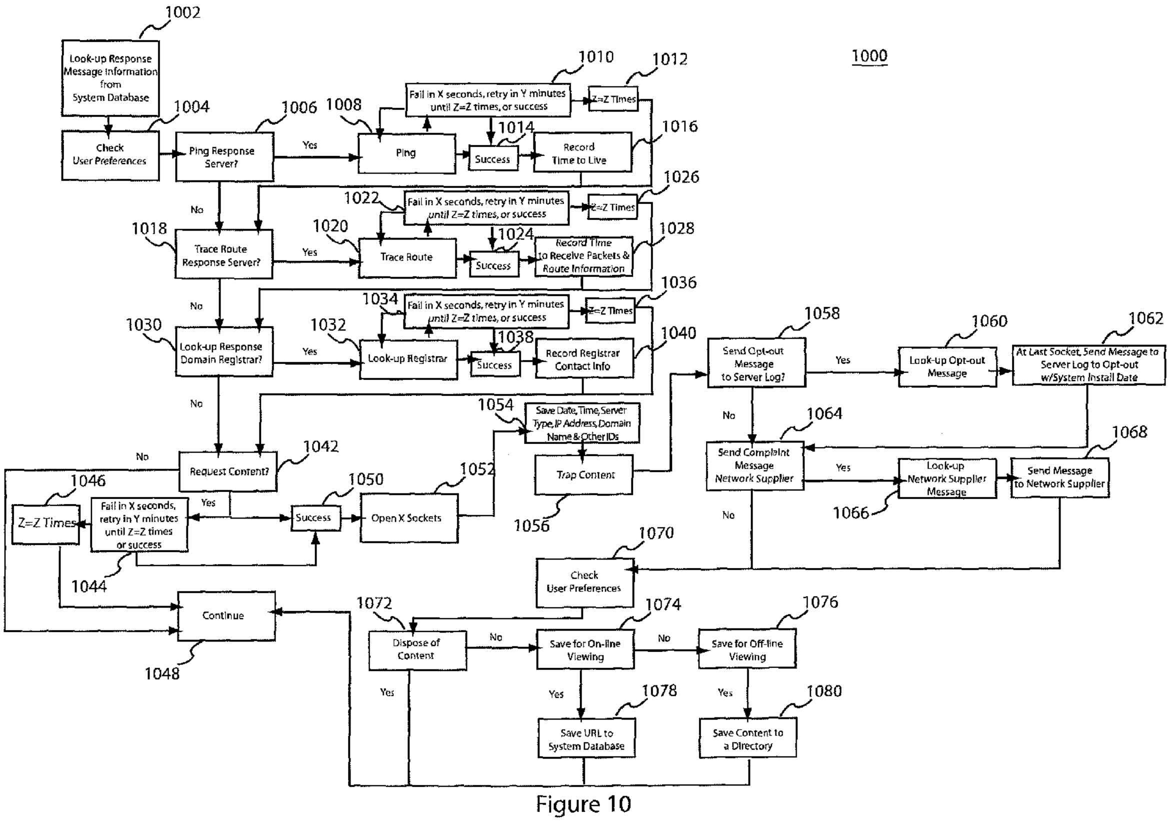
FIG. 10 is a flowchart of an exemplary embodiment for automatic user response to response links and addresses in accordance with an embodiment of the present invention.

A flowchart of an exemplary embodiment for automatic user response(s) to response links and addresses is provided in FIG. 10. In an embodiment, the system looks up the response message information in a system database 1002, and checks user preferences 1004 to determine if the user has elected to ping the response server 1006, trace the route to the response server 1018, look up the response server's domain registrar 1030, or request content from the response server 1042. If none of these actions were selected by the user, then the system preferably continues with the next message 1048.

Otherwise, in an embodiment, if the user has elected to ping the response server, the response server is pinged 1008. In such an embodiment, if the ping is successful 1014, the system then records the time expended by the pinging operation 1016. Preferably, the system may be configured to wait for pinging success for a predetermined duration of time, which may be user defined, and to retry the pinging operation up to a user defined number of times after waiting for a user defined amount of time 1010, failing after the user defined number of pinging attempts have occurred 1012.

Similarly, in an embodiment, if the user has elected to trace the route to the response server, the route is traced 1020. In such an embodiment, if the trace is successful 1024, the system then records the time it took to receive packets from the response server and to trace the route information 1028. Preferably, the system may be configured to wait for route tracing success for a predetermined duration of time, which may be user defined, and to retry the route tracing operation up to a user defined number of times after waiting for a user defined amount of time 1022, failing after the user defined number of attempts have been made to trace the route 1026.

Likewise, in an embodiment, if the user has elected to, the response server's domain registrar may be looked up 1032. In such an embodiment, if the look up is successful 1038, the system then records the response server's registrar contact information 1040. Preferably, the system may be configured to wait for the look up of the response server's domain registrar for a predetermined duration of time, which may be user defined, and to retry the look up operation up to a user defined number of times after waiting for a user defined amount of time 1034, failing after the user defined number of attempts at look up have been attempted 1036.

In an embodiment, if the user has so elected, content may be requested from the response server 1042. In such an embodiment, if the content request is successful 1050, the system then opens a user defined number of sockets 1052, saves the date, time, server type, IP address, domain name and other identification information 1054, and traps the content 1056. In an embodiment, the system then checks to determine if the user has elected to send an opt-out message to the response server's server log 1058, and, if so, the system looks up the opt out-message 1060, and sends it along with the system installation date when the last socket is available. In either case, in an embodiment, the system next checks to determine if the user has elected to send a complaint message to the response server's network supplier 1064, and, if so, the system looks up the user defined network supplier message 1066 and sends it to the response server's network supplier 1068. The system may be further configured to check other user preferences 1070, such as whether to dispose of the content 1072, whether to save the content for online viewing 1074, which may be performed by saving the URL to a system database 1078, or whether to save the content for offline viewing 1076, which may be performed by saving the content into a directory on the user's local machine 1080. The system may then continue with the next message 1048.

Figure 11:
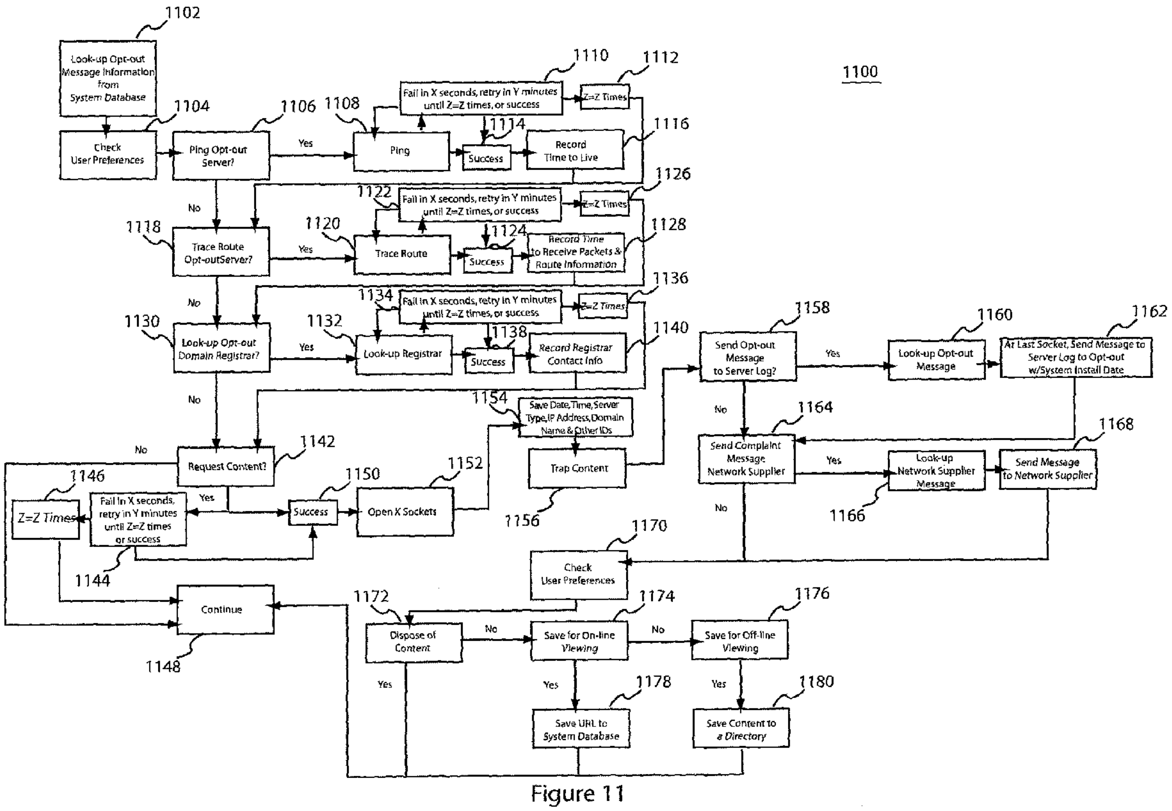
FIG. 11 is a flowchart of an exemplary embodiment for automatic user response to opt-out links and addresses in accordance with an embodiment of the present invention.

A flowchart of an exemplary embodiment for automatic user response(s) to opt-out links and addresses is presented in FIG. 11. In an embodiment, the system looks up the opt-out message information in a system database 1102, and checks user preferences 1104 to determine if the user has elected to ping the servers associated with the opt-out links and addresses 1106 (hereinafter, the "opt-out servers"), trace the route to the opt-out servers 1118, look up the opt-out servers' domain registrars 1130, or request content from the opt-out servers 1142. If none of these actions were selected by the user, then the system preferably continues with the next message 1148.

Otherwise, in an embodiment, if the user has elected to ping the opt-out servers, the opt-out servers are pinged 1108. In such an embodiment, if the pings are successful 1114, the system then records the time expended by the pinging operations 1116. Preferably, the system may be configured to wait for pinging success for a predetermined duration of time, which may be user defined, and to retry the pinging operations up to a user defined number of times after waiting for a user defined amount of time 1110, failing after the user defined number of pinging attempts have occurred 1112.

Similarly, in an embodiment, if the user has elected to trace the routes to the opt-out servers, the routes are traced 1120. In such an embodiment, if the traces are successful 1124, the system then records the time it took to receive packets from the opt-out servers and to trace the route information 1128. Preferably, the system may be configured to wait for route tracing success for a predetermined duration of time, which may be user defined, and to retry the route tracing operation up to a user defined number of times after waiting for a user defined amount of time 1122, failing after the user defined number of attempts have been made to trace the routes 1126.

Likewise, in an embodiment, if the user has elected to, the opt-out servers' domain registrars may be looked up 1132. In such an embodiment, if the look ups are successful 1138, the system then records the opt-out servers' registrar contact information 1140. Preferably, the system may be configured to wait for the look up of the opt-out servers' domain registrars for a predetermined duration of time, which may be user defined, and to retry the look up operations up to a user defined number of times after waiting for a user defined amount of time 1134, failing after the user defined number of attempts at look up have been attempted 1136.

In an embodiment, if the user has so elected, content may be requested from the opt-out servers 1142. In such an embodiment, if the content requests are successful 1150, the system then opens a user defined number of sockets 1152, saves the date, time, server type, IP address, domain name and other identification information 1154, and traps the content 1156. In an embodiment, the system then checks to determine if the user has elected to send an opt-out message to the opt-out servers' server logs 1158, and, if so, the system looks up the opt out-message 1160, and sends it along with the system installation date when the last socket is available. In either case, in an embodiment, the system next checks to determine if the user has elected to send a complaint message to the opt-out servers' network suppliers 1164, and, if so, the system looks up the user defined network supplier message 1166 and sends it to the opt-out servers' network suppliers 1168. The system may be further configured to check other user preferences 1170, such as whether to dispose of the content 1172, whether to save the content for online viewing 1174, which may be performed by saving the URL to a system database 1178, or whether to save the content for offline viewing 1176, which may be performed by saving the content into a directory on the user's local machine 1180. The system may then continue with the next message 1148.

In an embodiment, the system sends remove email and other electronic message addressed to all sending email or other electronic message domains, reply email or other electronic message domains, response domains or unique identifiers, opt-out domains or unique identifiers and registrar contact information and unique identifiers and traps bounced remove email message and relates them to sending email domains or unique identifiers, reply email domains or unique identifiers, response domains or unique identifiers, opt-out domains or unique identifiers, registrar contact information and unique identifiers and saves bounced message data. In an embodiment, the system also gives the user the ability to modify or compose their own opt-out message and send messages to a domain's network supplier, contact and unique identifiers.

Figure 12:
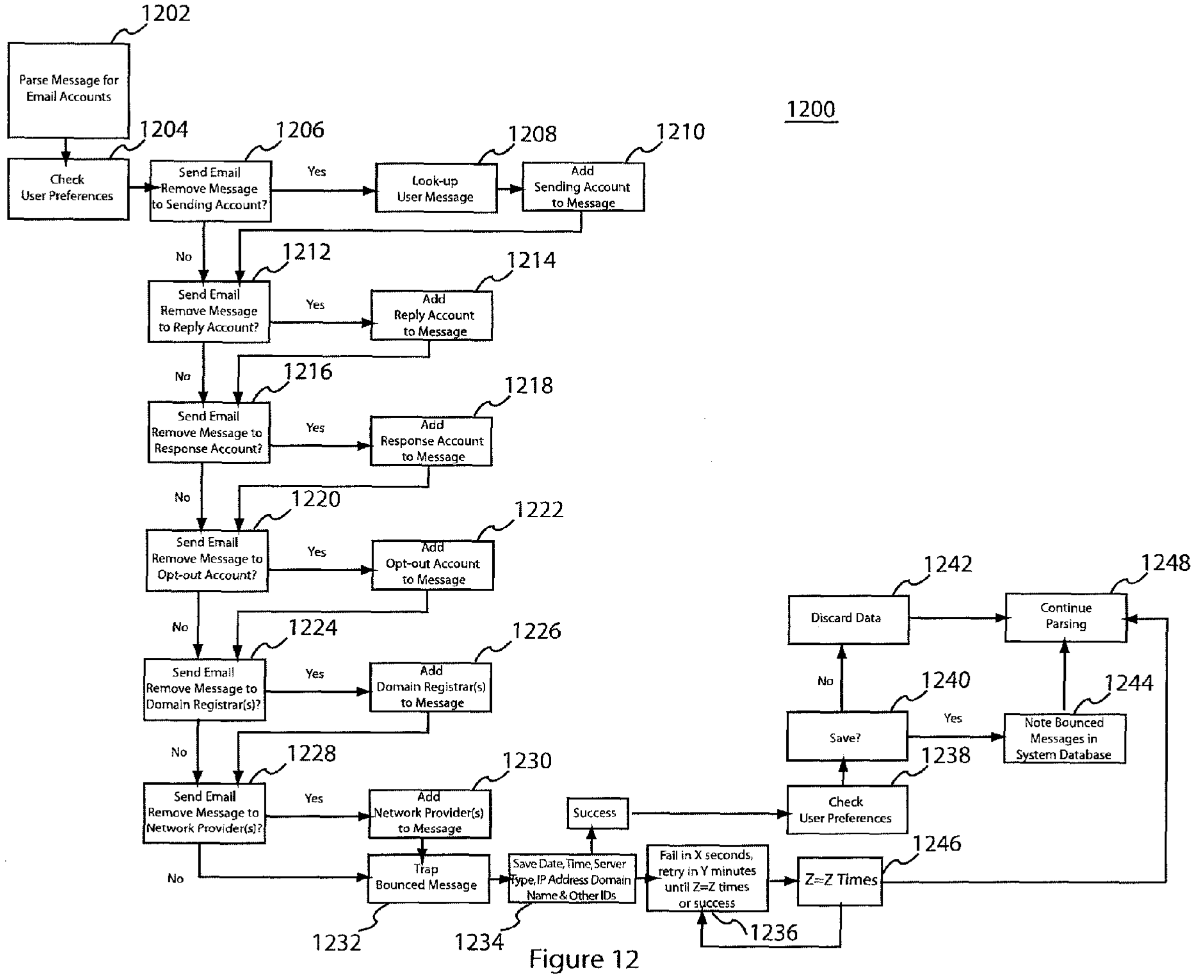
FIG. 12 is a flowchart of an exemplary embodiment for automatic user response to remove links and addresses in accordance with an embodiment of the present invention.

FIG. 12 is a flowchart 1200 of an exemplary embodiment for responding to a remove email link in accordance with an embodiment of the present invention. In an embodiment, the system parses messages for email accounts 1202. When an email account is found, the system checks the user's preferences 1204 to determine the actions to take. In an embodiment, the possible actions include sending an email remove message to the sending account 1206, sending an email remove message to a reply account 1212, a response account 1216, an opt-out account 1220, the domain registrar(s) 1224, or the sender's network provider(s) 1228. Preferably, the system can be configured to perform more than one of these actions. Additionally, in an embodiment, the system can trap any messages that are bounced 1232, saving the time, server type, IP address, domain name and other identification information 1234. In an embodiment, the system will retry sending bounced messages 1236, 1246, and will check user preferences 1238 and save 1240 bounced message data in the system database 1244 or discard it 1242 before resuming the parsing of another message 1248.

An exemplary user interface screen for user setup of electronic message reply to remove email links 5700 is depicted in FIG. 57. In an embodiment, the user may select user preferences for replying to remove email links, such as selecting to send a remove email message to every contact in the unwanted message by selecting check box 5702, or by selecting the recipients from the list of possible recipients by selecting the check box associated with each recipient 5704. In an embodiment, the user may also select whether to save bounced message data by selecting check box 5706. The user's preferences are not acted upon by an exemplary system until the user selects the submit button 5710.

In an embodiment, the system tracks if sending electronic message or email domains, reply electronic message or email domains, response domains, opt-out domains and registrar contact information and unique identifiers are affiliated, and whether they send more email 10 days after an opt-out has been sent.

In an embodiment, the system also tracks received messages that require anonymous FTP log-ins or other electronic server log-ins for received message to display images, and other electronic content, and tracks if the receipt of these images generates new sender generated electronic messages or email. In a further embodiment, if these electronic messages result in new received electronic messages or email, the historic thread of the message is sent to the FTC or other user defined government agencies to lodge a complaint against the sender.

FIG. 58 is an exemplary user interface screen for user setup of electronic message tracking preferences. In an embodiment, the user interface screen 5800 provides the user with a listing of possible tracking options, each associated with a check box 5802. Possible tracking options may include but are not limited to: track if sending, reply and opt-out domains are affiliated; track if more messages are received after 10 days; and track if anonymous FTP login generates new messages. In a further embodiment, the user may select to edit a message to be sent to the unwanted message sender's network supplier 5804. In an embodiment, the user's preferences are not acted on by the system until the user selects the submit button 5806.

Figure 13:
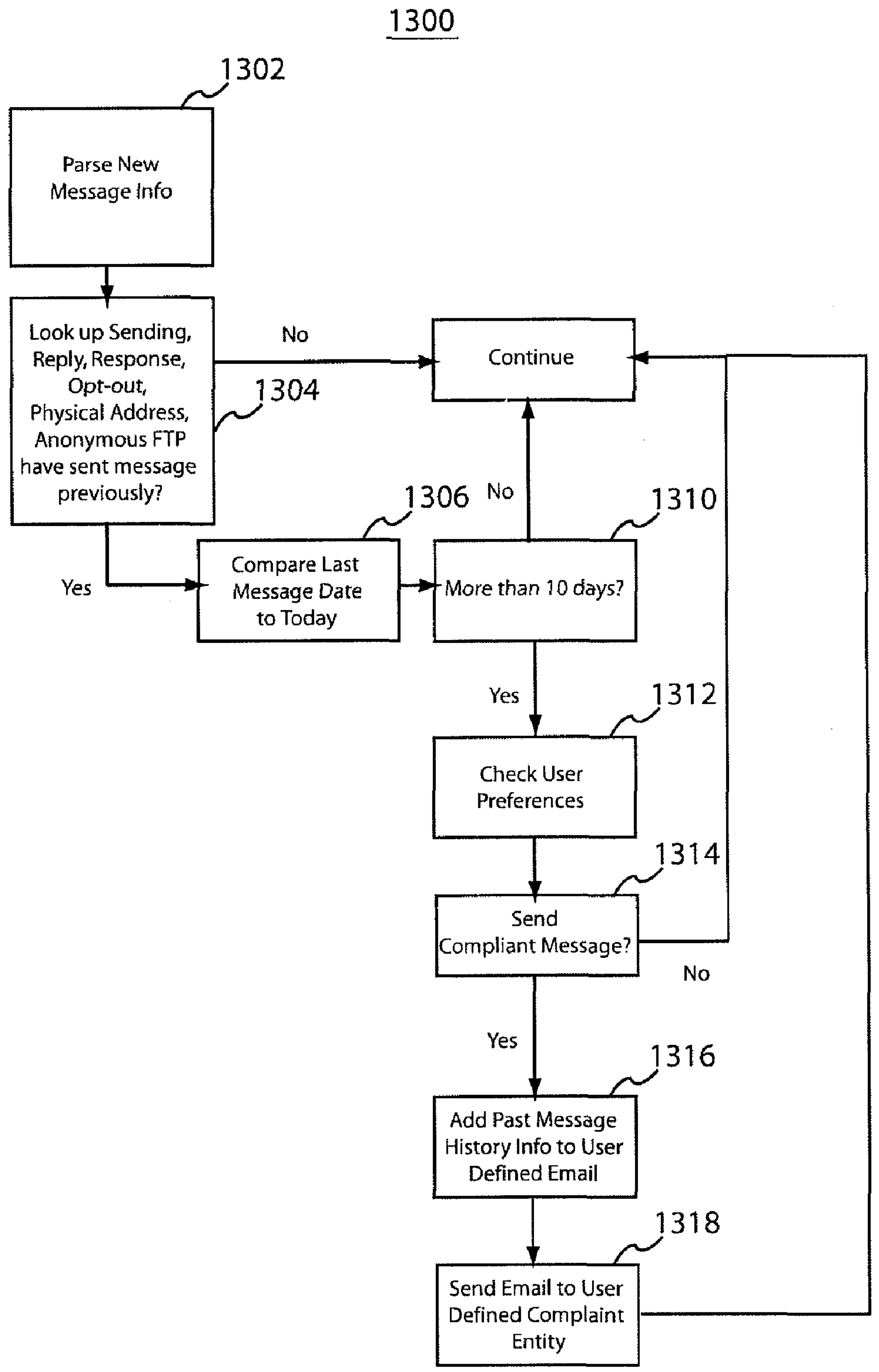
FIG. 13 is a flowchart of an exemplary embodiment for message tracking in accordance with an embodiment of the present invention.

A flowchart of an exemplary process for message tracking 1300 is provided in FIG. 13. In an embodiment, the system parses new message information 1302, and looks up the sending, reply, response, opt-out, physical address, and anonymous FTP information to determine if a message has been sent to the sender previously 1304. If so, in an embodiment, the system compares the last message date to the present date 1306, and if more than 10 days has elapsed 1310, the system checks user preferences 1312, and, if selected by the user, sends a user defined complaint email 1314 and adds the past message history information to the user defined email 1316 and user defined complaint entity 1318.

In an embodiment, the system documents, responds to and removes spyware software that tracks the user's keystrokes, behavior and activities. By parsing the user's machine for all known variants of spyware installed on the machine, in an embodiment, the system identifies and responds to the spyware. In addition, the system preferably identifies network addresses that the spyware is sending information to and receiving data from.

In a further embodiment, the system documents, responds to and removes adware software that tracks the user's keystrokes, behavior and activities and sends advertisements to the user's computer over the network. In an embodiment, by parsing the user's machine for all known variants of adware installed on the machine the system identifies and responds to the adware. In addition, the system preferably identifies network addresses that the adware is sending information to and receiving data from.

In an embodiment, the system documents, responds to and removes computer viruses and worm software that gives the user unexpected results knowingly and or unknowingly. In an embodiment, by parsing the user's machine for all known variants of viruses and worms installed on the machine the system identifies and responds to the viruses and/or worms, and identifies network addresses that the viruses and worms are received from.

In an embodiment, the system documents, responds to and removes botnet software that allows a remote user to control the user's machine manually and automatically over a computer network. In an embodiment, by parsing the user's machine for all known variants of a botnet installed on the machine, the system identifies and responds to the botnet, and identifies network addresses that the botnet is sending information to and receiving data from.

FIGS. 59, 60, 61 and 62 are an exemplary user interface screens for user setup and management of spyware 5900, adware 6000, virus and worm 6100, and botnet 6200 reporting and removal preferences, respectively.

In an embodiment, the user is presented with a user interface screen 5900 for selecting spyware report preferences. For example, the user may be presented with a listing of spyware programs listing information regarding the spyware programs 5904, with a check box associated with each spyware program 5902. In an embodiment, the user instructs the system to remove the spyware program by selecting its associated checkbox 5902. In a further embodiment, the user can instruct the system to remove all spyware by selecting the remove all spyware button 5906. Additionally, in an embodiment, the user can elect to send an opt-out message to the sending server's log, which message can be customized by selecting the edit message check box 5908. Similarly, in an embodiment, the user can elect to send a complaint message to a user specified entity, which message can also be customized by selecting the edit message check box 5910. In an embodiment, the user's preferences do not take effect until the user selects the submit button 5912.

In an embodiment, the user is presented with a user interface screen 6000 for selecting adware report preferences. For example, the user may be presented with a listing of adware programs listing information regarding the adware programs 6004, with a check box associated with each adware program 6002. In an embodiment, the user instructs the system to remove the adware program by selecting its associated checkbox 6002. In a further embodiment, the user can instruct the system to remove all adware by selecting the remove all adware button 6006. Additionally, in an embodiment, the user can elect to send an opt-out message to the sending server's log, which message can be customized by selecting the edit message check box 6008. Similarly, in an embodiment, the user can elect to send a complaint message to a user specified entity, which message can also be customized by selecting the edit message check box 6010. In an embodiment, the user's preferences do not take effect until the user selects the submit button 6012.

In an embodiment, the user is presented with a user interface screen 6100 for selecting virus and worm report preferences. For example, the user may be presented with a listing of virus and worm programs listing information regarding the virus and worm programs 6104, with a check box associated with each virus and worm program 6102. In an embodiment, the user instructs the system to remove the virus or worm program by selecting its associated checkbox 6102. In a further embodiment, the user can instruct the system to remove all viruses and worms by selecting the remove all viruses button 6106. Additionally, in an embodiment, the user can elect to send an opt-out message to the sending server's log, which message can be customized by selecting the edit message check box 6108. Similarly, in an embodiment, the user can elect to send a complaint message to a user specified entity, which message can also be customized by selecting the edit message check box 6110. In an embodiment, the user's preferences do not take effect until the user selects the submit button 6112.

In an embodiment, the user is presented with a user interface screen 6200 for selecting botnet report preferences. For example, the user may be presented with a listing of botnet programs listing information regarding the botnet programs 6204, with a check box associated with each botnet program 6202. In an embodiment, the user instructs the system to remove the botnet program by selecting its associated checkbox 6202. In a further embodiment, the user can instruct the system to remove all botnet by selecting the remove all viruses button 6206. Additionally, in an embodiment, the user can elect to send an opt-out message to the sending server's log, which message can be customized by selecting the edit message check box 6208. Similarly, in an embodiment, the user can elect to send a complaint message to a user specified entity, which message can also be customized by selecting the edit message check box 6210. In an embodiment, the user's preferences do not take effect until the user selects the submit button 6212.

Figure 14:
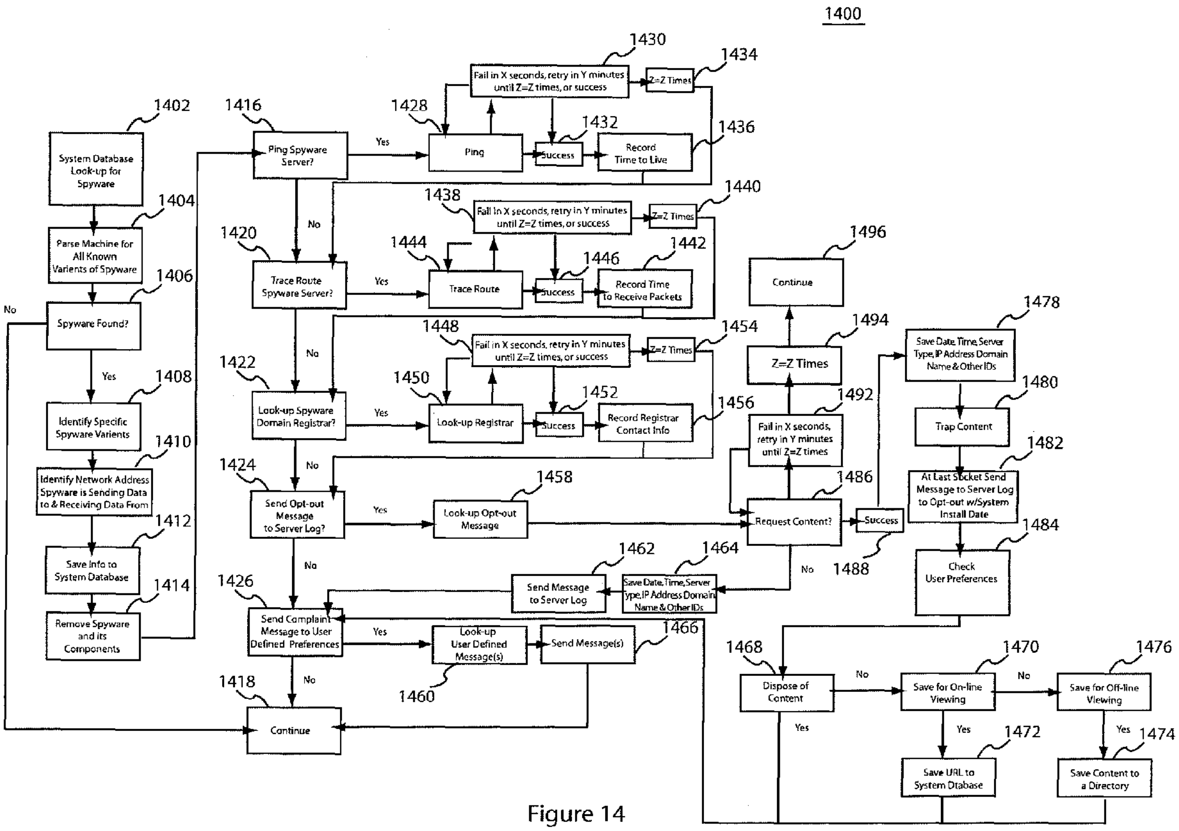
FIG. 14 is a flowchart of an exemplary embodiment for responding to spyware in accordance with an embodiment of the present invention.

A flowchart of an exemplary embodiment for responding to spyware is provided in FIG. 14. In an embodiment, the system looks up the spyware in a system database 1402, and parses the incoming messages and machine for all known variants of the spyware 1404. If the spyware and its variants are not found 1406 in a message or on the machine, the system preferably continues with the next message 1418. Otherwise, in an embodiment, the system identifies 1408 the specific spyware variants found in the message or machine, identifies the network addresses the spyware is sending data to and receiving data from 1410 (hereinafter, the "spyware server"), saves this information in a system database 1412, and removes the spyware and its components 1414. In an embodiment, the system then checks user preferences to determine if the user has elected to ping the spyware server 1416, trace the route to the spyware server 1420, look up the spyware server's domain registrar 1422, send an opt-out message to the spyware server's log 1424, send a complaint message to a user defined third party 1426. If none of these actions were selected by the user, then the system preferably continues with the next message 1418.

Otherwise, in an embodiment, if the user has elected to ping the spyware server, it is pinged 1428. In such an embodiment, if the ping is successful 1432, the system then records the time expended by the pinging operation 1436. Preferably, the system may be configured to wait for pinging success for a predetermined duration of time, which may be user defined, and to retry the pinging operation up to a user defined number of times after waiting for a user defined amount of time 1430, failing after the user defined number of pinging attempts have occurred 1434.

Similarly, in an embodiment, if the user has elected to trace the route to the spyware server, the route is traced 1444. In such an embodiment, if the trace is successful 1446, the system then records the time it took to receive packets from the spyware server and to trace the route information 1442. Preferably, the system may be configured to wait for route tracing success for a predetermined duration of time, which may be user defined, and to retry the route tracing operation up to a user defined number of times after waiting for a user defined amount of time 1438, failing after the user defined number of attempts have been made to trace the route 1440.

Likewise, in an embodiment, if the user has elected to, the spyware server's domain registrar may be looked up 1450. In such an embodiment, if the look up is successful 1452, the system then records the spyware server's registrar contact information 1456. Preferably, the system may be configured to wait for the look up of the spyware server's domain registrar for a predetermined duration of time, which may be user defined, and to retry the look up operation up to a user defined number of times after waiting for a user defined amount of time 1448, failing after the user defined number of attempts at look up have been made 1454.

In an embodiment, if the user has so elected, the system may send an opt-out message. In such an embodiment, the system looks up the opt-out message in a system database 1458, and may then determine if the user has elected to request content from the spyware server 1486. If the user has elected to request content and the content request is successful 1488, the system saves the date, time, server type, IP address, domain name and other identification information 1478, and traps the content 1480. Otherwise, if the content request is not successful, in an embodiment, the user may configure the system to retry the content request after a user defined delay, for a user defined number of times 1492, failing after the user defined number of attempts at lookup have been made 1494, the system continues 1496. In an embodiment, if the content request is not successful, the system saves the date, time, server type, IP address, domain name and other identifiers 1464, and sends a message to the spyware server log 1462. In an embodiment, the system sends the opt-out message along with the system installation date when the last socket is available 1482. In either case, in an embodiment, the system may be further configured to check other user preferences 1484, such as whether to dispose of the content 1468, whether to save the content for online viewing 1470, which may be performed by saving the URL to a system database 1472, or whether to save the content for offline viewing 1476, which may be performed by saving the content into a directory on the user's local machine 1474.

Similarly, in an embodiment, if the user has elected to send a complaint message to one or more user defined third parties, the system looks up the user defined messages to send 1460 and sends the messages to the user defined third parties 1466.

Figure 15:
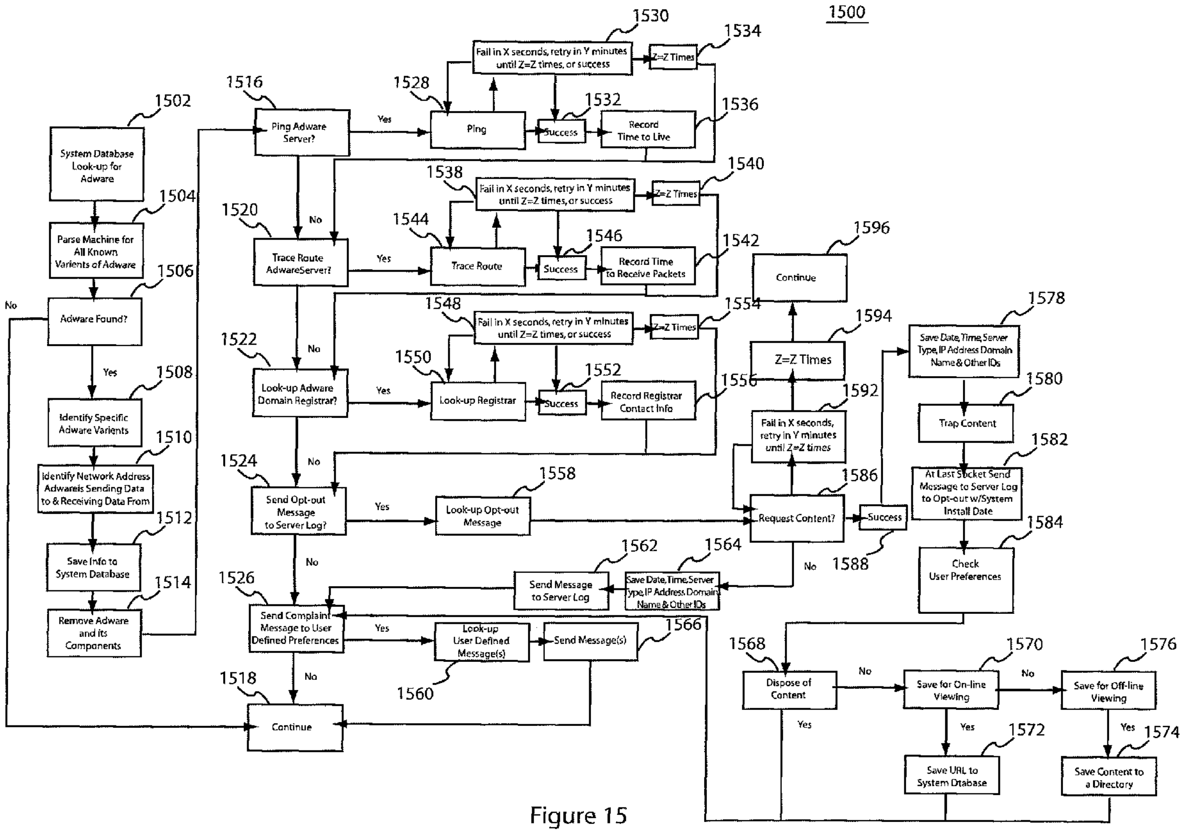
FIG. 15 is a flowchart of an exemplary embodiment for responding to adware in accordance with an embodiment of the present invention.

A flowchart of an exemplary embodiment for responding to adware is presented in FIG. 15. In an embodiment, the system looks up the adware in a system database 1502, and parses incoming messages and machine for all known variants of the adware 1504. If the adware and its variants are not found 1506 in a message or on the machine, the system preferably continues with the next message 1518. Otherwise, in an embodiment, the system identifies 1508 the specific adware variants found on the user's machine, identifies the network addresses the adware is sending data to and receiving data from 1510 (hereinafter, the "adware server"), saves this information in a system database 1512, and removes the adware and its components 1514. In an embodiment, the system then checks user preferences to determine if the user has elected to ping the adware server 1516, trace the route to the adware server 1520, look up the adware server's domain registrar 1522, send an opt-out message to the adware server's log 1524, send a complaint message to a user defined third party 1526. If none of these actions were selected by the user, then the system preferably continues with the next message 1518.

Otherwise, in an embodiment, if the user has elected to ping the adware server, it is pinged 1528. In such an embodiment, if the ping is successful 1532, the system then records the time expended by the pinging operation 1536. Preferably, the system may be configured to wait for pinging success for a predetermined duration of time, which may be user defined, and to retry the pinging operation up to a user defined number of times after waiting for a user defined amount of time 1530, failing after the user defined number of pinging attempts have occurred 1534.

Similarly, in an embodiment, if the user has elected to trace the route to the adware server, the route is traced 1544. In such an embodiment, if the trace is successful 1546, the system then records the time it took to receive packets from the adware server and to trace the route information 1542. Preferably, the system may be configured to wait for route tracing success for a predetermined duration of time, which may be user defined, and to retry the route tracing operation up to a user defined number of times after waiting for a user defined amount of time 1538, failing after the user defined number of attempts have been made to trace the route 1540.

Likewise, in an embodiment, if the user has elected to, the adware server's domain registrar may be looked up 1550. In such an embodiment, if the look up is successful 1552, the system then records the adware server's registrar contact information 1556. Preferably, the system may be configured to wait for the look up of the adware server's domain registrar for a predetermined duration of time, which may be user defined, and to retry the look up operation up to a user defined number of times after waiting for a user defined amount of time 1548, failing after the user defined number of attempts at look up have been made 1554.

In an embodiment, if the user has so elected, the system may send an opt-out message. In such an embodiment, the system looks up the opt-out message in a system database 1558, and may then determine if the user has elected to request content from the adware server 1586. If the user has elected to request content and the content request is successful 1588, the system saves the date, time, server type, IP address, domain name and other identification information 1578, and traps the content 1580. Otherwise, if the content request is not successful, in an embodiment, the user may configure the system to retry the content request after a user defined delay, for a user defined number of times 1592, failing after the user-defined number of attempts at lookup have been made 1594, after which the system continues 1596. In an embodiment, if the content request is not successful, the system saves the date, time, server type, IP address, domain name and other identifiers 1564, and sends a message to the adware server log 1562. In an embodiment, the system sends the opt-out message along with the system installation date when the last socket is available 1582. In either case, in an embodiment, the system may be further configured to check other user preferences 1584, such as whether to dispose of the content 1568, whether to save the content for online viewing

1570, which may be performed by saving the URL to a system database 1572, or whether to save the content for offline viewing 1576, which may be performed by saving the content into a directory on the user's local machine 1574.

Similarly, in an embodiment, if the user has elected to send a complaint message to one or more user defined third parties, the system looks up the user defined messages to send 1560 and sends the messages to the user defined third parties 1566.

Figure 16:
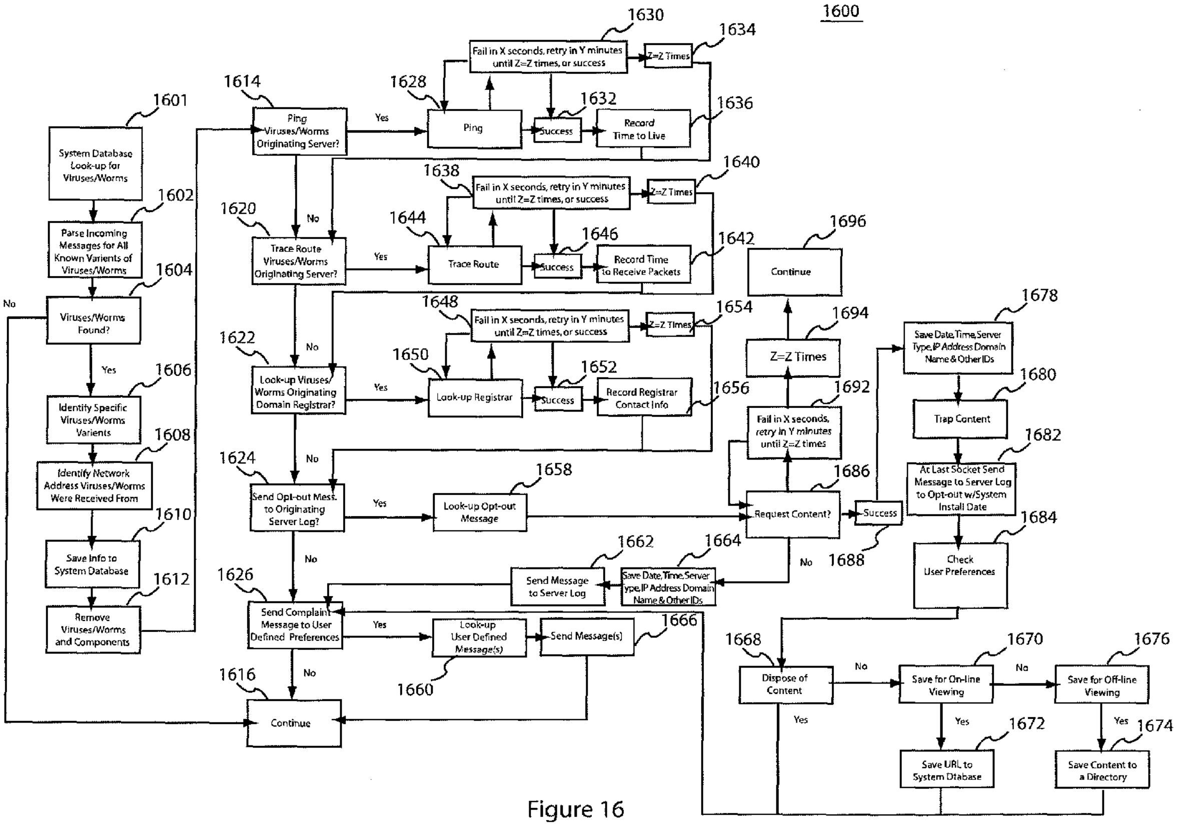
FIG. 16 is a flowchart of an exemplary embodiment for responding to viruses and worms in accordance with an embodiment of the present invention.

A flowchart of an exemplary embodiment for responding to viruses and worms is presented in FIG. 16. In an embodiment, the system looks up the viruses and worms in a system database 1601, and parses incoming messages and machine for all known variants of the viruses and worms 1602. If the viruses and worms and their variants are not found 1604 in a message or on the machine, the system preferably continues with the next message 1616. Otherwise, in an embodiment, the system identifies 1606 the specific virus and worm variants found in the message, identifies the network addresses the viruses and worms were received from 1608 (hereinafter, the "virus and worm server"), saves this information in a system database 1610, and removes the viruses and worms and their components 1612. In an embodiment, the system then checks user preferences to determine if the user has elected to ping the virus and worm server 1614, trace the route to the virus and worm server 1620, look up the virus and worm server's domain registrar 1622, send an opt-out message to the virus and worm server's log 1624, or send a complaint message to a user defined third party 1626. If none of these actions were selected by the user, then the system preferably continues with the next message 1616.

Otherwise, in an embodiment, if the user has elected to ping the virus and worm server, it is pinged 1628. In such an embodiment, if the ping is successful 1632, the system then records the time expended by the pinging operation 1636. Preferably, the system may be configured to wait for pinging success for a predetermined duration of time, which may be user defined, and to retry the pinging operation up to a user defined number of times after waiting for a user defined amount of time 1630, failing after the user defined number of pinging attempts have occurred 1634.

Similarly, in an embodiment, if the user has elected to trace the route to the virus and worm server, the route is traced 1644. In such an embodiment, if the trace is successful 1646, the system then records the time it took to receive packets from the virus and worm server and to trace the route information 1642. Preferably, the system may be configured to wait for route tracing success for a predetermined duration of time, which may be user defined, and to retry the route tracing operation up to a user defined number of times after waiting for a user defined amount of time 1638, failing after the user defined number of attempts have been made to trace the route 1640.

Likewise, in an embodiment, if the user has elected to, the virus and worm server's domain registrar may be looked up 1650. In such an embodiment, if the look up is successful 1652, the system then records the virus and worm server's registrar contact information 1656. Preferably, the system may be configured to wait for the look up of the virus and worm server's domain registrar for a predetermined duration of time, which may be user defined, and to retry the look up operation up to a user defined number of times after waiting for a user defined amount of time 1648, failing after the user defined number of attempts at look up have been made 1654.

In an embodiment, if the user has so elected, the system may send an opt-out message. In such an embodiment, the system looks up the opt-out message in a system database 1658, and may then determine if the user has elected to request content from the virus and worm server 1686. If the user has elected to request content and the content request is successful 1688, the system saves the date, time, server type, IP address, domain name and other identification information 1678, and traps the content 1680. Otherwise, if the content request is not successful, in an embodiment, the user may configure the system to retry the content request after a user defined delay, for a user defined number of times 1692, failing after the user defined number of attempts at look up have been made 1694, and the system continues 1696. In an embodiment, if the content request is not successful, the system saves the date, time, server type, IP address, domain name and other identifiers 1664, and sends a message to the virus and worm server log 1662. In an embodiment, the system sends the opt-out message along with the system installation date when the last socket is available 1682. In either case, in an embodiment, the system may be further configured to check other user preferences 1684, such as whether to dispose of the content 1668, whether to save the content for online viewing 1670, which may be performed by saving the URL to a system database 1672, or whether to save the content for offline viewing 1676, which may be performed by saving the content into a directory on the user's local machine 1674.

Similarly, in an embodiment, if the user has elected to send a complaint message to one or more user defined third parties, the system looks up the user defined messages to send 1660 and sends the messages to the user defined third parties 1666.

Figure 17:
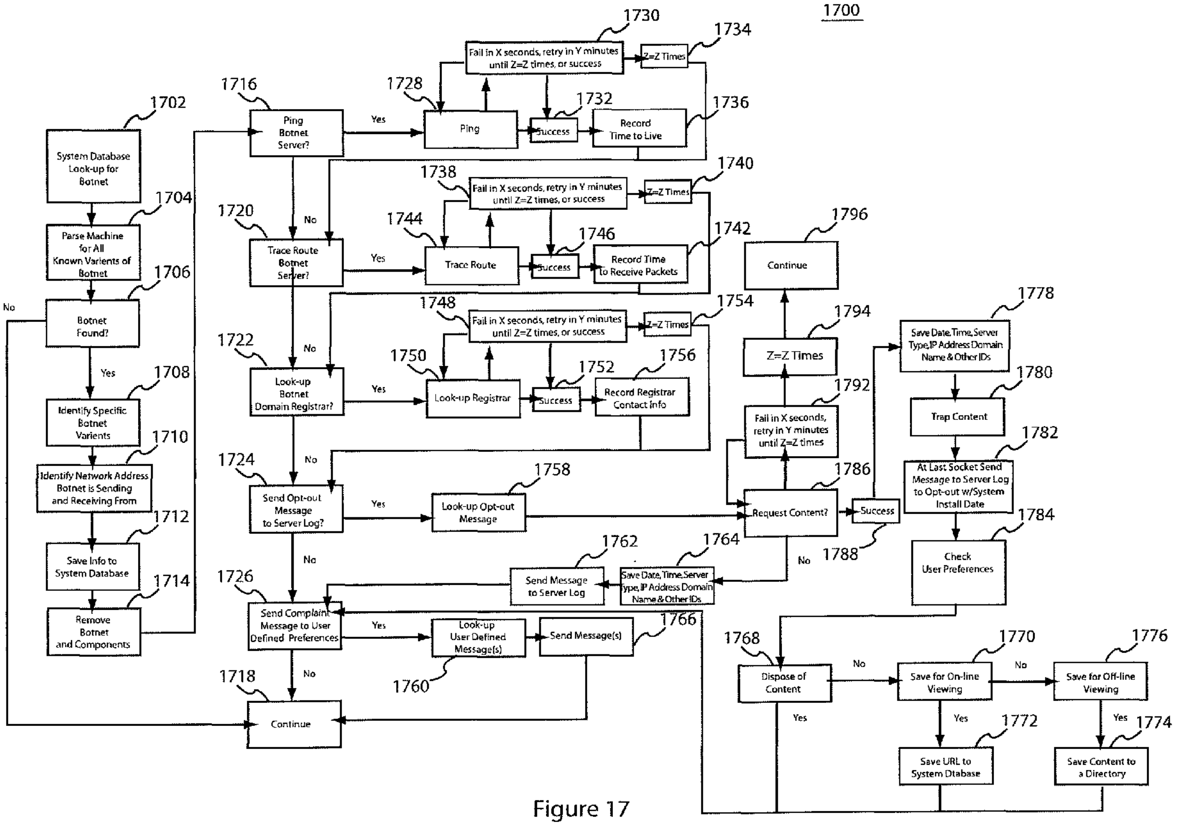
FIG. 17 is a flowchart of an exemplary embodiment for responding to botnets in accordance with an embodiment of the present invention.

A flowchart of an exemplary embodiment for responding to botnets is presented in FIG. 17. In an embodiment, the system looks up the botnets in a system database 1702, and parses incoming messages and machine for all known variants of the botnets 1704. If the botnets and their variants are not found 1706 in a message or on the machine, the system preferably continues with the next message 1718. Otherwise, in an embodiment, the system identifies 1708 the specific botnet variants found in the message or on the machine, identifies the network addresses the botnet sends to and receives from 1710 (hereinafter, the "botnet server"), saves this information in a system database 1712, and removes the botnet and its components 1714. In an embodiment, the system then checks user preferences to determine if the user has elected to ping the botnet server 1716, trace the route to the botnet server 1720, look up the botnet server's domain registrar 1722, send an opt-out message to the botnet server's log 1724, or send a complaint message to a user defined third party 1726. If none of these actions were selected by the user, then the system preferably continues with the next message 1718.

Otherwise, in an embodiment, if the user has elected to ping the botnet server, it is pinged 1728. In such an embodiment, if the ping is successful 1732, the system then records the time expended by the pinging operation 1736. Preferably, the system may be configured to wait for pinging success for a predetermined duration of time, which may be user defined, and to retry the pinging operation up to a user defined number of times after waiting for a user defined amount of time 1730, failing after the user defined number of pinging attempts have occurred 1734.

Similarly, in an embodiment, if the user has elected to trace the route to the botnet server, the route is traced 1744. In such an embodiment, if the trace is successful 1746, the system then records the time it took to receive packets from the botnet server and to trace the route information 1742. Preferably, the system may be configured to wait for route tracing success for a predetermined duration of time, which may be user defined, and to retry the route tracing operation up to a user defined number of times after waiting for a user defined amount of time 1738, failing after the user defined number of attempts have been made to trace the route 1740.

Likewise, in an embodiment, if the user has elected to, the botnet server's domain registrar may be looked up 1750. In such an embodiment, if the look up is successful 1752, the system then records the botnet server's registrar contact information 1756. Preferably, the system may be configured to wait for the look up of the botnet server's domain registrar for a predetermined duration of time, which may be user defined, and to retry the look up operation up to a user defined number of times after waiting for a user defined amount of time 1748, failing after the user defined number of attempts at look up have been made 1754.

In an embodiment, if the user has so elected, the system may send an opt-out message. In such an embodiment, the system looks up the opt-out message in a system database 1758, and may then determine if the user has elected to request content from the botnet server 1786. If the user has elected to request content and the content request is successful 1788, the system saves the date, time, server type, IP address, domain name and other identification information 1778, and traps the content 1780. Otherwise, if the content request is not successful, in an embodiment, the user may configure the system to retry the content request after a user defined delay, for a user defined number of times 1792, failing after the user defined number of attempts at look up have been made 1794, and the system continues 1796. In an embodiment, if the content request is not successful, the system saves the date, time, server type, IP address, domain name and other identifiers 1764, and sends a message to the botnet server log 1762. In an embodiment, the system sends the opt-out message along with the system installation date when the last socket is available 1782. In either case, in an embodiment, the system may be further configured to check other user preferences 1784, such as whether to dispose of the content 1768, whether to save the content for online viewing 1770, which may be performed by saving the URL to a system database 1772, or whether to save the content for offline viewing 1776, which may be performed by saving the content into a directory on the user's local machine 1774.

Similarly, in an embodiment, if the user has elected to send a complaint message to one or more user defined third parties, the system looks up the user defined messages to send 1760 and sends the messages to the user defined third parties 1766.

In an embodiment, the system offers a client version of its software for narrow band PDAs and cellular phones that is designed to gather unwanted message information as described above, and then either automatically or manually transfer the message information to a broad band or wired device equipped with the system software for further response processing.

Figure 63:
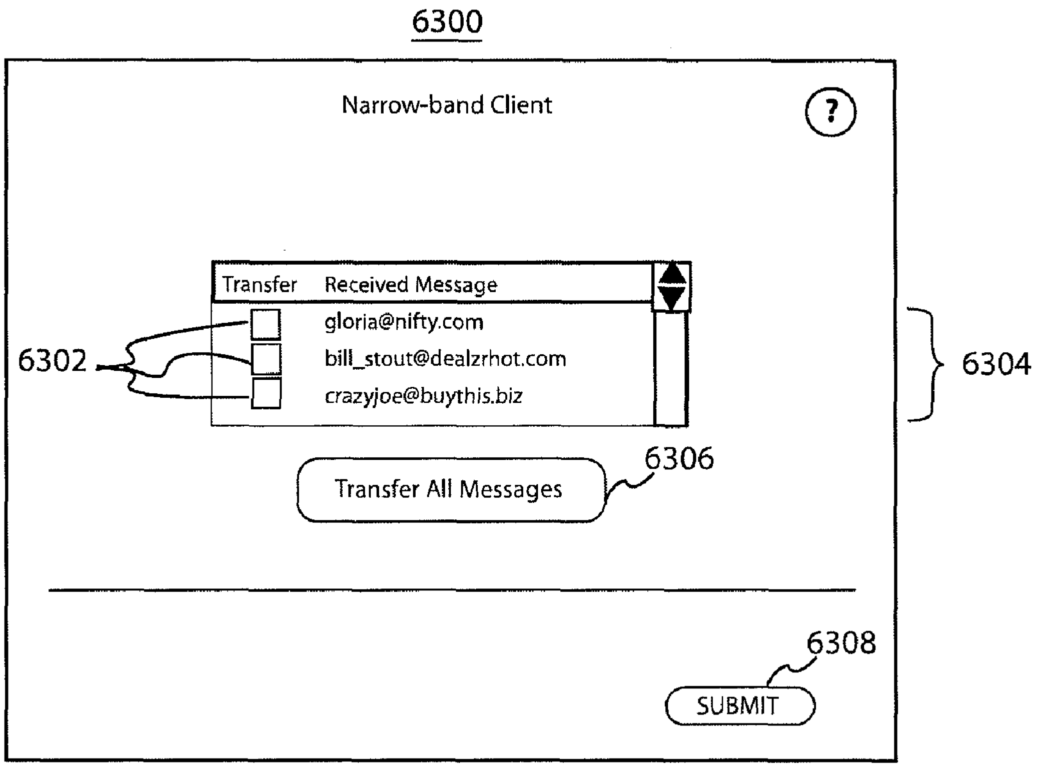
FIG. 63 is an exemplary user interface screen for user setup of narrow-band client to transfer messages in accordance with an embodiment of the present invention.

FIG. 63 is user interface screen for user setup of a narrowband client to transfer messages 6300 in accordance with an embodiment of the present invention. In an embodiment, the user is presented with a listing of received messages 6304, identified, for example by the sender, or by some other criteria, each received message associated with a check box 6302. The user in an embodiment may transfer the received messages either by selecting the check box associated with the message to be transferred and selecting the submit button 6308, or by selecting the transfer all messages button 6306.

Figure 64:
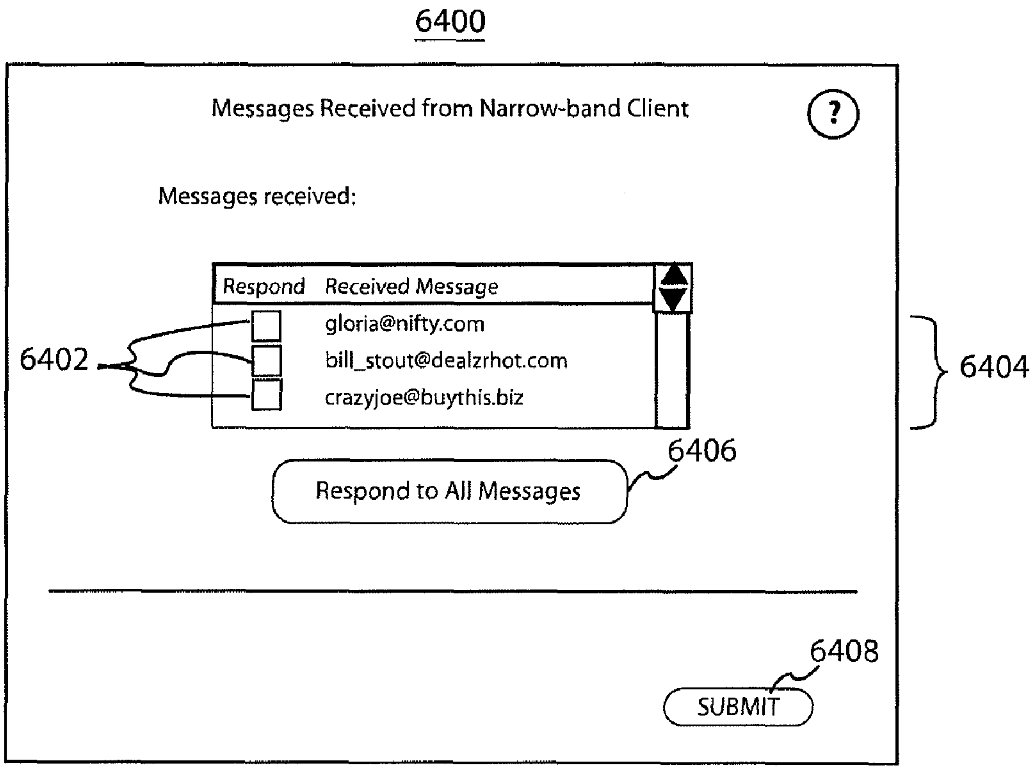
FIG. 64 is an exemplary user interface screen for user setup of response to messages transferred from a narrow-band client in accordance with an embodiment of the present invention.

In a further embodiment, FIG. 64 is an exemplary user interface screen for user setup of handling of messages transferred from a narrow-band client 6400. In an embodiment, the user may be presented with a listing 6404 of the messages sent from the narrow-band client, each message associated with a check box 6402. The user in an embodiment may respond to received messages either by selecting the check box associated with the message and selecting the submit button 6408, or by selecting the respond to messages button 6406.

Figure 18:
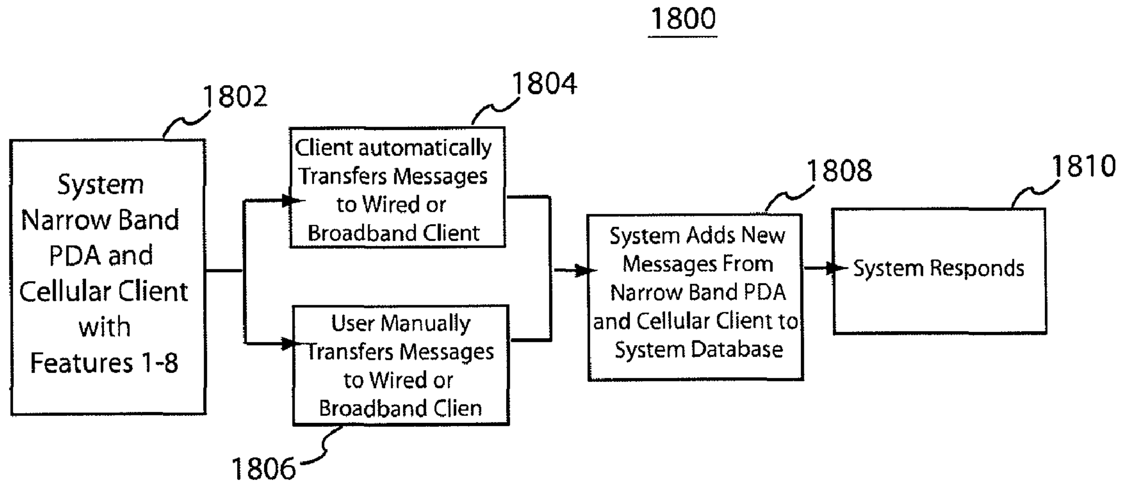
FIG. 18 is a flowchart of an exemplary embodiment for personal digital assistants ("PDAs") and cellular telephones in accordance with an embodiment of the present invention.

A flowchart of an exemplary embodiment for personal digital assistants ("PDAs") and cellular telephones is provided in FIG. 18. In an embodiment, a narrow-band PDA or cellular client 1802 is configured by the user to automatically 1804 or manually 1806 transfer messages to a wired or broadband client. Preferably, the system adds new messages for the narrow-band PDA or cellular client to the system database 1808, where system responses are generated 1810, as described above.

In an embodiment, the system queries DNS servers looking for how many domains are served by a specific IP address, IP family, router, or hosting company.

Figure 19:
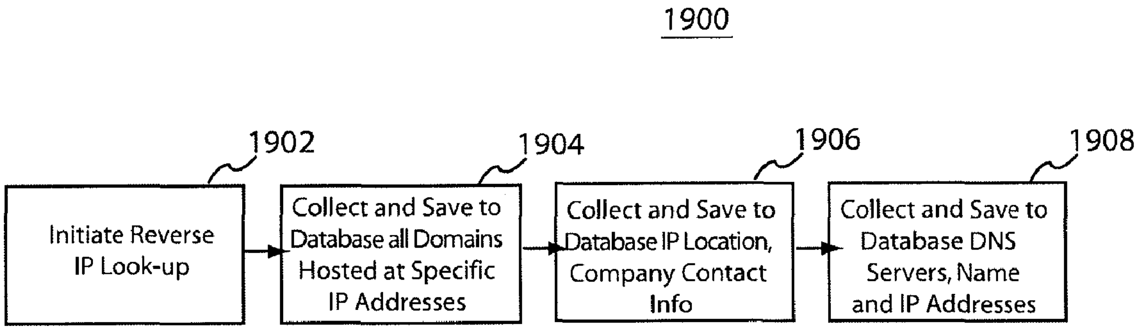
FIG. 19 is a flowchart of an exemplary embodiment for querying DNS servers for reverse lookup of messages hosted in accordance with an embodiment of the present invention.

A flowchart of an exemplary embodiment for querying DNS servers for reverse lookup of messages hosted 1900 is presented in FIG. 19. In an embodiment, the system may be configured to initiate reverse IP lookup 1902, collect and save all domains hosted at a specific IP address to a system database 1904, collect and save IP location and company contact information to a system database 1906, and collect and save DNS server information, names and IP addresses to a system database 1908.

In an embodiment of the invention, a super node server has the same functions as super node version of system software except it is configured at the email server and responds to administrator commands for email or electronic message users on its system, allowing for mass intercept and response based on administrator commands. In an embodiment, the system also allows for intercept and response based on recorded user intercepts. Also in an embodiment, each user of the super node server is a node.

Figure 20:
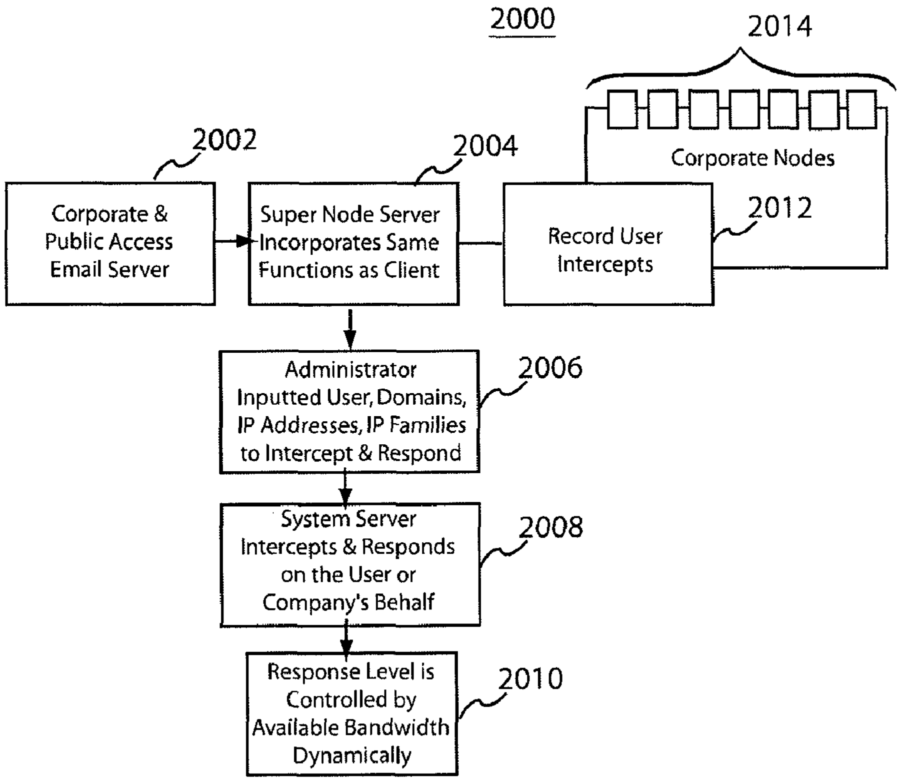
FIG. 20 is a flowchart of an exemplary embodiment for use of super node servers in accordance with an embodiment of the present invention.

A flowchart of an exemplary embodiment for use of super node servers 2000 is provided in FIG. 20. In an embodiment, a corporate or public access email server 2002 may be used as a system super node server, or it may alternatively forward received emails to a system super node server. In either case, the system super node server may incorporate the same functions 2004 as a non-super node client node, as described above. In an embodiment, the system super node server may record user intercepts 2012 from corporate nodes 2014. In an embodiment, the system super node administrator is preferably able to input users, domains, IP addresses, and IP families to intercept and respond 2006, in a manner analogous with the user selections described above. In an embodiment, the system super node server intercepts and responds to unwanted messages on behalf of the company or on behalf of each individual user 2008. The response level of the system super node is preferably controlled dynamically based on available bandwidth 2010.

In an embodiment, the system is designed to give reports regarding all of the systems inputs and outputs to the user on screen, and also allows printing.

Figure 21:
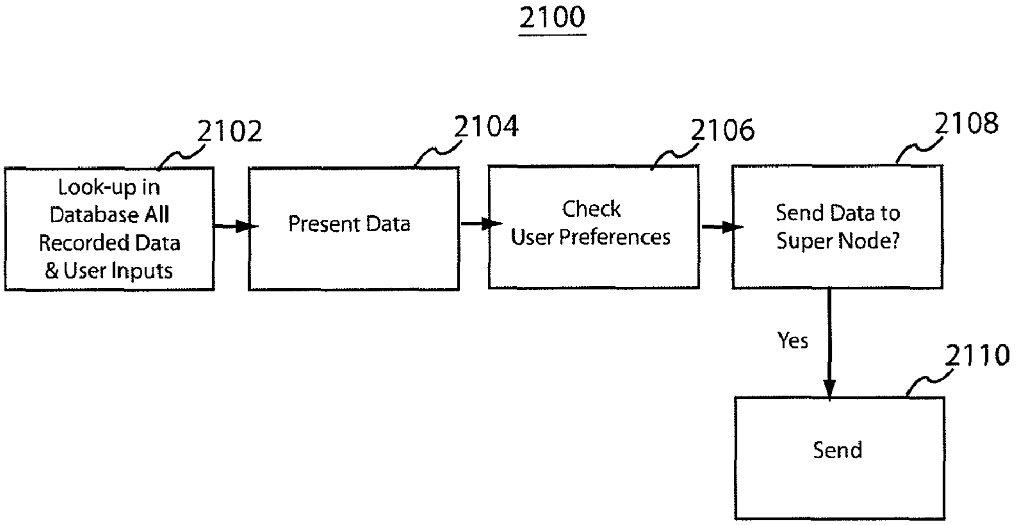
FIG. 21 is a flowchart of an exemplary embodiment for report generation and forwarding of data to a super node in accordance with an embodiment of the present invention.

FIG. 21 is a flowchart of an exemplary embodiment for report generation and forwarding of data to a super node. In an embodiment, all data recorded by the system and user inputs are stored in a database and looked up 2102 when a report is to be generated. In an embodiment, the required data is then presented to a user 2104, who may also check or change user preferences for report generation 2106. Preferably, the user may also elect to send data to one or more super nodes, 2108, 2110.

Figure 22:
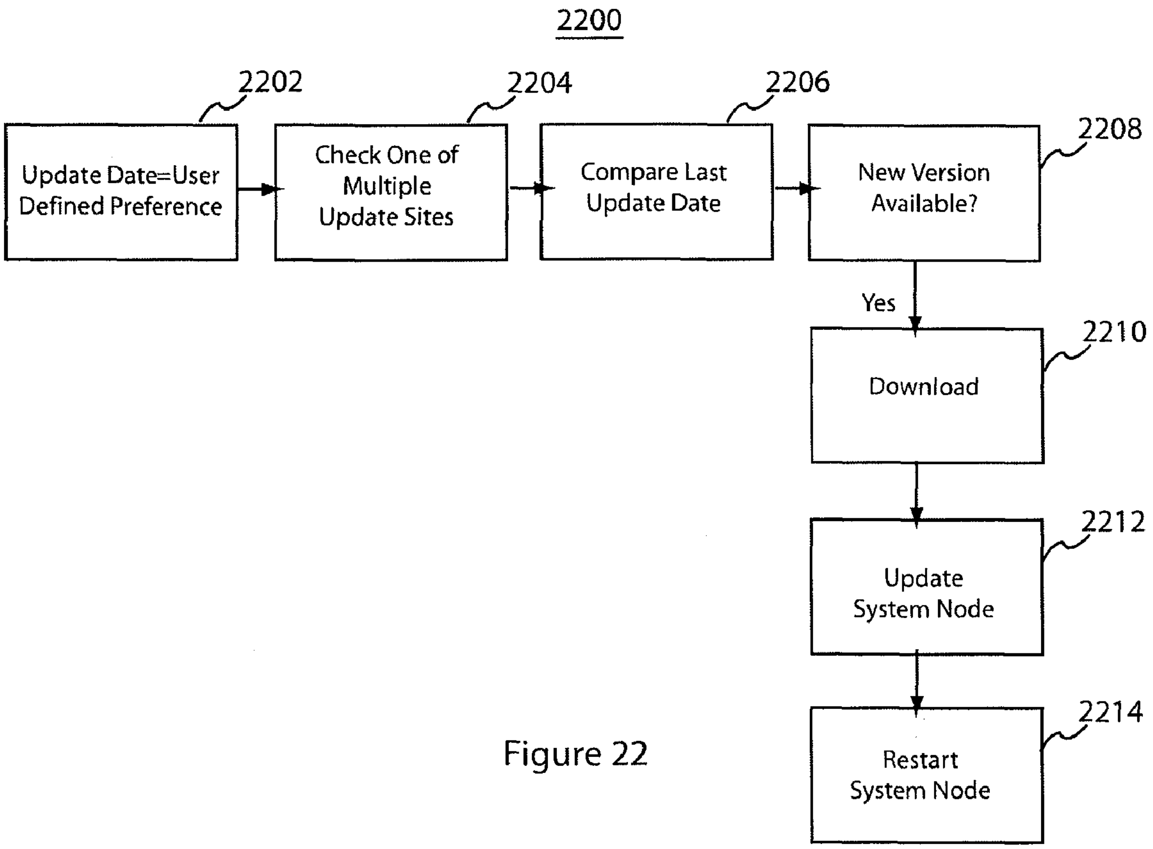
FIG. 22 is a flowchart of an exemplary embodiment for updating software in accordance with an embodiment of the present invention.

In an embodiment, the system is designed to allow for user defined version updating at pre-determined times and on user command. FIG. 22 is a flowchart of an exemplary embodiment for updating system software 2200. In an embodiment, the user sets a user defined preference for the date for the system to check for a version update 2202. In such an embodiment, on the update date the system preferably checks one of several available update sites 2204, comparing the last update date 2206 with the available update to determine whether a new version of the system software is available 2208. If a new version is available, the system preferably downloads the new version 2210, and updates 2212 and restarts 2214 the system node.

In an embodiment, the system client software is designed to copy its preference settings and database for transfer to additional machines, install a new copy of the system software, automatically install the user settings and database to the user specific protected accounts, and download a new copy of the system software for installation, or make a copy of the system's download program available for distribution to other users for installation and purchase. In an embodiment, the system software is designed to be readily copied and provided to other users as a means of promulgating wide use of the system.

Figure 23:
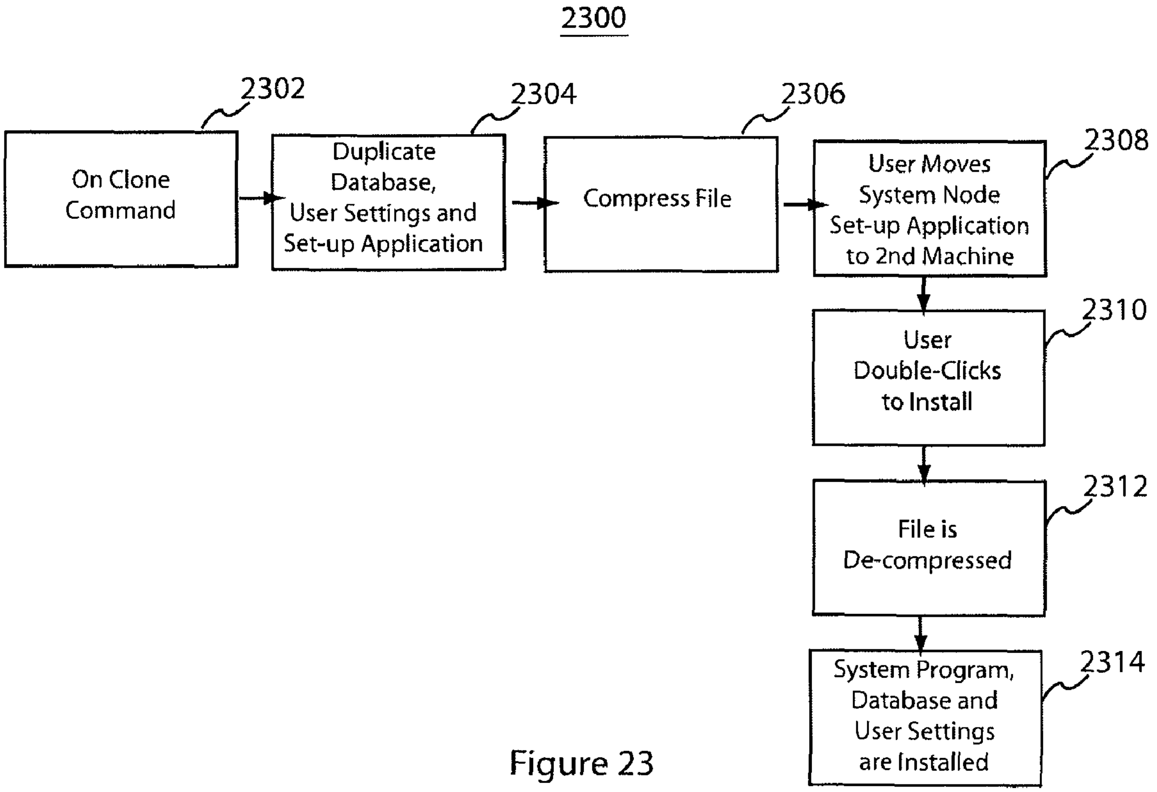
FIG. 23 is a flowchart of an exemplary embodiment for cloning an individual system node in accordance with an embodiment of the present invention.

A flowchart of an exemplary embodiment for cloning 2300 an individual system node is provided in FIG. 23. In an embodiment, the system receives a command to be cloned 2302 onto a second machine. For example, a user may provide the cloning command, or it may be provided by other means. In response to receiving the clone command, in an embodiment, the system duplicates the database, user settings and a setup application 2304, compresses these 2306 into one or more files for transmission to the second machine 2308, wherein the user of the second machine elects 2310 to install these files. In an embodiment, the files are then decompressed 2312 onto the second machine, where the system programs, database and user settings are then installed 2314.

Figure 24:
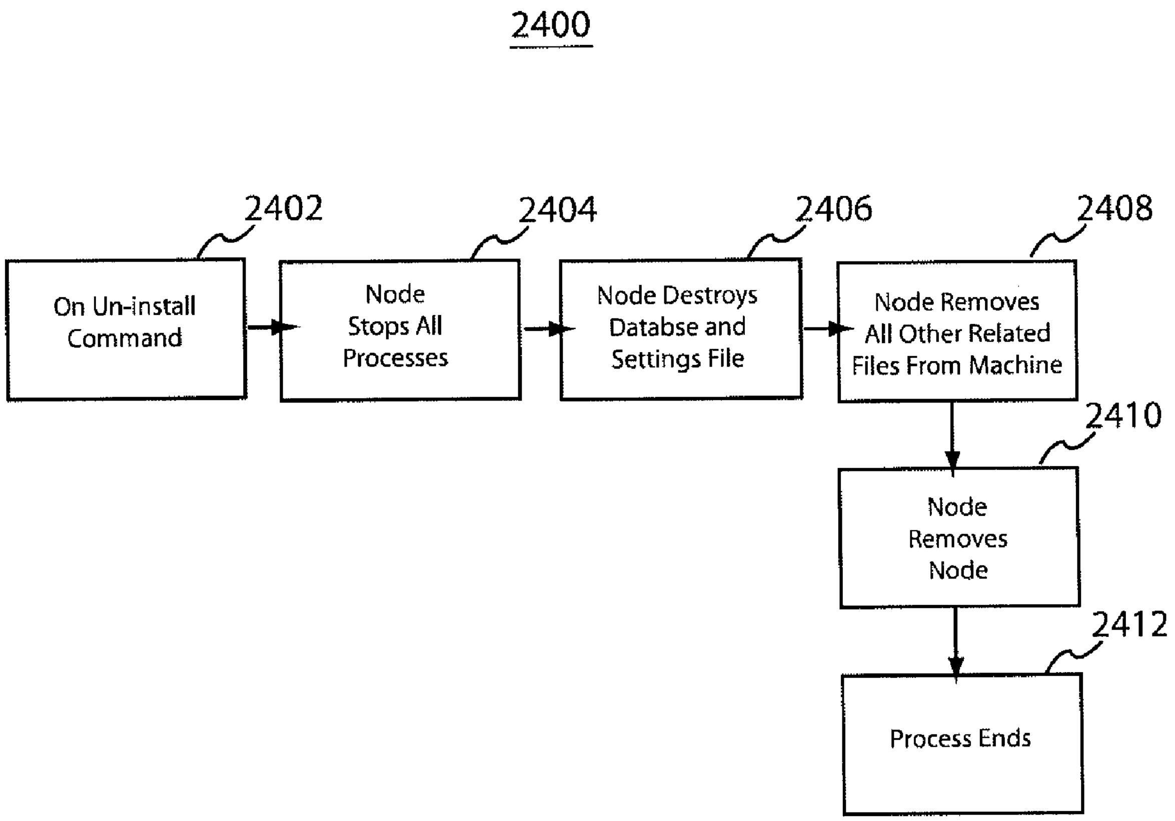
FIG. 24 is a flowchart of an exemplary embodiment for uninstalling system files in accordance with an embodiment of the present invention.

In an embodiment, the system is designed to be uninstalled from a machine upon user command, to subsequently remove all associated files. A flowchart of an exemplary embodiment for uninstalling system files 2400 is provided in FIG. 24. In an embodiment, the system running on a machine receives a uninstall command 2402, and then proceeds to stop all node processes 2404, destroy system database and settings files 2406, remove all related files from the machine 2408, and removes the system node 2410, completing the uninstall process 2412.

In an embodiment, the user is also provided with an opt-out data extraction tool, designed to give message senders an easy way to comply with system opt-out requests. For example, by parsing the message senders' server logs for the system opt-out information, and either deleting system opt-out addresses directly or extracting the opt-out data and importing directly to the message senders' database, the user may access the opt out feature somewhat more on their own terms.

Figure 25:
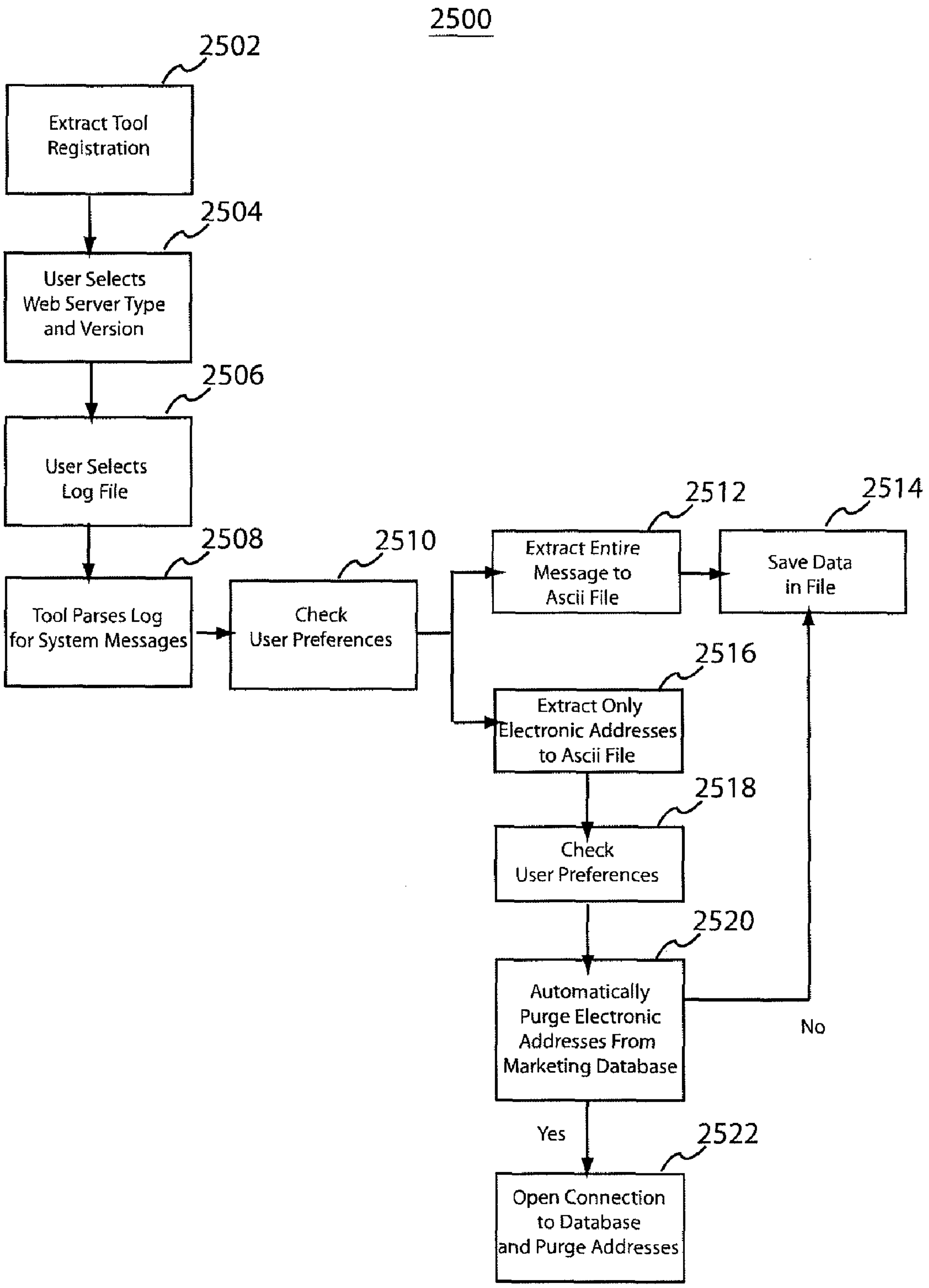
FIG. 25 is a flowchart of an exemplary embodiment for an opt-out data extraction tool in accordance with an embodiment of the present invention.

A flowchart of an exemplary embodiment for an opt-out data extraction tool 2500 is provided in FIG. 25. In an embodiment, a user registers and selects preferences 2502 for the opt-out extraction tool similarly as with the system, as described above. In an embodiment, the user may select the message sender's web server type and version 2504, and the log file 2506, which is then parsed for system messages 2508. In an embodiment, user preferences are then checked 2510 to determine whether the user wants the entire message extracted to an ASCII file 2512, or whether to extract only electronic addresses to an ASCII file 2516, checking user preferences 2518 again to determine whether the user wants to automatically purge electronic addresses from the system's marketing database 2520, in which case a connection is opened to the system's database to purge the address 2522. In an embodiment, in either instance, the extracted data is then saved 2514.

In an embodiment, the system is designed to, when idle, compare its database for both statistical and syntactical patterns, and to save and report the data to related super nodes based on user defined preferences.

Figure 26:
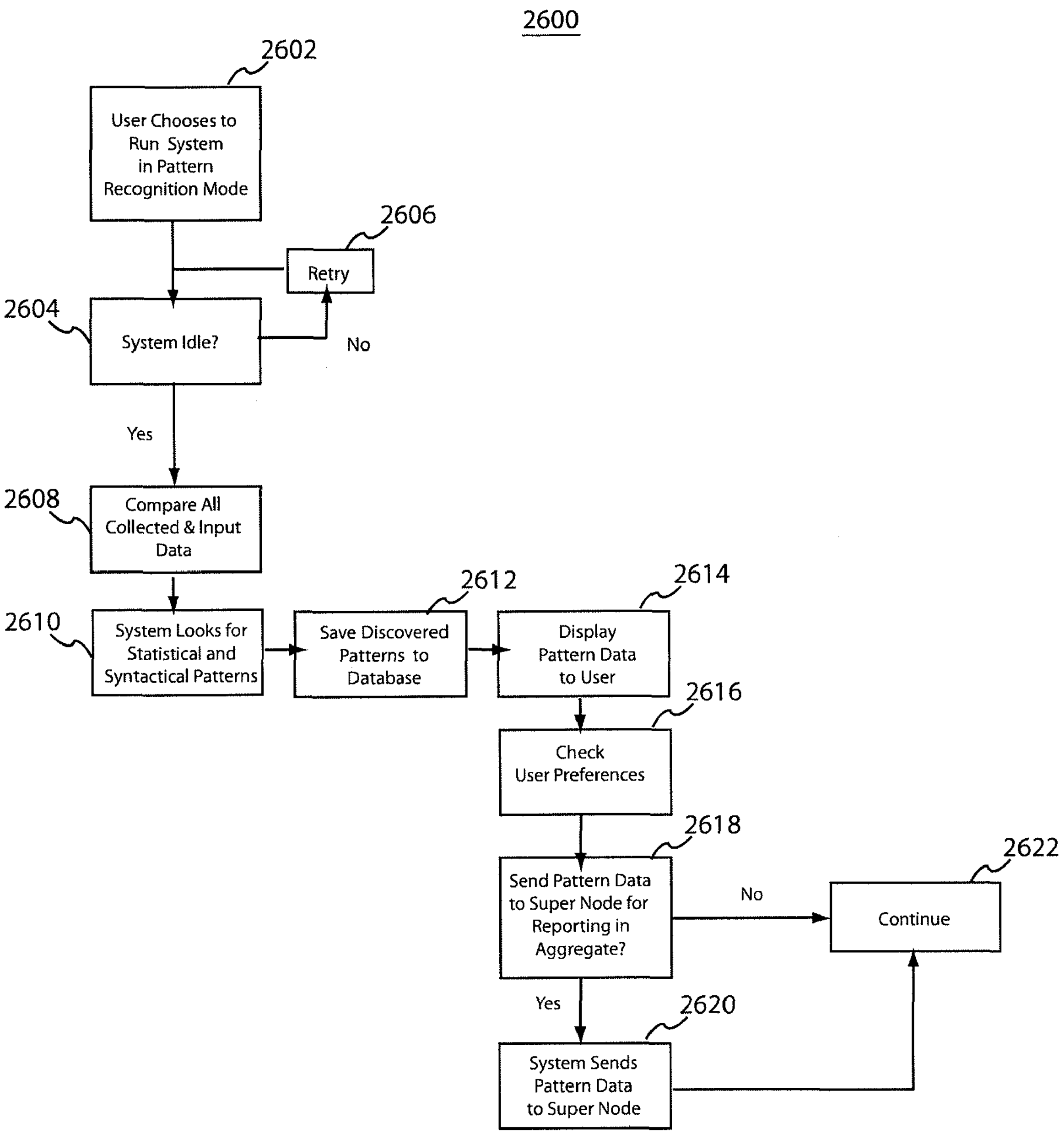
FIG. 26 is a flowchart of an exemplary embodiment for pattern recognition checking in accordance with an embodiment of the present invention.

A flowchart of an exemplary embodiment for pattern recognition checking 2600 is presented in FIG. 26. In an embodiment, the user may elect to run the system in pattern recognition mode 2602. Preferably the system checks for system idle time 2604, and rechecks 2606 until the system is idle before executing pattern recognition. In an embodiment, during the pattern recognition process, the system compares all collected and input data 2608, looking for statistical and syntactical patterns 2610, saving discovered patterns to a database 2612. In an embodiment, the pattern data may be displayed to the user 2614, and if the user prefers 2616, the pattern data may be sent to a super node for aggregate reporting 2618, 2620. In an embodiment, the system would then continue pattern searching 2622.

In an embodiment, the system may use a user's inputted zip or postal code, and associates it with the specific entities to send complaints to. In such an embodiment, if the system does not have the appropriate address to send complaint messages to when it logs on for an update, it gives a message to the update server requesting the appropriate complaint addresses. Preferably, when the appropriate complaint addresses becomes available the system sends a message to the user's machine informing it to update.

Figure 27:
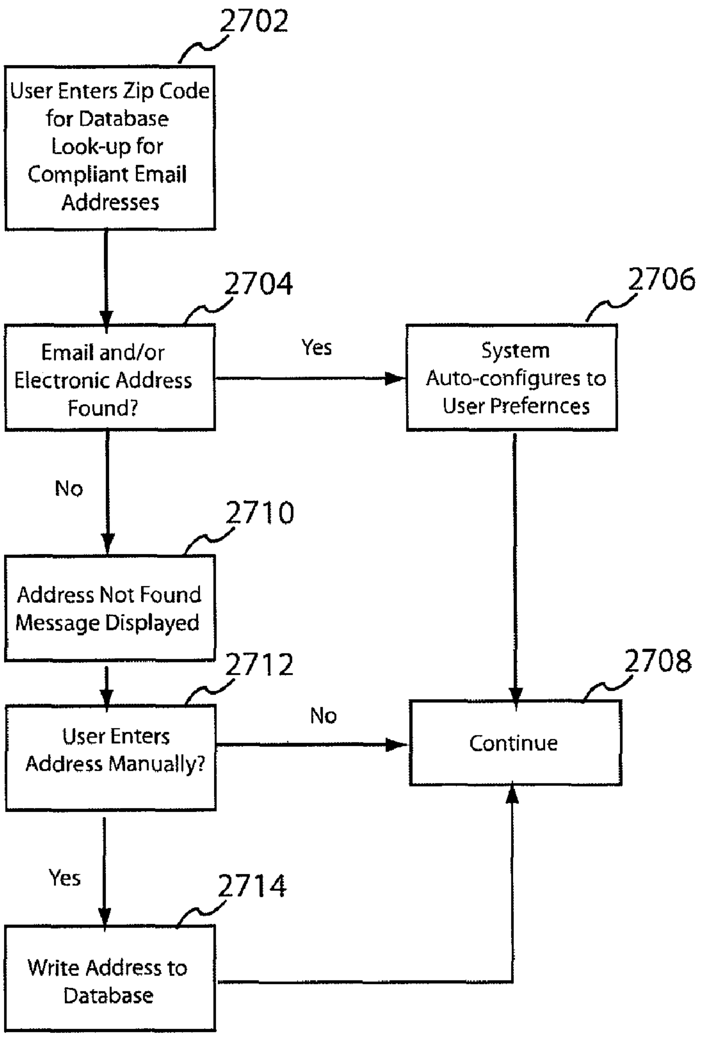
FIG. 27 is a flowchart of an exemplary embodiment for postal code look-up functionality in accordance with an embodiment of the present invention.

A flowchart of an exemplary embodiment for postal code look-up functionality 2700 is provided in FIG. 27. In an embodiment, the user may enter the user's postal code into the system, which uses it for database look-up for complaint email addressing 2702. In such an embodiment, if the complaint email or electronic address is found 2704, the system auto-configures the user preferences to use the found address 2706, and then continues normal operation 2708. Otherwise, in an embodiment, the system displays an address not found message 2710, and allows the user to enter complaint addresses manually 2712, which are then written to a database 2714.

In an embodiment, the system may allow the user to select and deselect specific unwanted message senders accounts, domains, IP addresses, and IP families to either intercept and respond to or stop the intercept and response to the same.

An exemplary user interface screen for user setup and management of unwanted messages from selected accounts 6600 is provided in FIG. 66. In an embodiment, the user is presented with a listing of unwanted message sender accounts, each account associated with a domain, IP address, and IP family, as well as a check box associated with each account, domain, IP address, and IP family 6602. In operation, a user may uncheck the check box associated with each account, domain, IP address, or IP family in order to begin receiving messages from the unchecked account, domain, IP address, or IP family. In an embodiment, if the user wants to allow messages from an unlisted account, they can enter the account in an edit box 6604, and select it by selecting the find button 6606, at which time the system will update the listing to include the information for the entered account. In an embodiment, the user may exit the user interface screen without the system acting on the user's selections by selecting the cancel button 6610, or may cause the system to act on the user's selection by selecting the submit button 6608.

Similarly, an exemplary user interface screen for user setup and management of unwanted messages from domains 6700 is provided in FIG. 67. In an embodiment, the user is presented with a listing of unwanted message sender domains, each domain associated with an account, IP address, and IP family, as well as a check box associated with each domain, account, IP address, and IP family 6702. In operation, a user may uncheck the check box associated with each domain, account, IP address, or IP family in order to begin receiving messages from the unchecked domain, account, IP address, or IP family. In an embodiment, if the user wants to allow messages from an unlisted domain, they can enter the domain in an edit box 6704, and select it by selecting the find button 6706, at which time the system will update the listing to include the information for the entered domain. In an embodiment, the user may exit the user interface screen without the system acting on the user's selections by selecting the cancel button 6710, or may cause the system to act on the user's selection by selecting the submit button 6708.

Likewise, an exemplary user interface screen for user setup and management of unwanted messages from IP addresses 6800 is provided in FIG. 68. In an embodiment, the user is presented with a listing of unwanted message sender IP addresses, each IP address associated with an account, domain, and IP family, as well as a check box associated with each IP address, account, domain, and IP family 6802. In operation, a user may uncheck the check box associated with each IP address, account, domain, or IP family in order to begin receiving messages from the unchecked IP address, account, domain, or IP family. In an embodiment, if the user wants to allow messages from an unlisted IP address, they can enter the IP address in an edit box 6804, and select it by selecting the add button 6808, or may search for it using the find button 6806, at which time the system will update the listing to include the information for the entered IP address. In an embodiment, the user may exit the user interface screen without the system acting on the user's selections by selecting the cancel button 6814, or may cause the system to act on the user's selection by selecting the submit button 6812. In an embodiment, the upload button 6810 may be used to immediately share new settings with the local super node.

An exemplary user interface screen for user setup and management of unwanted messages from IP families 6900 is provided in FIG. 69. In an embodiment, the user is presented with a listing of unwanted message sender IP families, each IP family associated with an account, domain, and IP address, as well as a check box associated with each IP family, account, domain, and IP address 6902. In operation, a user may uncheck the check box associated with each IP family, account, domain, or IP address in order to begin receiving messages from the unchecked IP family, account, domain, or IP address. In an embodiment, if the user wants to allow messages from an unlisted IP family, they can enter the IP family in an edit box 6906, and select it by selecting the add button 6910, or search for it using the find button 6908, at which time the system will update the listing to include the information for the entered IP family. In an embodiment, the user may exit the user interface screen without the system acting on the user's selections by selecting the cancel button 6916, or may cause the system to act on the user's selection by selecting the submit button 6914. In an embodiment, the upload button 6912 may be used to immediately share new settings with the local super node.

Figure 28:
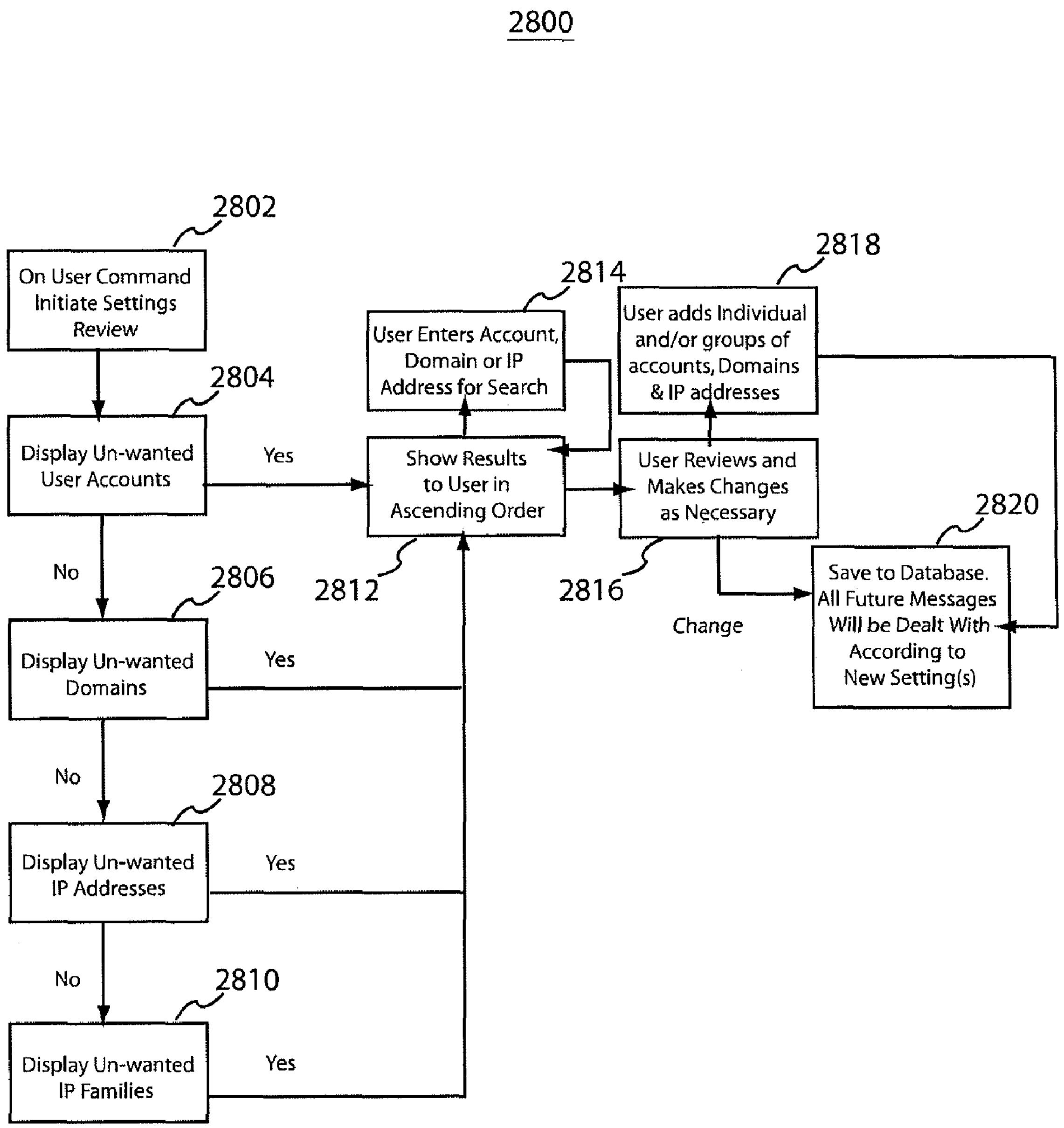
FIG. 28 is a flowchart of an exemplary embodiment for unwanted message user preference management in accordance with an embodiment of the present invention.

A flowchart of an exemplary embodiment for unwanted message user preference management 2800 is provided in FIG. 28. In an embodiment, the user may initiate a settings review 2802 by instructing the system to display any of unwanted message sender user accounts, 2804, domains 2806, IP addresses 2808 or IP families 2810 to the user. In an embodiment, the system displays the results of the user-initiated review in an order, such as by ascending alphabetical order 2812, and the user may search for an account, domain or IP address 2814 for display. Preferably, the user may review the user preferences for the displayed accounts, domains, IP addresses and families and make any necessary changes 2816, which may then be saved to a system database, and all future messages will be handled by the system according to the changes 2820. In addition to changes, the system preferably allows the user to add individual accounts, or groups of accounts, domains and IP addresses 2818, which are likewise saved 2820.

In an embodiment, the system supports each system user to share relevant unwanted message information with other users using a peer to peer file sharing and grid architecture. In such an embodiment, the system allows each user to set a threshold as to when to preemptively intercept sender, domain, IP address and IP family messages based on other users' preferences.

Preferably, as each user chooses to intercept, respond to and classify specific unwanted messages, the system shares that information with super nodes on the network, which, in turn, share that aggregate information with other super nodes and nodes. Each user of the system may be given the choice of becoming either a node or super node, and can switch from one to the other at the will of the user. In an embodiment, the system allows for file sharing and polling of both the nodes and super nodes to facilitate information sharing and propagation between nodes and super nodes.

In an embodiment, super nodes act as primary repositories of related sender information to share with nodes and other super nodes. In such an embodiment, both super nodes and nodes send and receive related sender account, domain, IP address and IP family aggregate data to nodes and other super nodes. Preferably, as super nodes appear on the network, they seek out other and least busy super nodes to share information, update databases, look up tables and synchronize information with each other at user determined time intervals. Also, as Nodes appear on the network, they seek out super nodes to share, update databases, look up tables and synchronize information with each other at user determined time intervals.

In an embodiment, super nodes send out to nodes gathered system data for processing to facilitate the tabulation of system response, intercept data and classification. In an embodiment, that data is collected and either tabulated by the super node or sent in data fragments to nodes for tabulation and return to the related super nodes to create aggregate system response, intercept and classification data for distribution to super nodes and nodes for system propagation. Preferably, super nodes can act as repositories for the entire system network or portions of the repositories and individual elements.

In an embodiment, users may be given the option of having the user population classifications, either by percentage or by quantities of aggregate data, dynamically add or subtract sender accounts, domains, IP addresses and IP families for interception and response.

Also in an embodiment, super nodes act as repositories for node and super node updates to the system by sharing with all super nodes and nodes the latest update version. When a node contacts a super node for a new software update, the node requests and the super node makes available the latest system update. In addition, when a node contacts a super node and has a newer version of the system software than the super node has, it shares with the super node the network address of all known super nodes having the current version of the system software.

In an embodiment, when super nodes contact each other to compare software versions and when one super node has a newer version of the system software, it makes that update available to the other super nodes.

Figure 70:
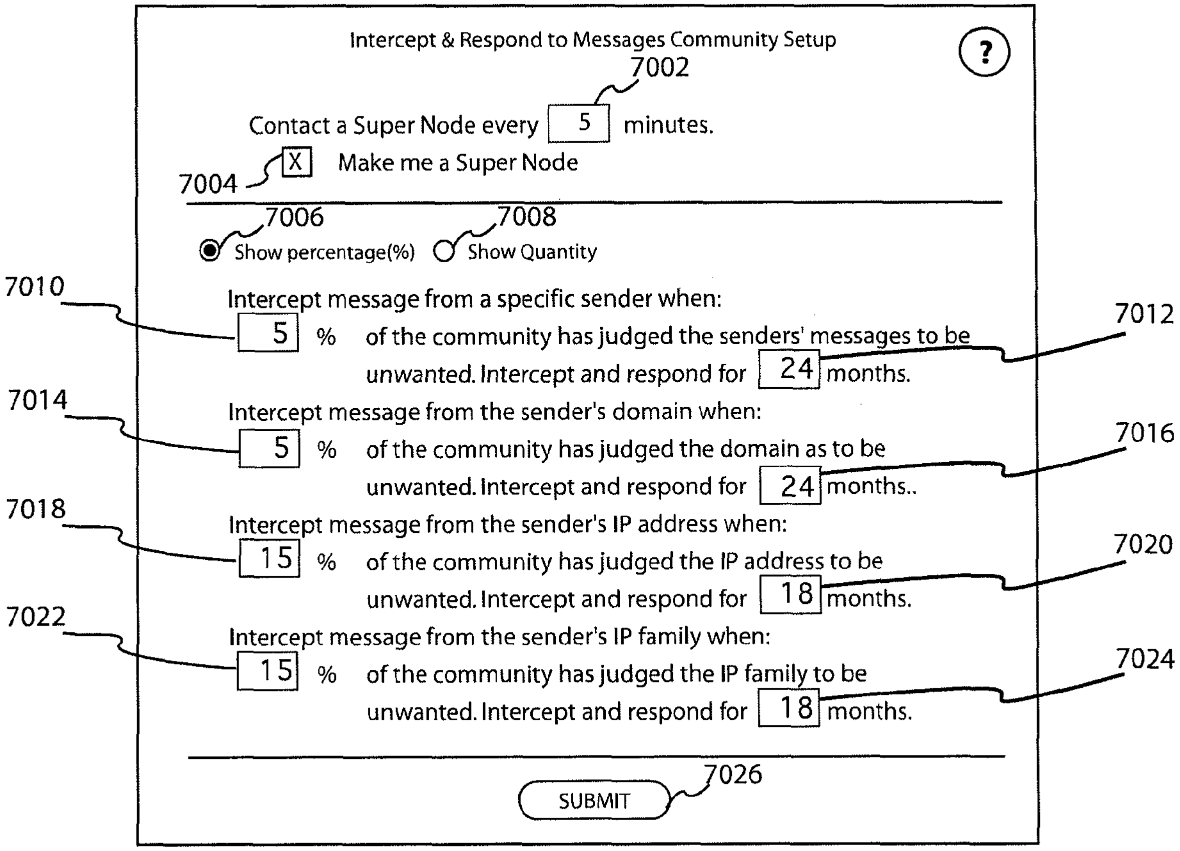
FIG. 70 is an exemplary user interface screen for user setup of interception and response to message community setup in accordance with an embodiment of the present invention.

An exemplary user interface screen for user setup of interception and response to messages community setup 7000 is provided in FIG. 70. In an embodiment, a user is presented with a user interface allowing the user to manage its messages community preferences. For example, in an embodiment, the user may instruct the system how long to wait before contacting a super node 7002, and may also configure the system to make the user's system into a super node 7004. In an embodiment, the user can instruct the system to intercept messages when a user defined percentage of the community has judged the sender's messages to be unwanted from a specific sender 7010, sender domain 7014, sender IP address 7018, or sender IP family 7022. Similarly, in an embodiment, the user may select the period of time during which to intercept messages from a specific sender 7012, sender domain 7016, sender IP address 7020, or sender IP family 7024. In an embodiment, the user's selections are not acted on by the system until the user selects the submit button 7026.

Figure 29:
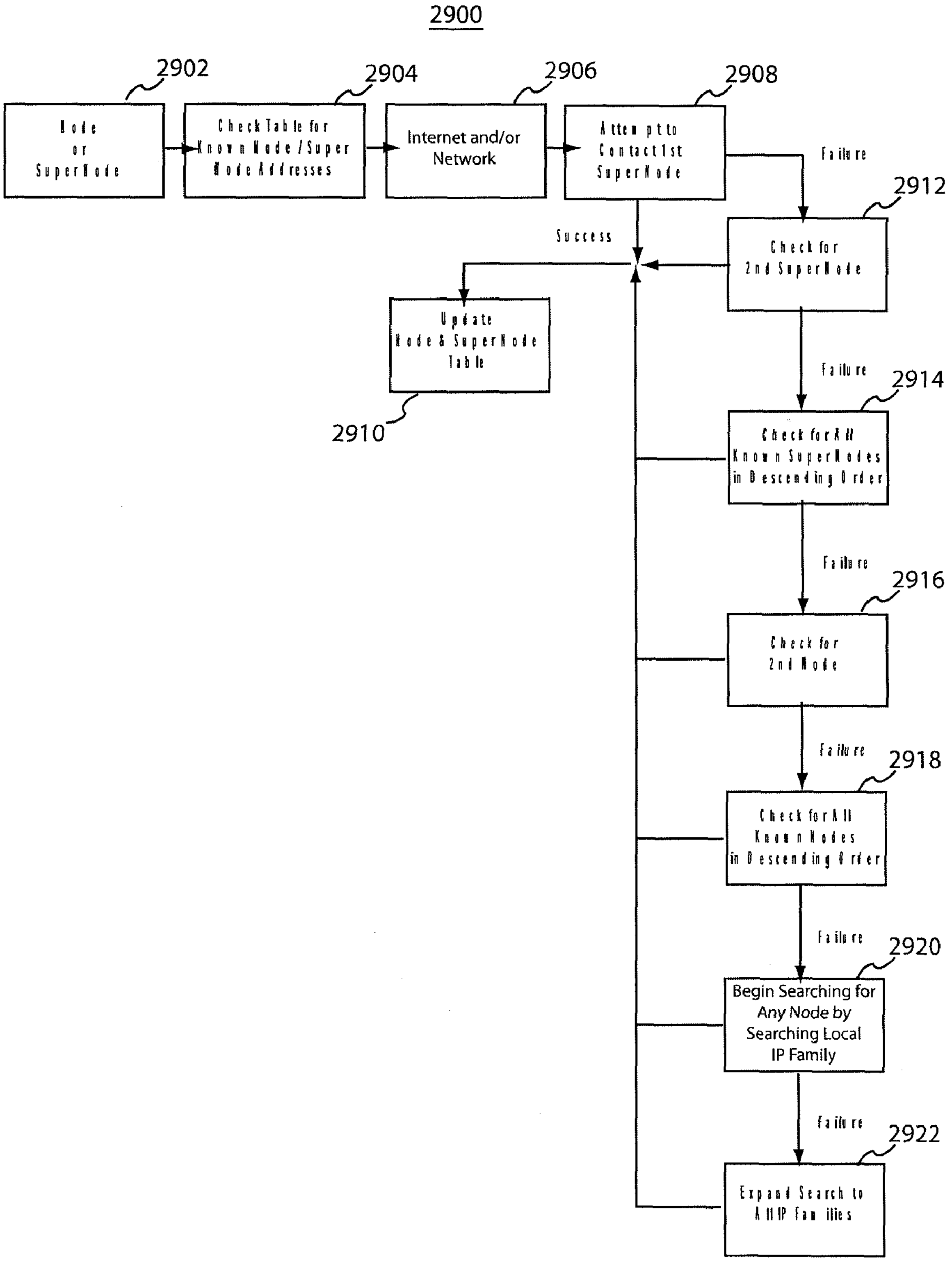
FIG. 29 is a flowchart of an exemplary embodiment for grid architecture and peer-to-peer node management in accordance with an embodiment of the present invention.

A flowchart of an exemplary embodiment for grid architecture and peer-to-peer node management 2900 is provided in FIG. 29. In an embodiment, a node or super node 2902 checks a table for known node and super node addresses 2904 on the Internet or other network 2906, and attempts to contact the first super node on the list 2908. In an embodiment, if the contact attempt fails, the node will then attempt to contact, in turn, the next super node 2912, all known super nodes in the table in order 2914, another node 2916, and all other known nodes in the table in order 2918. In an embodiment, if no contact attempt has been successful, then the system begins searching for any node by searching the local IP family 2920, or finally by searching all IP families 2922. In an embodiment, when a contact attempt has been successful, the node and super node table is updated 2910.

Figure 30:
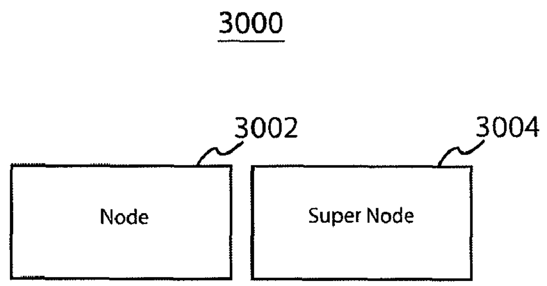
FIG. 30 is a schematic representation of a node and a super node in accordance with an embodiment of the present invention.

A schematic representation of a node and a super node 3000 is provided in FIG. 30. In an embodiment, a user may configure their system to act as a node 3002 or as a super node 3004.

Figure 31:
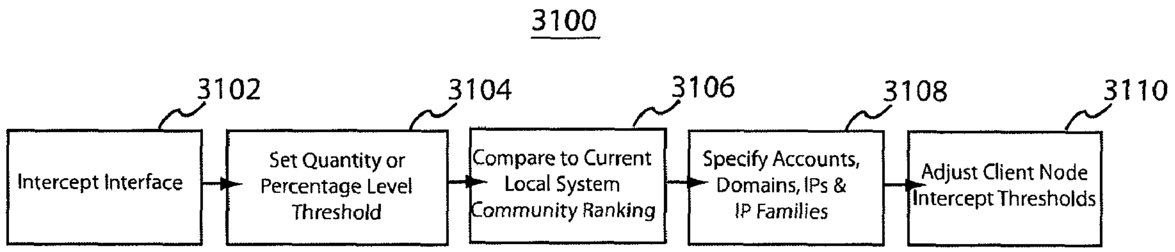
FIG. 31 is a flowchart of an exemplary embodiment for setting message intercept thresholds in accordance with an embodiment of the present invention.

A flowchart of an exemplary embodiment for setting message intercept thresholds 3100 is provided in FIG. 31. In an embodiment, the system may use an intercept interface 3102 to set quantity or percentage level thresholds 3104 for message intercept. In such an embodiment, the threshold percentage or threshold quantity is compared to the current local system community ranking 3106 for specified accounts, domains, IP addresses and IP families 3108, and the client node intercept thresholds may be adjusted by the user 3110.

Figure 32:
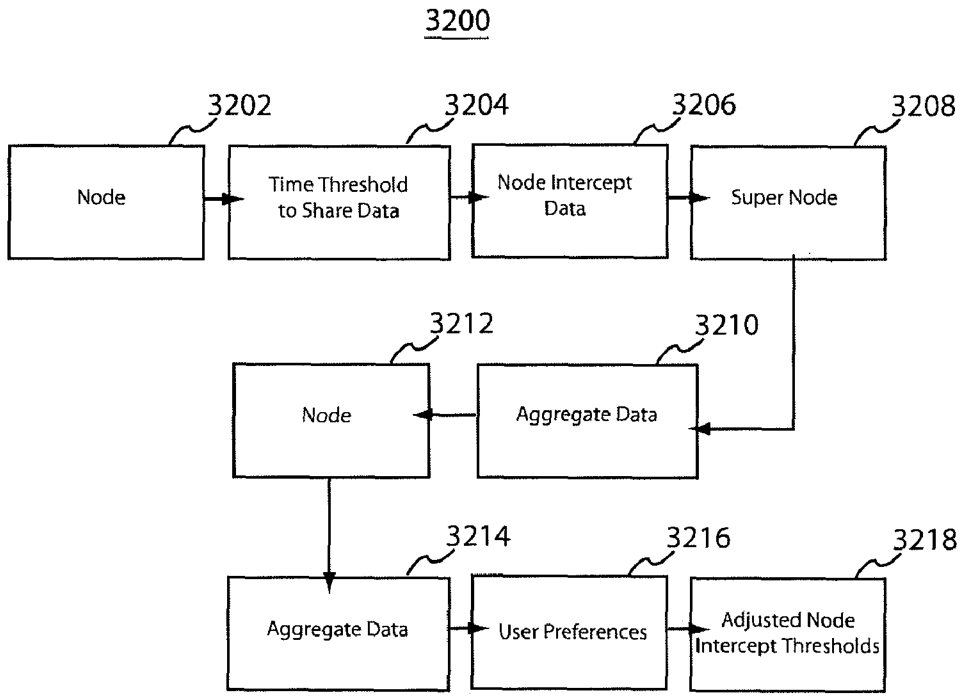
FIG. 32 is a flowchart of an exemplary embodiment for data sharing between a node and a super node in accordance with an embodiment of the present invention.

A flowchart of an exemplary embodiment for data sharing between a node and a super node 3200 is provided in FIG. 32. In an embodiment, a node 3202 may share intercept data 3206 with a super node 3208 at a share data time threshold 3204. In an embodiment, the super node may then aggregate the data 3210 from multiple nodes, and share the aggregate data with the node 3212. In such an embodiment, a node 3212 may then use the aggregate data 3214 to update its user preferences 3216 or adjust node intercept thresholds 3218.

Figure 33:
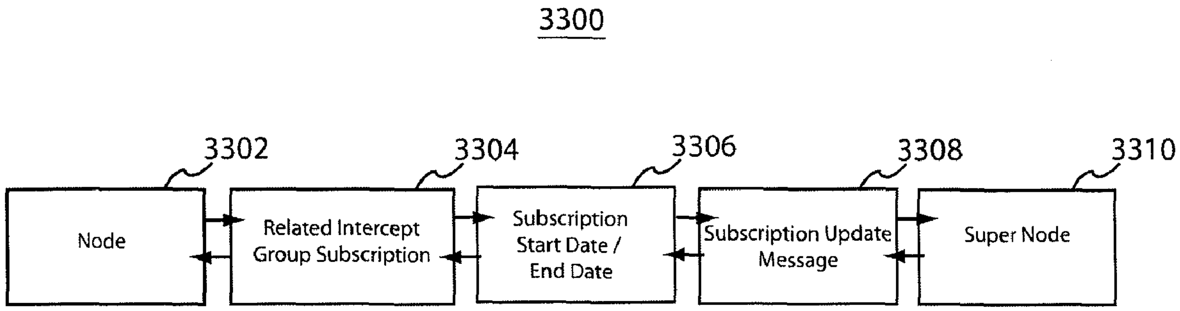
FIG. 33 is a flowchart of an exemplary embodiment for updating node subscription information in accordance with an embodiment of the present invention.

A flowchart of an exemplary embodiment for updating node subscription information 3300 is provided in FIG. 33. In an embodiment, a node 3302 may update its related message intercept group subscription 3304, including the subscription start date/end date information 3306 with a super node 3310 by sending a subscription update message to the super node 3308.

Figure 34:
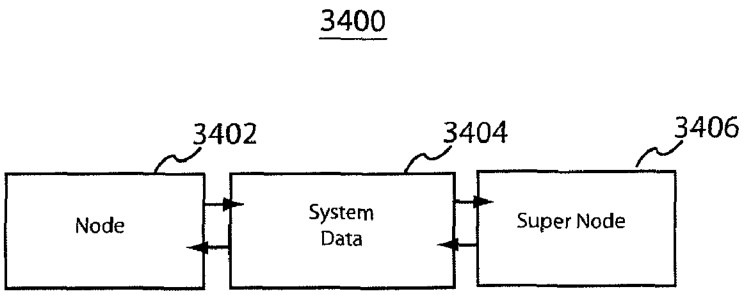
FIG. 34 is a flowchart of an exemplary embodiment for node and super node system data exchange in accordance with an embodiment of the present invention.

A flowchart of an exemplary embodiment for node and super node system data exchange 3400 is provided in FIG. 34. In an embodiment, system data 3404 may be sent by a node 3402 to a super node 3406, or by a super node 3406 to a node 3402.

Figure 35:
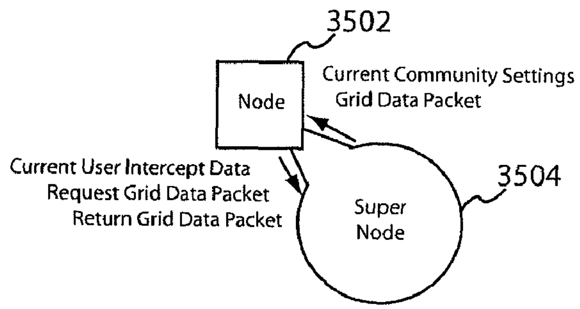
FIG. 35 is a schematic diagram of exemplary data exchanges for a node and a super node in accordance with an embodiment of the present invention.

A schematic diagram 3500 of exemplary data exchanges for a node and a super node is provided in FIG. 35. In an embodiment, a node 3502 may send various data, such as current user intercept data, request grid data packets, or return grid packet data to a super node 3504. Also in an embodiment, a super node 3504 may send various data, such as current community settings or grid data packets to a node 3502.

Figure 36:
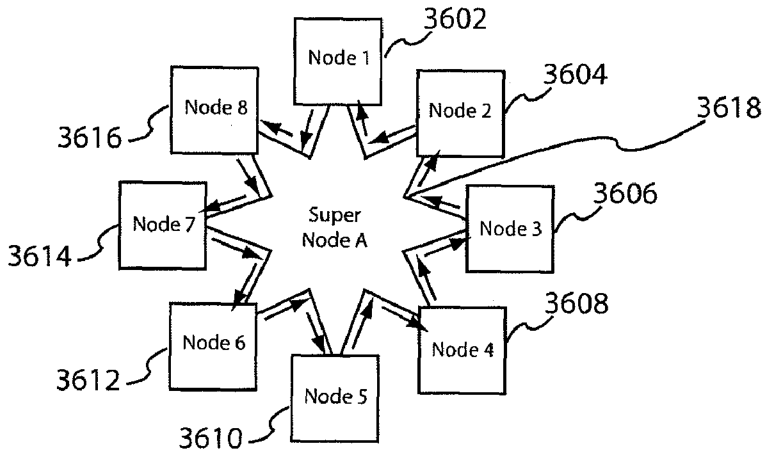
FIG. 36 is a schematic diagram of exemplary data exchanges for several nodes and a super node in accordance with an embodiment of the present invention.

A schematic diagram 3600 of exemplary data exchanges for several nodes and a super node is provided in FIG. 36. In an embodiment, an exemplary super node 3618 may exchange data with multiple subscribing nodes 3602, 3604, 3606, 3608, 3610, 3612, 3614, 3616.

Figure 37:
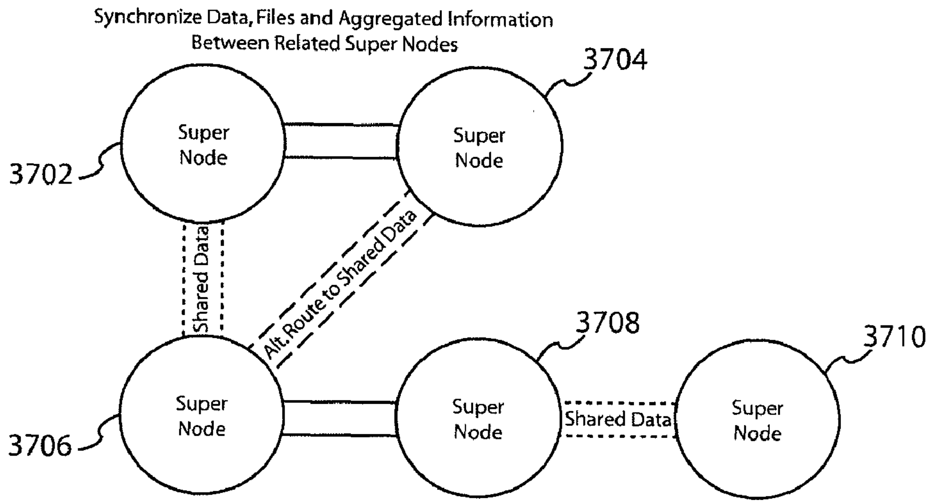
FIG. 37 is a schematic diagram of exemplary data exchanges between several super nodes in accordance with an embodiment of the present invention.

A schematic diagram 3700 of exemplary data exchanges between several super nodes is provided in FIG. 37. In an embodiment, multiple super nodes 3702, 3704, 3706, 3708, 3710 may share and synchronize data, and share aggregate information with each other using a variety of methods and communication routes. For example, super nodes may directly communicate with other super nodes, or may alternatively communicate with other super nodes through a node.

Figure 38:
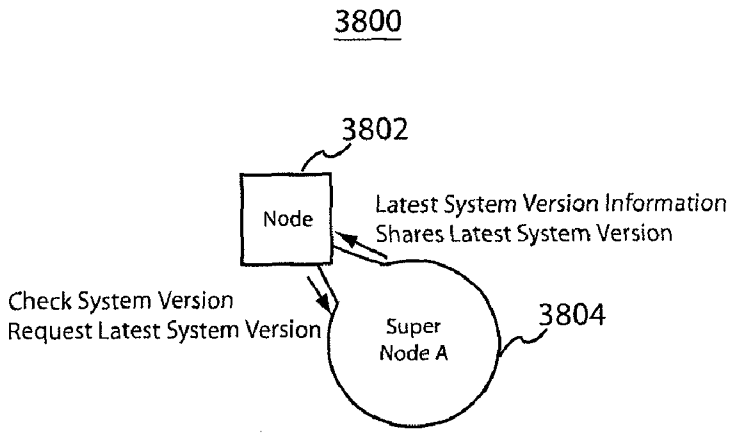
FIG. 38 is a schematic diagram of exemplary system version checking between a node and a super node in accordance with an embodiment of the present invention.

A schematic diagram 3800 of exemplary system for version checking between a node and a super node is provided in FIG. 38. In an embodiment, a node 3802 may communicate with a super node 3804, such as by sending a request for the latest system version or checking system version information. Similarly, in an embodiment, a super node 3804 may send the latest system version information or share the latest system version with a node 3802.

Figure 39:
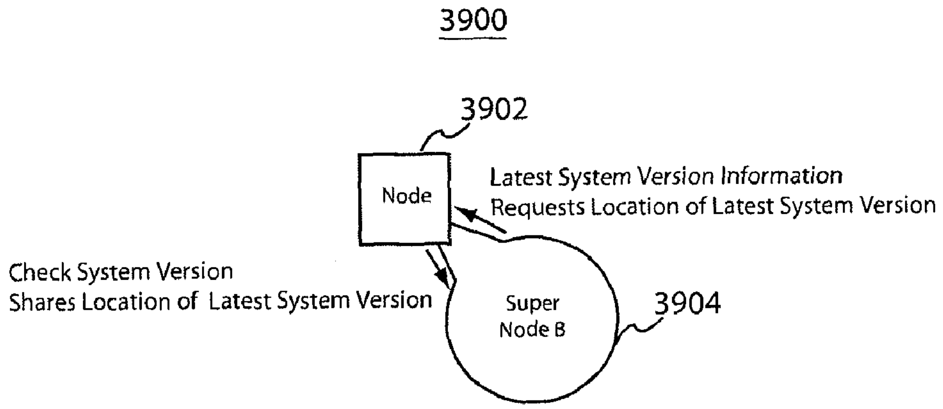
FIG. 39 is a schematic diagram of exemplary system version location checking between a node and a super node in accordance with an embodiment of the present invention.

A schematic diagram 3900 of exemplary system version location checking between a node and a super node is provided in FIG. 39. In an embodiment, a node 3902 may check its system version against and share location information with a super node 3904, and the super node 3904 may provide the latest system version information to and request the location of the latest system version from a node 3902.

Figure 40:
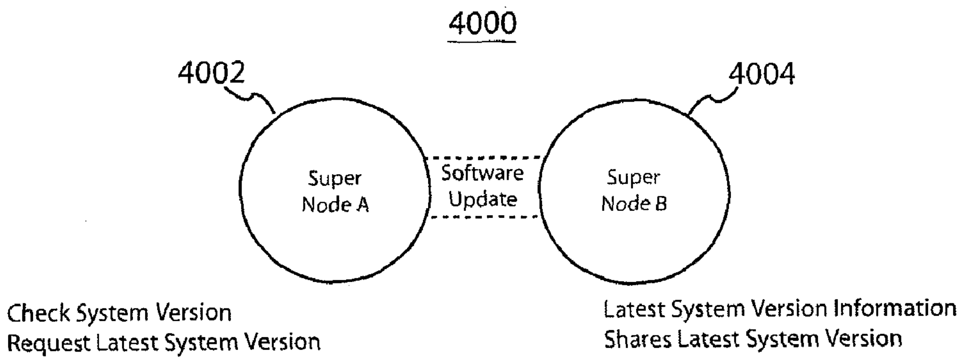
FIG. 40 is a schematic diagram of an exemplary embodiment for of exemplary system version checking between super nodes in accordance with an embodiment of the present invention.

A schematic diagram of an exemplary embodiment of an exemplary system 4000 for version checking between super nodes is provided in FIG. 40. In an embodiment one super node 4002 may check its system version against and request the latest system version from another super node 4004, which may provide its latest system version information to and share the latest system version with the first super node 4002.

In an embodiment, the system allows users to choose to receive, schedule and control special interest offers or messages on an anonymous basis via the system.

In an embodiment, the system allows each user to set a threshold based on time or quantity of messages received, and when to receive and stop receiving subscribed message senders' messages. In an embodiment, the message sender sends one message to the system, and the system, in turn, sends messages to subscribed users of the system using a peer to peer file sharing and grid architecture. In an embodiment, users can subscribe and unsubscribe at will.

Figure 71:
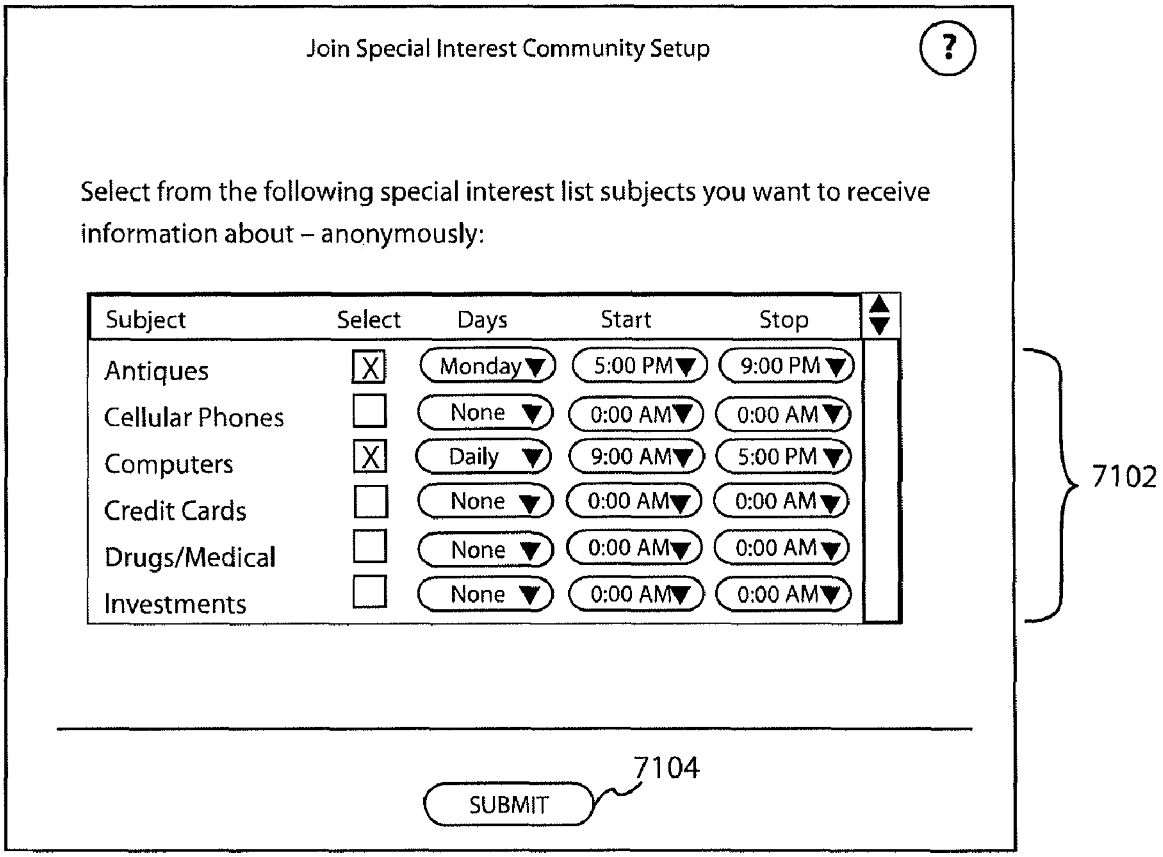
FIG. 71 is an exemplary user interface screen for user setup of special interest subjects information desired in accordance with an embodiment of the present invention.

An exemplary user interface screen for user setup of special interest subject information desired 7100 is provide in FIG. 71. In an embodiment, the user is presented with a user interface screen 7100 that includes a listing of special interest subjects, each special interest subject associated with a check box and selector controls for setting the time and days when the user wants to allow messages pertaining to each special interest subject to be received anonymously 7102. In such an embodiment, the user elects to receive special interest subject messages by checking the check box associated with that subject and selecting the submit button 7104. Special interest subjects may include but are not limited to antiques, cellular phones, computers, credit cards, drugs/medical, and investments.

In an embodiment, the system allows marketing subscribers to schedule, send and manage special interest offers or messages via the system. In a further embodiment, the system may allow marketing subscribers to send messages through the system and set parameters based on time, day, date or quantity of messages through a message gateway. In an embodiment, marketers may start and stop marketing messages on the system at will.

In an embodiment, the marketing user's payment is processed through the payment gateway. Once payment is approved or received, the system sends messages through the message staging gateway to the requested message subscription super nodes to distribute marketing messages to users who have subscribed to receive special interest offers or messages on an anonymous basis via the System.

Figure 41:
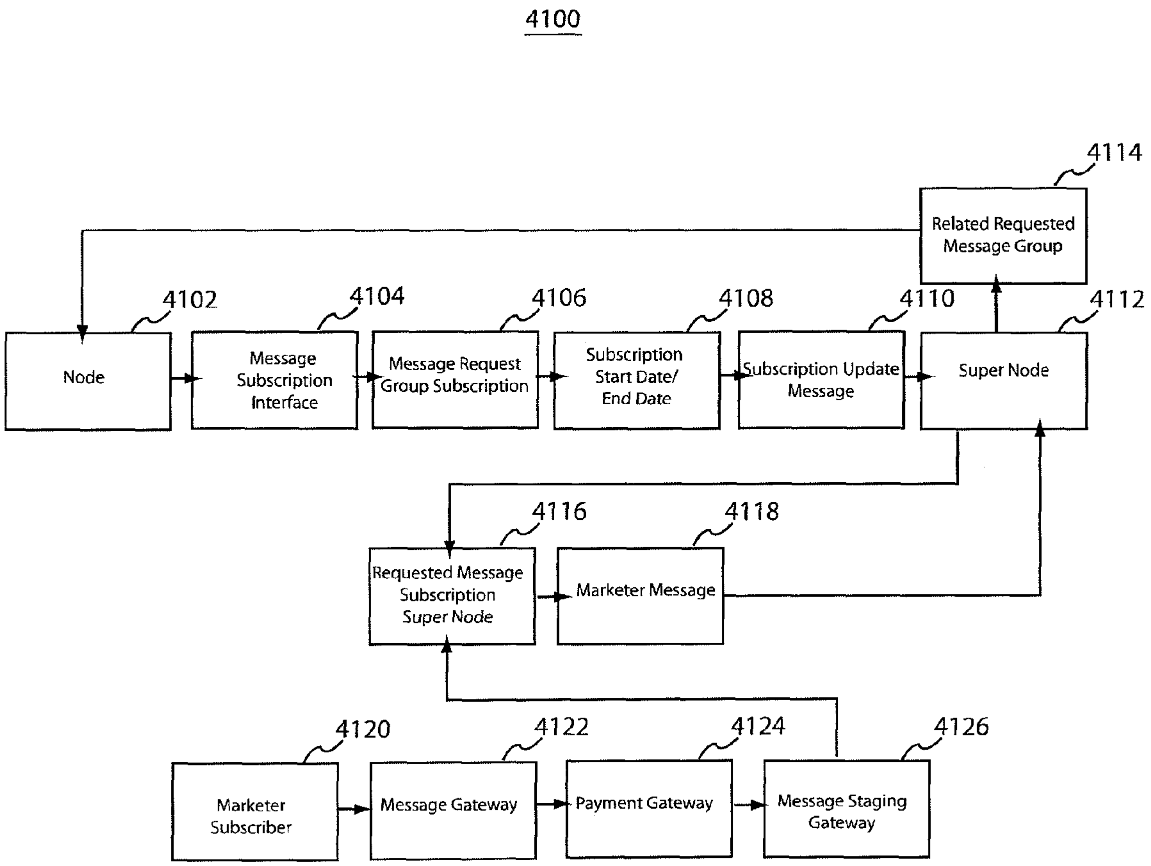
FIG. 41 is a schematic diagram of an exemplary embodiment for choosing messages and special interest offerings in accordance with an embodiment of the present invention.

A schematic diagram of an exemplary embodiment for choosing messages and special interest offerings 4100 is provided in FIG. 41. In an embodiment, a node 4102 may receive related requested message group information 4114 from a super node 4112, and using a message subscription interface 4104, send to the super node 4112 a message request group subscription 4106, including a subscription start and end date 4108, via a subscription update message 4110. In a further embodiment, a super node 4112 may forward the node subscription information to a requested message subscription super node 4116, which, in turn, may forward a marketer message 4118 pertaining to the requested subscription to the super node 4112. In an embodiment, marketer subscribers 4120 communicate with requested message subscription super nodes 4116 using a message gateway 4122, a payment gateway 4124, and a message staging gateway 4126.

In an embodiment, a node can be run in an operating system that runs on top of Windows or other client operating systems as an application in a proprietary programming language. Additionally, in an embodiment, the system will write data files in a proprietary, encrypted format.

Figure 65:
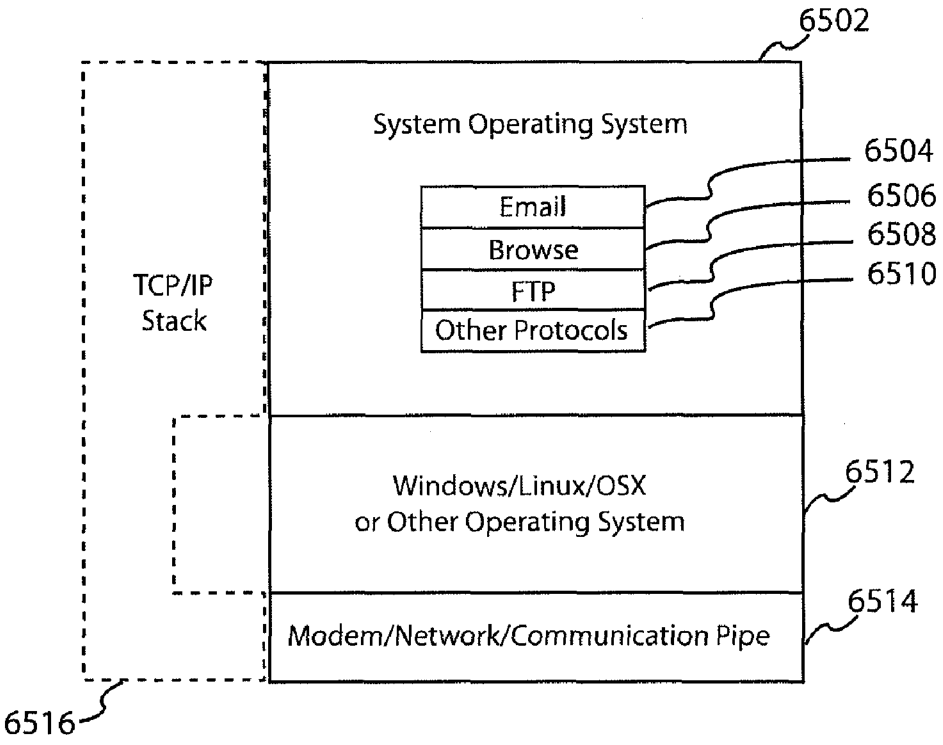
FIG. 65 is an exemplary schematic diagram of a memory map for a node operating system in accordance with an embodiment of the present invention.

An exemplary schematic diagram of a memory map for a node operating system is presented in FIG. 65. In an embodiment, the system operating system 6502, including email 6504, browser 6506, FTP 6508 and other protocol 6510 components occupy memory space not overlapping with the memory space of the user machine's operating system 6512, such as WINDOWS®, LINUX™, or OSX®. In an embodiment the system operating system 6502 and the modem, network, or other communications pipes 6514 communicate via the TCP/IP stack 6516, thereby not involving the operating system 6512.

In an embodiment, the system allows for potential re-sellers of the system software to apply for re-seller status and choose from a variety of ways to be paid in either cash and or premiums.

In such an embodiment, once a re-seller of the system is approved they are contacted by the company via email or other electronic means. The re-seller may then be instructed to download a copy of the system re-seller software in which the re-seller's unique re-seller identifier is embedded.

In an embodiment, the system also allows for re-sellers to recruit and receive payment for the recruitment of new re-sellers of the system by allowing potential new users of the system to also become re-sellers.

Also in an embodiment, re-sellers can freely distribute copies of the system software with their unique re-seller identifier embedded for potential new users to purchase and or potential new re-sellers to apply for to distribute the system software.

In an embodiment, the payment process for new users of the system may be realized using Secure Socket Layer encryption, wherein the buyer inputs their approved payment method directly into the system or purchases the system through an e-commerce Internet web site and the system software is downloaded therefrom.

In an embodiment, re-sellers are given a choice to be paid in either cash and or premiums at the end of each selling period.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for responding to an incoming electronic message, the method executed by a processor and associated computer memory configured to perform the method comprising the steps of:

determining whether the incoming electronic message is relevant or irrelevant to a user using a user profile containing information regarding relevant and irrelevant messages;

if the incoming electronic message is irrelevant to the user, parsing the incoming electronic message for message origination information, wherein the message origination information parsed includes one or more items selected from the group comprising: a sending email address, a sending email domain, a unique message identifier, a reply email address, a reply email domain, a response domain, a response email, a response URL, an opt out URL, an opt out email, and an anonymous FTP login for message image, physical address and telephone numbers; and replying to the message using the message origination information, wherein replying comprises:

measuring and capturing sender suggested content for the user to review at a time convenient to the user; and repeat replying to the message at a first user-specified interval of time or until the sender suggested content is successfully measured and captured within a second user-specified interval of time or until a reply is sent a user-specified number of times.

2. The method according to claim 1, wherein the determining and parsing steps are performed as the incoming electronic messages are received.

3. The method according to claim 1, wherein the determining and parsing steps are performed at a time other than when the incoming electronic message is received.

4. A method for responding to an incoming electronic message, the method executed by a processor and associated computer memory configured to perform the method comprising the steps of:

determining whether the incoming electronic message is relevant or irrelevant to a user using a user profile containing information regarding relevant and irrelevant messages;

if the incoming electronic message is irrelevant to the user, parsing the incoming electronic message for message origination information, wherein the message origination information parsed includes one or more items selected from the group comprising: a sending email address, a sending email domain, a unique message identifier, a reply email address, a reply email domain, a response domain, a response email, a response URL, an opt out URL, an opt out email, and an anonymous FTP login for message image, physical address and telephone numbers; and replying to the message using the message origination information, wherein replying comprises:

sending at least one message to a relevant third party entity in accordance with a user configuration; and, repeat replying to the message at a first user-specified interval of time or until a response indicating receipt of the at least one message is received within a second user-specified interval of time or until a reply is sent a user-specified number of times.

5. The method according to claim 4, wherein the relevant third party entity is a government entity.

6. The method according to claim 1, further comprising identifying, tracking variants, and removing any software that records a user's keystrokes, displays banners or other computer advertising, or reports the user's behavior to a third party.

7. The method according to claim 6, further comprising identifying the network address the software was received from and any network address the user information is being sent to.

8. The method according to claim 1, further comprising identifying, tracking and removing software that enables a user's computer to be controlled remotely.

9. A method for responding to an incoming electronic message, the method executed by a processor and associated computer memory configured to perform the method comprising the steps of:

determining whether the incoming electronic message is relevant or irrelevant to a user using a user profile containing information regarding relevant and irrelevant messages;

if the incoming electronic message is irrelevant to the user, parsing the incoming electronic message for message origination information, wherein the message origination information parsed includes one or more items selected from the group comprising: a sending email address, a sending email domain, a unique message identifier, a reply email address, a reply email domain, a response domain, a response email, a response URL, an opt out URL, an opt out email, and an anonymous FTP login for message image, physical address and telephone numbers; and replying to the message using the message origination information, wherein replying comprises:

measuring the time it takes for an electronic packet to be sent to and subsequently received by the sender of the incoming electronic message; and, repeat replying to the message at a first user-specified interval of time or until the time for an electronic packet to be sent to and received by the sender of the incoming electronic message is measured within a second user-specified interval of time or until a reply is sent a user-specified number of times.

10. A method for responding to an incoming electronic message, the method executed by a processor and associated computer memory configured to perform the method comprising the steps of:

determining whether the incoming electronic message is relevant or irrelevant to a user using a user profile containing information regarding relevant and irrelevant messages;

if the incoming electronic message is irrelevant to the user, parsing the incoming electronic message for message origination information, wherein the message origination information parsed includes one or more items selected from the group comprising: a sending email address, a sending email domain, a unique message identifier, a reply email address, a reply email domain, a response domain, a response email, a response URL, an opt out URL, an opt out email, and an anonymous FTP login for message image, physical address and telephone numbers; and replying to the message using the message origination information, wherein replying comprises:

tracing the route to a sender of the incoming electronic message; and, repeat replying to the message at a first user-specified interval of time or until the route is successfully traced within a second user-specified interval of time or until a reply is sent a user-specified number of times.

11. A method for responding to an incoming electronic message, the method executed by a processor and associated computer memory configured to perform the method comprising the steps of:

determining whether the incoming electronic message is relevant or irrelevant to a user using a user profile containing information regarding relevant and irrelevant messages;

if the incoming electronic message is irrelevant to the user, parsing the incoming electronic message for message origination information, wherein the message origination information parsed includes one or more items selected from the group comprising: a sending email address, a sending email domain, a unique message identifier, a reply email address, a reply email domain, a response domain, a response email, a response URL, an opt out URL, an opt out email, and an anonymous FTP login for message image, physical address and telephone numbers; and replying to the message using the message origination information, wherein replying comprises:

determining a web server or electronic content repository used to send the electronic message and sending the web server or electronic content repository a response message; and repeat replying to the message at a first user-specified interval of time or until a response indicating receipt of the response message to the web server or electronic content repository is received within a second user-specified interval of time or until a reply is sent a user-specified number of times.

12. A method for responding to an incoming electronic message, the method executed by a processor and associated computer memory configured to perform the method comprising the steps of:

determining whether the incoming electronic message is relevant or irrelevant to a user using a user profile containing information regarding relevant and irrelevant messages;

if the incoming electronic message is irrelevant to the user, parsing the incoming electronic message for message origination information, wherein the message origination information parsed includes one or more items selected from the group comprising: a sending email address, a sending email domain, a unique message identifier, a reply email address, a reply email domain, a response domain, a response email, a response URL, an opt out URL, an opt out email, and an anonymous FTP login for message image, physical address and telephone numbers; and replying to the message using the message origination information, wherein replying comprises:

determining an email domain web server, a sending email address, a sending email domain, a unique message identifier, a reply email address, a reply email domain, a response domain, a response email, a response URL, an opt out URL, an opt out email, and an anonymous FTP used to send the electronic message and sending a first response message to each server log, email address, or domain, as determined, requesting that no additional electronic messages be sent; and repeat replying to the message at a first user-specified interval of time or until a second response message indicating that the first response message requesting that no additional electronic messages be sent is received within a second user-specified interval of time or until a reply is sent a user-specified number of times.

13. The method according to claim 1, further comprising sharing information regarding irrelevant messages with other users by the user.

14. The method according to claim 13, wherein the sharing is performed using a peer-to-peer file system and grid architecture.

15. The method according to claim 1, further comprising sharing by the user information regarding the irrelevant messages with one or more super nodes on a network.

16. A message response system comprising an electronic message receiver node comprising a processor operably connected to a computer memory and a network communication device, the processor and memory configured to operate the network communication device and to receive at least one message over the network communication device; the network communication device further in communication with a network; the electronic message receiver node being associated with a user; the processor and memory further configured to perform the steps of:

determining whether the at least one message is relevant or irrelevant to the user using a user profile containing information regarding relevant and irrelevant messages;

if the message is irrelevant, parsing the at least one message for message origination information, wherein the message origination information parsed includes one or more items selected from the group comprising: a sending email address, a sending email domain, a unique message identifier, a reply email address, a reply email domain, a response domain, a response email, a response URL, an opt out URL, an opt out email, and an anonymous FTP login for message image, physical address and telephone numbers; and replying to the message using the message origination information, wherein replying comprises:

measuring and capturing sender suggested content for the user to review at a time convenient to the user; and repeat replying to the message at a first user-specified interval of time or until the sender suggested content is measured and captured within a second user-specified interval of time or until a reply is sent a user-specified number of times.

17. The system according to claim 16, wherein the processor and memory perform the step of determining whether the at least one message is relevant or irrelevant to the user using a user profile containing information regarding relevant and irrelevant messages.

18. The system according to claim 16, wherein the determining and parsing steps are performed in real time.

19. The system according to claim 16, wherein the determining and parsing steps are performed at a time other than when the at least one message is received.

20. The system according to claim 16, wherein the processor and memory are further configured to perform the step comprising sending the at least one message to a relevant third party entity in accordance with a user configuration.

21. The system according to claim 20, wherein the relevant third party entity is a governmental entity.

22. The system according to claim 16, wherein the processor and memory are further configured to perform the steps comprising: identifying and tracking variants of the incoming electronic message.

23. The system according to claim 16, wherein the processor and memory are further configured to perform the step comprising removing any software that records the user's keystrokes, displays banners or other computer advertising, or reports the user's behavior to a third party.

24. The system according to claim 23, wherein the processor and memory are further configured to perform the step comprising identifying the network address the software was received from and any network address any user information is being sent to.

25. The system according to claim 16, wherein the processor and memory are further configured to perform the steps comprising: identifying, tracking and removing software that enables the node to be controlled remotely.

26. The system according to claim 25, wherein the processor and memory are further configured to perform the steps comprising: measuring and capturing sender suggested content for the user to review at a time convenient to the user.

27. The system according to claim 24, wherein the processor and memory are further configured to perform the step comprising measuring the time it takes for an electronic packet to be sent and subsequently received by the network address the software was received from.

28. The system according to claim 26, wherein the processor and memory are further configured to perform the step comprising tracing the route to a sender of the at least one message.

29. The system according to claim 16, wherein replying further comprises:

determining a web server or electronic content repository used to send the electronic message, and sending the web server or electronic content repository a response message.

30. The system according to claim 16, wherein replying further comprises:

determining an email domain web server used to send the electronic message, sending a response to the email domain's web server log requesting that no further messages be sent.

31. The system according to claim 16, wherein the processor and memory are further configured to perform the step comprising sharing information regarding irrelevant messages with other nodes.

32. The system according to claim 31, wherein the sharing is performed using a peer-to-peer file system and grid architecture.

33. The system according to claim 17, wherein the processor and memory are further configured to perform the step comprising sharing information regarding the irrelevant messages with one or more super nodes on the network.

34. The system according to claim 16, wherein the processor and memory are further configured for generating a copy of the computer software used to configure the processor and memory of the electronic message receiver node;

embedding a unique identification for the user into the generated copy of the computer software; and, providing the generated copy of the computer software to a second user.

35. The system according to claim 34, further comprising an account manager, wherein the account manager receives a notification from a machine associated with the second user, the notification indicating the unique identifier embedded in the generated copy of the computer software, the account manager further performing the steps of billing the second user for the generated copy of the computer software, collecting the billed amount, providing a commission of a portion of billed amount to the user.

36. The method according to claim 1, further comprising:

contacting a sending web server or electronic content repository using the message origination information; and if the sending web server or electronic content repository is unable to respond, continuing to attempt contacting the sending web server or electronic content repository after a time interval defined by the user.

37. A method for responding to an incoming electronic message, the method executed by a processor and associated computer memory configured to perform the method comprising the steps of:

determining whether the incoming electronic message is relevant or irrelevant to a user using a user profile containing information regarding relevant and irrelevant messages;

if the incoming electronic message is irrelevant to the user, parsing the incoming electronic message for message origination information, wherein the message origination information parsed includes one or more items selected from the group comprising: a sending email address, a sending email domain, a unique message identifier, a reply email address, a reply email domain, a response domain, a response email, a response URL, an opt out URL, an opt out email, and an anonymous FTP login for message image, physical address and telephone numbers; and replying to the message using the message origination information, wherein replying comprises:

determining if the electronic message includes a telephone number and calling any telephone number provided in the message; and repeat replying to the message at a first user-specified interval of time or until the call to the provided telephone number is answered within a second user-specified interval of time or until a reply is sent a user-specified number of times.

38. A method for responding to an incoming electronic message, the method executed by a processor and associated computer memory configured to perform the method comprising the steps of:

determining whether the incoming electronic message is relevant or irrelevant to a user using a user profile containing information regarding relevant and irrelevant messages;

if the incoming electronic message is irrelevant to the user, parsing the incoming electronic message for message origination information, wherein the message origination information parsed includes one or more items selected from the group comprising: a sending email address, a sending email domain, a unique message identifier, a reply email address, a reply email domain, a response domain, a response email, a response URL, an opt out URL, an opt out email, and an anonymous FTP login for message image, physical address and telephone numbers; and replying to the message using the message origination information, wherein replying comprises:

determining all links provided by the electronic message; and, when a sending link is provided, sending a response message to the sending link to cease sending messages;

when a reply link is provided, sending a response message to the reply link to cease sending messages;

when a response link is provided, sending a response message to the response link to cease sending messages;

when an opt out link is provided, sending a response message to the opt out link to cease sending messages; and, repeat replying to the message at a first user-specified interval of time or until a response to a message sent to a provided link is received within a second user-specified interval of time or until a reply is sent a user-specified number of times.

39. A method for responding to an incoming electronic message, the method executed by a processor and associated computer memory configured to perform the method comprising the steps of:

determining whether the incoming electronic message includes or links to any computer spyware, adware, virus, worm, or botnet;

when the incoming electronic message includes or links to any computer spyware, adware, virus, worm, or botnet, parsing the incoming electronic message for message origination information, wherein the message origination information parsed includes one or more items selected from the group comprising: a sending email address, a sending email domain, a unique message identifier, a reply email address, a reply email domain, a response domain, a response email, a response URL, an opt out URL, an opt out email, and an anonymous FTP login for message image, physical address and telephone numbers; and replying to the message using the message origination information, wherein replying comprises any of:

pinging the electronic message's server;

tracing a route to the electronic message's sender;

looking up the electronic message's sender's registrar and sending a message to the registrar indicating the incoming electronic message's contents;

sending an opt-out message to an opt-out address;

sending a complaint message to the sender; or sending a complaint message to a third-party entity; and, repeat replying to the message at a first user-specified interval of time or until each reply is complete and each message sent in reply is responded to within a second user-specified interval of time or until a reply is sent a user-specified number of times.

40. A method for responding to an incoming electronic message, the method executed by a processor and associated computer memory configured to perform the method comprising the steps of:

determining whether the incoming electronic message is relevant or irrelevant to a user using a user profile containing information regarding relevant and irrelevant messages;

if the incoming electronic message is irrelevant to the user, parsing the incoming electronic message for message origination information, wherein the message origination information parsed includes one or more items selected from the group comprising: a sending email address, a sending email domain, a unique message identifier, a reply email address, a reply email domain, a response domain, a response email, a response URL, an opt out URL, an opt out email, and an anonymous FTP login for message image, physical address and telephone numbers; and replying to the message using the message origination information, wherein replying comprises:

performing a reverse IP lookup for an IP address associated with the electronic message, and collecting and saving information from the reverse IP lookup, said information comprising any of:

all domains hosted at the IP address, IP address location, IP address company contact information, related DNS servers, names and IP addresses; and, repeat replying to the message at a first user-specified interval of time or until all information is collected from the reverse IP lookup within a second user-specified interval of time or until a reply is sent a user-specified number of times.

41. A method for responding to an incoming electronic message, the method executed by a processor and associated computer memory configured to perform the method comprising the steps of:

determining whether the incoming electronic message is relevant or irrelevant to a user using a user profile containing information regarding relevant and irrelevant messages;

if the incoming electronic message is irrelevant to the user, parsing the incoming electronic message for message origination information, wherein the message origination information parsed includes one or more items selected from the group comprising: a sending email address, a sending email domain, a unique message identifier, a reply email address, a reply email domain, a response domain, a response email, a response URL, an opt out URL, an opt out email, and an anonymous FTP login for message image, physical address and telephone numbers;

blocking all messages from the incoming message's individual sender and replying to the message using the message origination information, wherein replying comprises any of:

pinging the electronic message's server;

tracing a route to the electronic message's sender;

looking up the electronic message's sender's registrar and sending a message to the registrar indicating the incoming electronic message's contents;

sending an opt-out message to an opt-out address;

sending a complaint message to the sender; or sending a complaint message to a third-party entity; and, repeat replying to the message at a first user-specified interval of time or until each reply is complete and each message sent in reply is responded to within a second user-specified interval of time or until a reply is sent a user-specified number of times.

42. A method for responding to an incoming electronic message, the method executed by a processor and associated computer memory configured to perform the method comprising the steps of:

determining whether the incoming electronic message is relevant or irrelevant to a user using a user profile containing information regarding relevant and irrelevant messages;

if the incoming electronic message is irrelevant to the user, parsing the incoming electronic message for message origination information, wherein the message origination information parsed includes one or more items selected from the group comprising: a sending email address, a sending email domain, a unique message identifier, a reply email address, a reply email domain, a response domain, a response email, a response URL, an opt out URL, an opt out email, and an anonymous FTP login for message image, physical address and telephone numbers;

determining the sending web server or electronic content repository, determining subsequent electronic links on the sender supplied destination URL and/or electronic network addresses, and replying to the message at the sending web server or electronic content repository, subsequent electronic links on the sender supplied destination URL and/or electronic network addresses, wherein replying comprises any of:

pinging the electronic message's server, tracing a route to the electronic message's sender, forwarding the electronic message, sending an opt-out message to an opt-out address, sending a complaint message to the sender, or sending a complaint message to a third-party entity; and, repeat replying to the message at a first user-specified interval of time or until each reply is complete and each message sent in reply is responded to within a second user-specified interval of time or until a reply is sent a user-specified number of times.

* * * * *